United States Patent [19]

Kandell et al.

[11] 4,430,530
[45] Feb. 7, 1984

[54] TELEPHONY SYSTEM WITH AUTOMATIC TEST CALL GENERATOR FOR REMOTE PORT GROUPS

[75] Inventors: Ronald J. Kandell, Maitland, Fla.; Donald R. Merriam, Hilton, N.Y.; Bernard H. Root, Longwood; William W. Woodruff, Maitland, both of Fla.

[73] Assignee: Stromberg-Carlson Corporation, Orlando, Fla.

[21] Appl. No.: 445,256

[22] Filed: Nov. 29, 1982

Related U.S. Application Data

[63] Continuation of Ser. No. 295,742, Aug. 24, 1981, abandoned, which is a continuation of Ser. No. 187,277, Sep. 15, 1980, abandoned.

[51] Int. Cl.³ .............................................. H04M 3/28
[52] U.S. Cl. ............................................ 179/175.2 D
[58] Field of Search ................. 179/175.2 R, 175.2 C, 179/175.2 D, 175.3 R

[56] References Cited

U.S. PATENT DOCUMENTS 4,255,624 3/1981 Walton et al. ............... 179/175.2 D Primary Examiner—Stafford D. Schreyer
Attorney, Agent, or Firm—Cesari & McKenna

[57] ABSTRACT

A telephony network with a digital central office and one or more remotely located digital satellite units. Each digital satellite unit connects to a number of remote subscriber lines and monitors these lines to establish communications through interconnecting spans and a digital satellite interface at the digital central office. The digital satellite interface also connects to port group highways in the digital central switch, to call processors in the digital central switch, and to a maintenance processor in the digital central switch. An automatic test circuit communicates with the interface, and each remote digital satellite unit contains complementary testing circuitry. A test call is made to test the system by activating a test access relay at the remote digital satellite unit and producing a call to the automatic test circuit. The automatic test circuit then generates a tone that is carried as voice data to the remote digital satellite unit test circuit. If this tone is received, the test circuit at the digital satellite unit sends a tone followed by dial pulses. If the automatic test circuit receives the tone and dial pulses within specifications, the automatic testing has passed and no further action occurs. If it fails, a message is sent back to the digital satellite interface, so various levels of diagnostics utilizing the automatic test call circuit can be performed to isolate the cause of the failure.

32 Claims, 63 Drawing Figures

FORMATTER 25 BLOCK DIAGRAM

MEMORY 28 BLOCK DIAGRAM

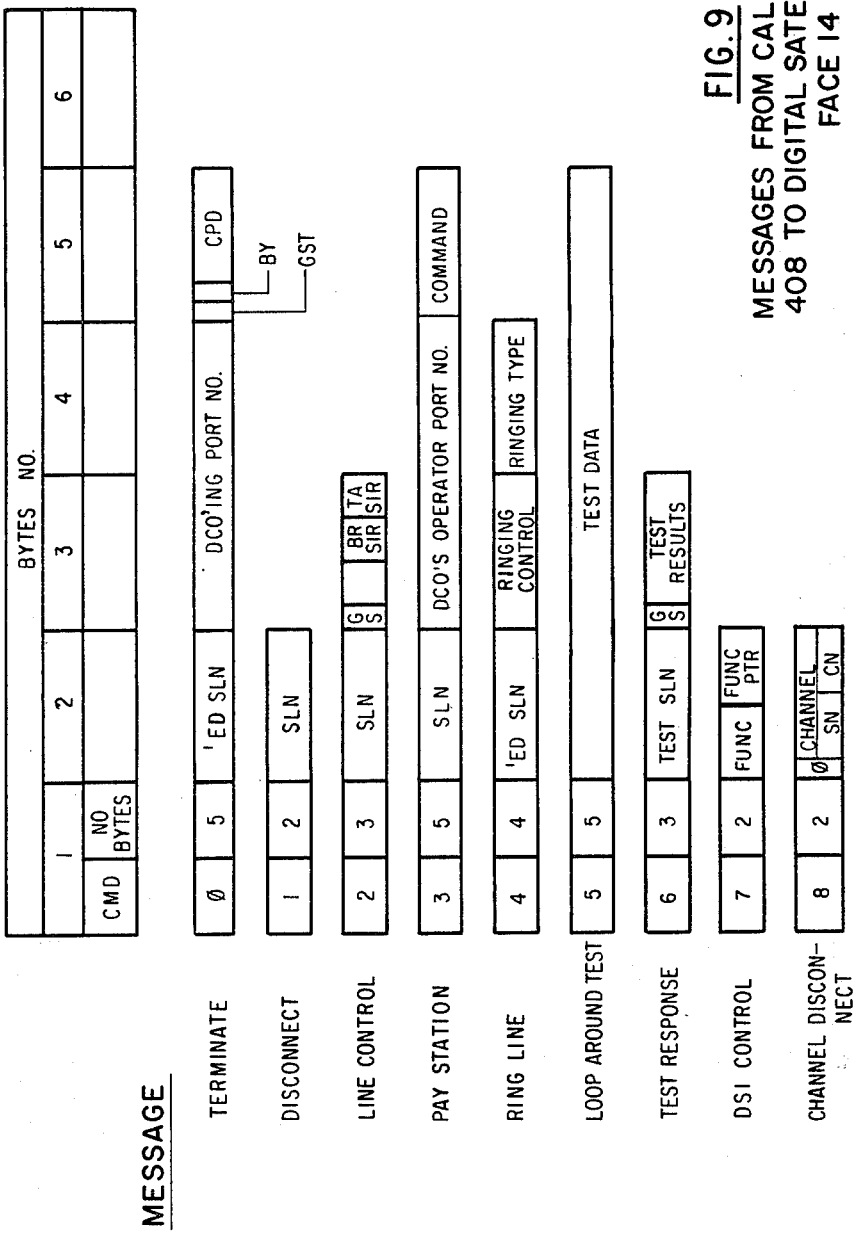

FIG. 10

MESSAGES FROM DIGITAL SATELLITE INTERFACE 14 TO CALL PROCESSOR 408

| BYTE NO. | | | | | |
|---|---|---|---|---|---|
| 1 | 2 | 3 | 4 | 5 | 6 |
| CND | NO.BYTES | | | | |

MESSAGE

| | | | | | | |
|---|---|---|---|---|---|---|
| ORIGINATE | 0 | 5 | 'ING SLN | ASGND. CHAN. NO. | ACB DELAY COUNT | |

— PRY ID

| | | | | |
|---|---|---|---|---|
| RELEASE | 1 | 2 | SLN | |

| | | | | | | |
|---|---|---|---|---|---|---|
| CONNECT | 2 | 6 | 'ED SLN | ASGND. CHAN. NO. | DCO'S 'ING PORT NUMBER | CPD |

— BY
— GSC

| | | | | | | |
|---|---|---|---|---|---|---|
| CONNECT FAIL | 3 | 6 | 'ED SLN | FAILURES POINTER | DCO'S 'ING PORT NUMBER | CPD |

— BY
— GSC

| | | | | | |
|---|---|---|---|---|---|
| PAYSTATION RESPONSE | 4 | 5 | 'ING SLN | PAYSTA. RESPONSE | DCO'S OPERATOR PORT NUMBER |

| | | | |
|---|---|---|---|
| LOOP AROUND TEST | 5 | 5 | TEST DATA |

| | | | | | |
|---|---|---|---|---|---|
| TEST CALL CONTROL | 6 | 4 | SLN | ASGND.CHAN. NO. | TEST POINTER |

| | | |
|---|---|---|
| MESSAGE COMPLETE | 7 | 1 |

| | | | | |
|---|---|---|---|---|
| CHANNEL DISCONNECT | 8 | 3 | SLN | ASGND. CHAN. NO. |

| | | | | |
|---|---|---|---|---|
| DSI STATUS | 9 | 2 | FUNC | STATUS PTR |

| | | | | |
|---|---|---|---|---|
| CHANNEL DISCONNECT FAILURE | A | 3 | SLN OR "FF" | CHAN. NO. OR "FF" |

| | | |
|---|---|---|
| CBI LINK RESP. | B | 1 |

BUFFER 29 BLOCK DIAGRAM

REMOTE DIGITAL SATELLITE UNIT

FIG. 16

MESSAGE FROM DIGITAL SATELLITE INTERFACE 14 TO REMOTE DIGITAL SATELLITE UNIT 13

| MESSAGE | CODE | | | | | | | | | | |
|---|---|---|---|---|---|---|---|---|---|---|---|
| POLL | 1 | F | F | C | 0 | 0 | | | | | |
| TEST POLL | 5 | F | F | C | 0 | 0 | | | | | |
| POLL ASSIGN | 7 | RGN | 0 | 0 | 0 | 0 | | | | | |
| ORIGINATE RESPONSE | 8 | 0 | SLN | RT | SPAN NO. | CHANNEL NUMBER | | | | | |
| TERMINATE | 8 | RING CODE | SLN | RT | SPAN NO. | CHANNEL NUMBER | | | | | |
| LINE CONTROL | 9 | 0 | SLN | S | DS | PR | PC | RB | TA | RD | SP |
| MANUAL MAINTENANCE | B | 0 | SLN | CODE | | | | | | | |
| SPAN RELAY CONTROL | D | RGN | SR AS MJ MN | CA | 0 | 0 | EL | L2 | L1 | L0 X1 | X0 B2 B1 B0 |
| OK | E | 0 0 S1 S0 | 0 | 0 | 0 | 0 | | | | | |
| IDLE | F | F | F | F | F | F | | | | | |

FIG. 17

MESSAGES FROM REMOTE DIGITAL SATELLITE UNIT 13 TO DIGITAL SATELLITE INTERFACE 14

| MESSAGE | CODE | | | | | | | | | | | | |
|---|---|---|---|---|---|---|---|---|---|---|---|---|---|
| POLL RESPONSE | 1 | RESPONSE | | | | | | | | | | | |
| TEST POLL RESPONSE | 5 | RESPONSE | | | | | | | | | | | |
| ORIGINATE | 2 | 0 | SLN | DS | SF | PU | P1 | 0 | 0 | 0 | | | |
| RLC MAINTENANCE | 4 | 0 | SLN | 0 | 0 | 0 | LP | | | | | | |
| MANUAL MAINTENANCE | B | 0 | SLN | CODE | | | | | | | | | |
| SPAN RELAY CONTROL | D | RGN | SR | AR | MJ | MN | CA | 0 | 0 | EL | L1 | L2 | L0 | X1 | X0 | B2 | B1 | B0 |
| OK | 8 | 0 | 0 | S1 | S0 | 0 | 0 | 0 | 0 | |
| IDLE | F | F | F | F | F | F | F | F | |

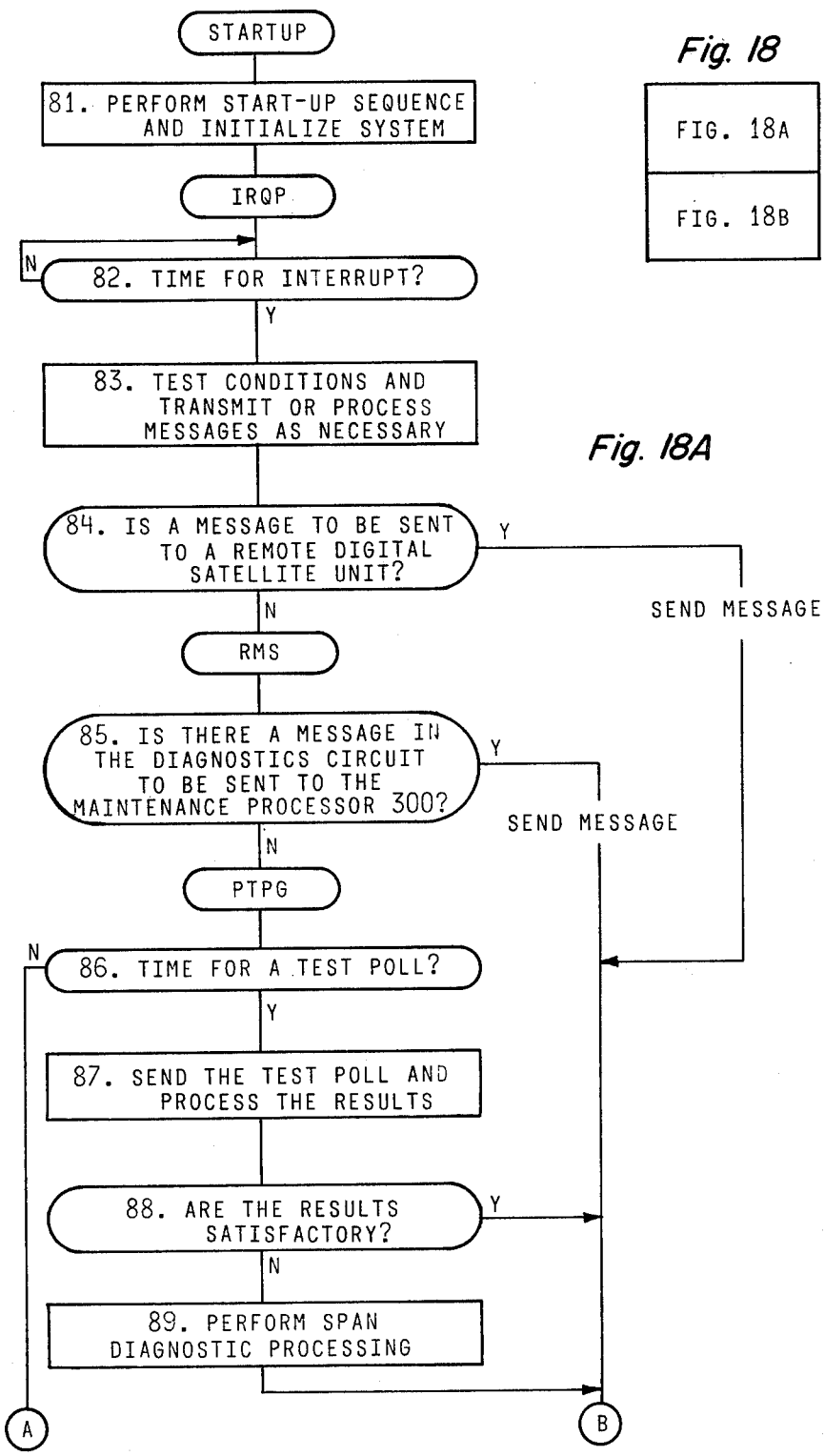

MAINTENANCE BUS INTERFACE BUFFER 18

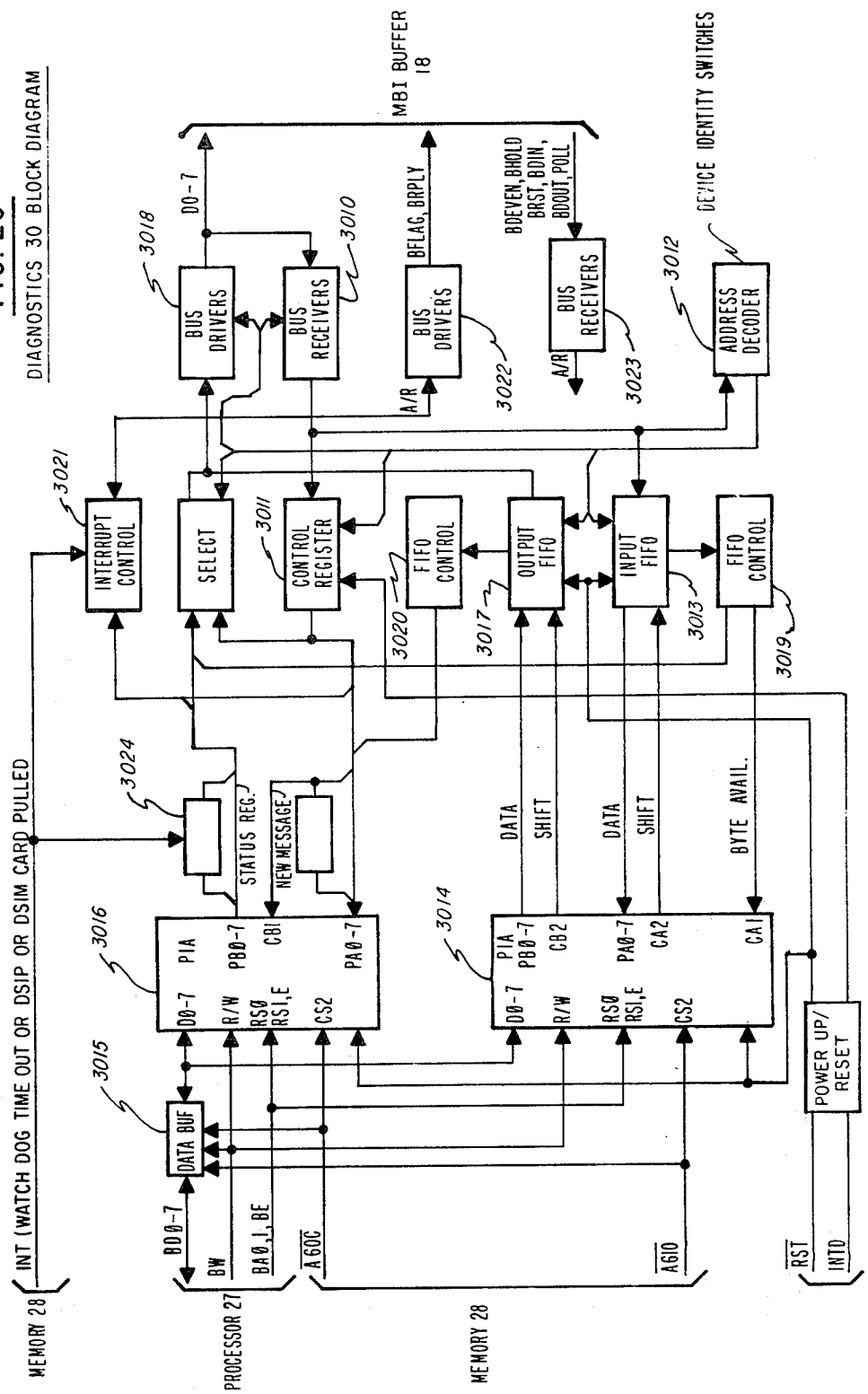

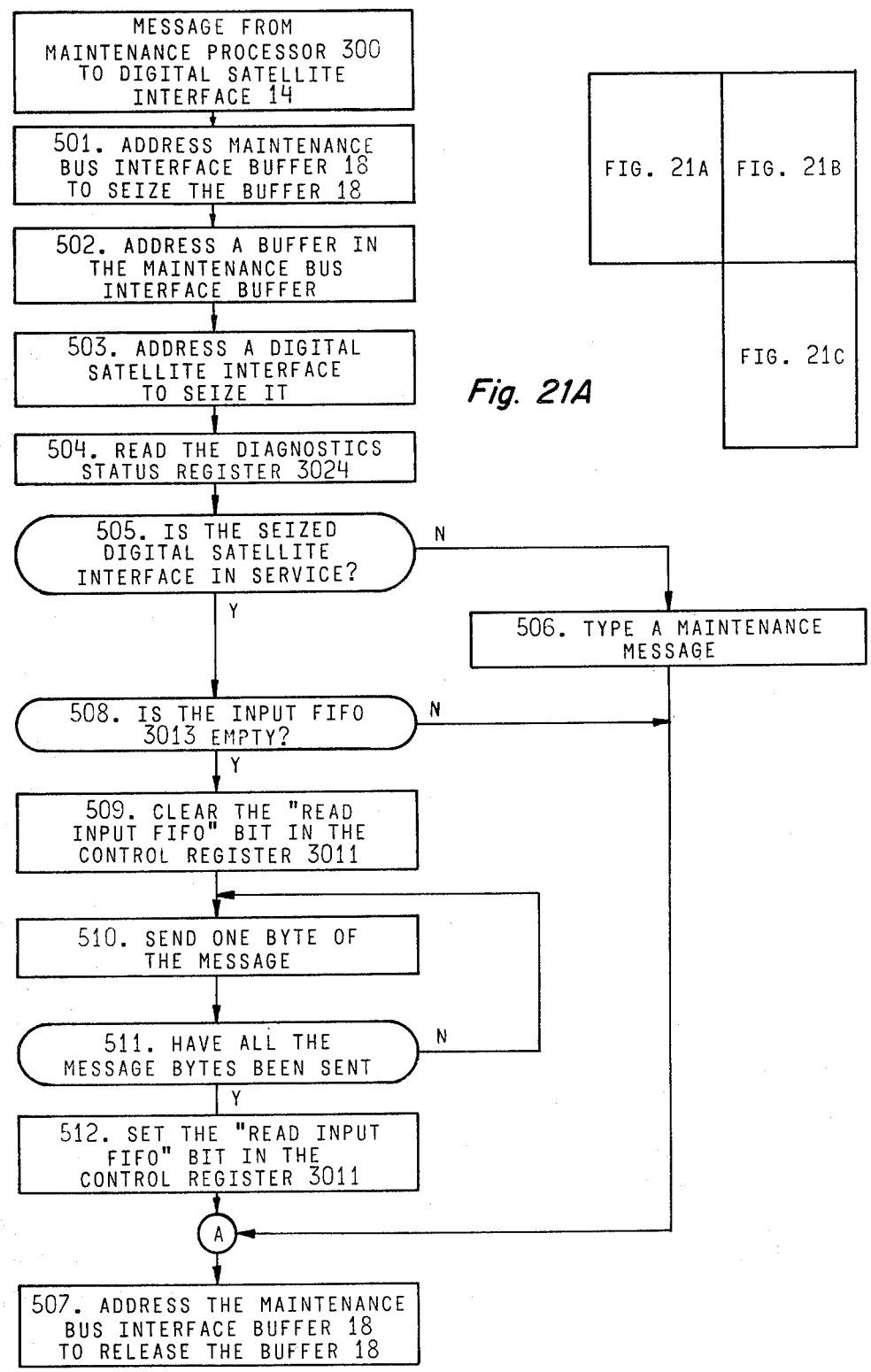

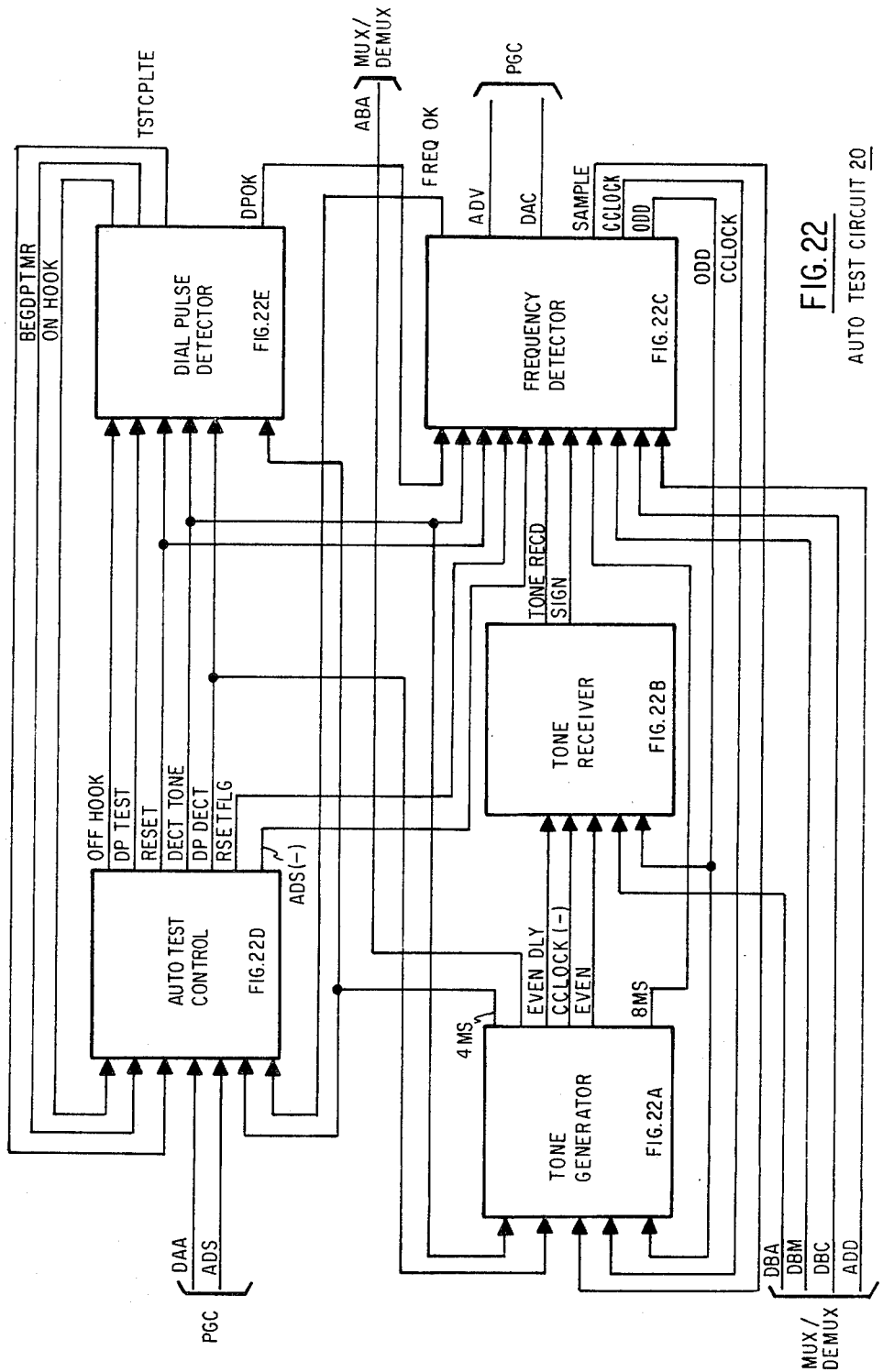

TONE GENERATOR

TONE RECEIVER

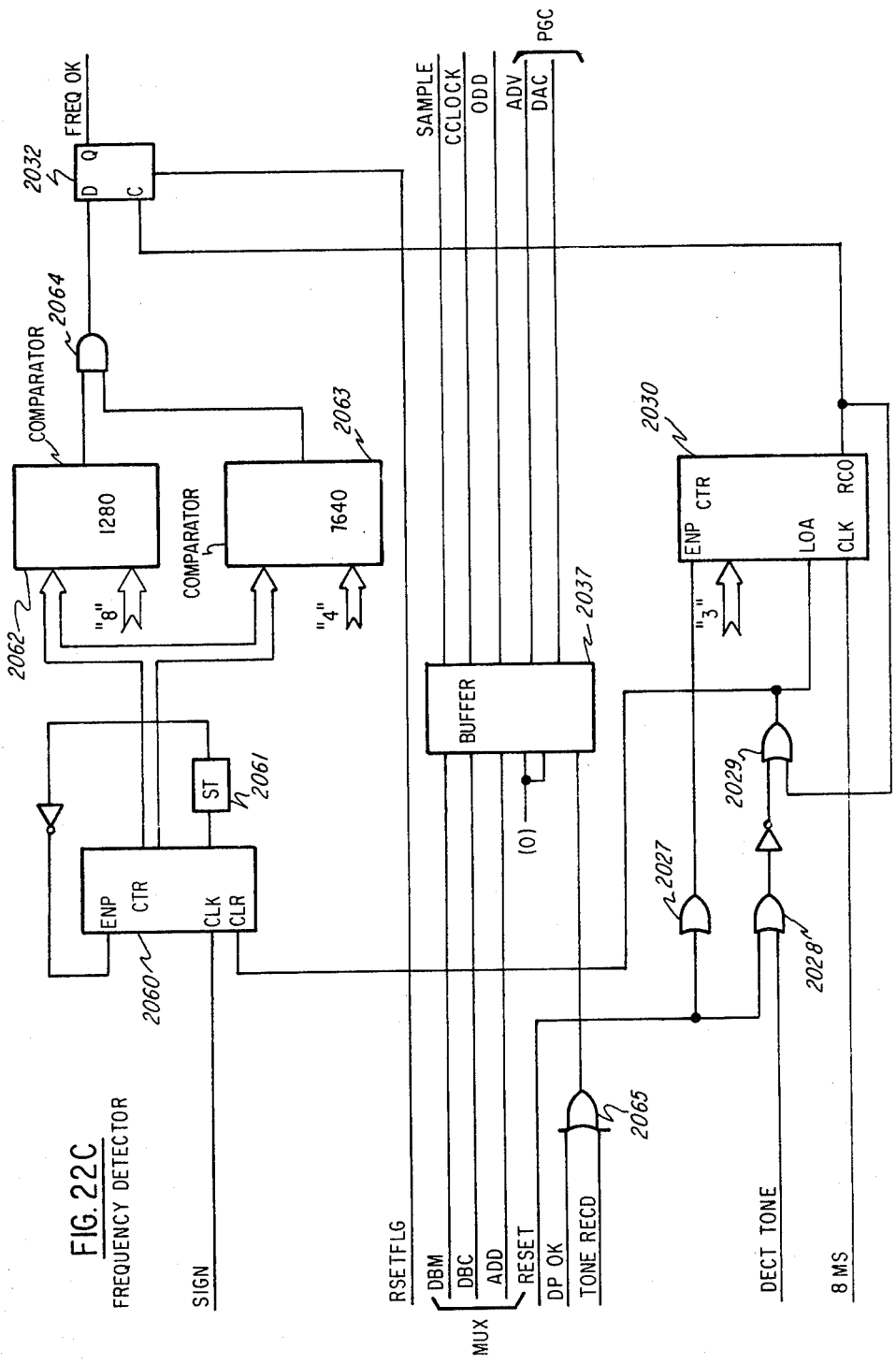

AUTO TEST CONTROL

DIAL PULSE DETECTOR

M & A AUTO TEST CIRCUIT 79

AUTO TEST CONTROL

TIMING CIRCUIT

DETECTOR CIRCUIT

TONE CIRCUIT

ALARM CONTROL AND RECEIVER RESET

DIAL PULSE CONTROL

MAINTENANCE PROCESSOR CONTROL

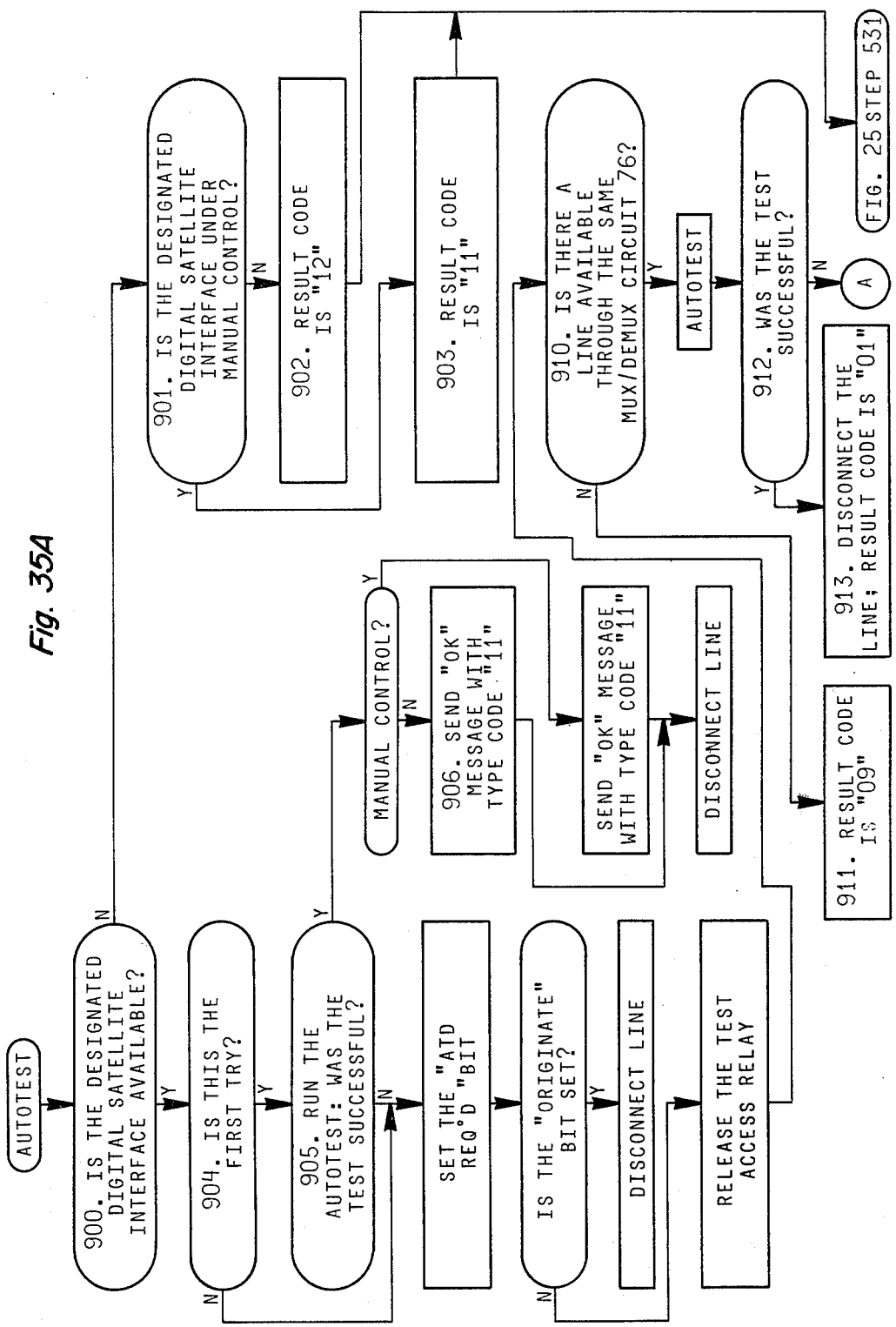

TELEPHONY SYSTEM WITH AUTOMATIC TEST CALL GENERATOR FOR REMOTE PORT GROUPS

CROSS REFERENCES TO RELATED APPLICATIONS AND PATENTS

This is a continuation of application Ser. No. 06/295,742 filed Aug. 24, 1981, abandoned, which is a continuation of application Ser. No. 06/187,277 filed Sept. 15, 1980 now abandoned.

U.S. Pat. application Ser. No. 924,883, filed on July 14, 1978 by Barrie Brightman et al for an "Arrangement of Interactive Telephone Switching Processors for Control of Ports", and assigned to the same assignee as this invention and now abandoned; and U.S. Pat. No. 4,276,451, issued June 30, 1981, to Otto W. Beebe et al for a "Control System for Telephone Switching System", and assigned to the same assignee as the present invention.

BACKGROUND OF THE INVENTION

This invention generally relates to telephony networks and, more specifically, to a telephony switching system that is characterized by switching calls to remotely located port groups in the network.

U.S. patent application Ser. No. 924,883 discloses a telephony network that includes a digital central office for performing switching operations. In thin network, telephone lines from subscribers and trunk circuits from other central offices connect directly to a digital central office through a plurality of line and trunk circuits in port group units. The connection is made through conventional tip and ring, or analogous, conductors that extend from each individual subscriber or office to the location of the digital central office. These conductors carry signals in analog form that represent voice information and supervisory information. Supervisory information received by the central office is called "sense supervisory" information and includes hook status and dial pulse information; supervisory information sent to the port group units and the conductors is called "control supervisory" information and includes ringing and other information.

Each port group unit connects to a plurality of telephone lines through individual port circuits, such as line or trunk circuits. Each port circuit converts the incoming voice signals to pulse-code-modulated signals that are multiplexed and transferred in a serial pulse train onto a port group highway. Sense supervisory information also is multiplexed into this pulse train.

A tire slot interchange (TSI) matrix network receives this pulse train and strips the incoming sense supervisory information for storage in an area of a port data store that is assigned to each port circuit. A port event processor samples the information in each port data store area and modifies and uses the information in that area to send messages to a call control processor. The call control processor sends information including commands to the individual areas of the port data store for enabling the port event processor to control the corresponding telephone subscriber's line and to the TSI matrix network for establishing a switching channel through the network to thereby establish a path for the digitized voice signals over the same or another port group highway to a called telephone.

Commands to the port event processor from the call control processor enable the transmission of a dial tone, the termination of a dial tone, or the ringing of both the called and calling telephones. The port event processor generates control supervisory information in response to these commands. The control supervisory information is interspersed with the voice information in digital form for transmission to the port group unit connected to the port group highway. Then the corresponding port group unit performs various functions in response to the commands and converts the digital voice data signals into analog form for transmission through a particular port circuit to the subscriber's telephone lines and telephone.

U.S. patent application Ser. No. 924,883 discloses a single call processing system of this general construction that operates as a digital central office. U.S. Pat. No. 4,276,451 depicts a digital central office that includes two such call processing systems that operate in parallel and in conjunction with a maintenance processor. The two parallel call processing systems receive incoming signals from the subscribers and trunk lines simultaneously and operate in synchronism. However, signals from only one of the call processing systems pass through the port group units to the subscriber and trunk lines. The maintenance processor system analyzes losses of synchronization between the two call processing systems, parity errors, and other conditions. It determines which of the two parallel call processing systems actually controls the telephony network.

Digital central offices of this type require individual telephone lines from each subscriber location to the location of the digital central office. This approach works well and is economical where the subscribers either are located in a relatively small geographical area around the digital central office or are randomly, but widely, dispersed geographically. However, in many applications, telephony network subscribers tend to be located in geographically remote clusters. For example, subscribers may live in several small towns in a rural setting or may live in different apartment houses in an urban setting.

Telephony networks in such applications incorporate a great deal of redundant cabling to effect the individual connections. This cabling requires more than electrical conductors. Various gain devices may be required along these conductors; usually at least one gain device is required for each subscriber line. Thus, the cabling costs increase dramatically as the number of subscribers increases. Moreover, in many situations, the traffic volume in such networks, as a percentage of maximum traffic capacity, is very low. Thus, the actual utilization of the telephone lines can become quite expensive and inefficient.

Concentrators enable an efficient utilization of data channels in digital data networks. Basically, a digital data network includes modulator/demodulator ("modem") circuits for enabling digital information to be transferred over a normal telephone network in an analog form. When several subscribers in one area require only low-speed data transfers, each subscriber is connected to a local concentrator at a particular location by means of two low-speed modems; one at subscriber's location and the other at the concentrator location. The concentrator location will have one such low-speed modem for each incoming telephone line. A digital processing circuit converts the digital signals between the low-speed modems of the concentrator and a time multiplexed, high-speed, serial, digital pulse train that is applied to and received from a high-speed modem that is in a high-speed path to a data processing center. Oftentimes these concentrators are very sophisticated and an apparently large concentration can occur at such a point.

However, in many applications the actual concentration is less than 40:1. Moreover, this approach is not readily adapted for application to conventional, voice telephony. The high speed data networks require specially conditioned telephone lines that are expensive to utilize, and the required modems are expensive. The modems produce or respond to carriers held to a finite frquency band and digital processing circuits are, in effect, independent switches that can become quite complex and expensive. In addition, even if readily adapted to a telephony network, the economic benefit of substituting this type of a concentrator network at a remote location in a telephony system would not be economically justified by the cabling savings that would otherwise be provided.

Another approach that is applicable to a telephony network is to place remote port units at the center of the subscriber clusters and establish a reduced number of communications links, for example one to three links, between each of those clusters and a special unit that connects in place of one or more lines to the analog portion of the digital central office. However, it is difficult with this system to provide many of the maintenance functions that are provided in the conventional digital central office, such as disclosed in U.S. Pat. No. 4,276,451.

One such maintenance function is a test call function that is described in U.S. Pat. No. 4,276,451. In such a system, the maintenance processor and related circuitry are able to effectively disconnect two telephone lines from their respective subscribers and to complete a predetermined call from one such line to another through test access relays. This provides a very useful maintenance tool, especially for performing preventive maintenance and other diagnostic functions. In this system, however, all port group units are at the digital central office so the interconnection between the maintenance processor and related circuitry and the test access relays at the port group units and port circuits is easily achieved. There is also a single test call generator that, through the test access relays and other switching networks, provides all the test calls. However, this type of test call generator is not readily adapted to an application of remote port units. Any such application would require separate connections to the test access relays, with increased cabling costs. Moreover, various tones have to be produced and transmitted and the information necessary for controlling such tones is difficult to obtain.

SUMMARY OF THE INVENTION

Therefore, it is an object of this invention to provide a method and apparatus for testing remote port units.

Another object of this invention is to provide a method and apparatus for performing a simple test that provide a means for determining whether further diagnostics of a remote port unit are necessary.

Still another object of this invention is to provide a method and apparatus for testing remote port units that facilitate scheduling these calls on a regular basis.

Still yet another object of this invention is to provide a method and apparatus for testing a remote port unit that facilitate diagnostics when initial testing indicates a failure.

In accordance with this invention, remote subscriber lines connect through a remote port unit and a communications link to an interface at a digital central switch. An automatic testing circuit coacts with the interface which, upon command, causes a designated remote subscriber line to be disconnected through a remote test access relay and completes a call between the remote subscriber line and the automatic testing circuit. The automatic testing circuit then generates a first tone to the remote location. When the remote location receives the first tone successfully, it sends a second tone and dial pulses with predetermined timing characteristics in succession. The automatic testing circuit monitors the received tone and dial pulses to determine whether the testing has been successfully completed. If not, additional steps, including iterative use of the automatic testing circuit, can be taken through the interface in order to isolate any problem that may exist.

This invention, therefore, provides a simple test that is easily and quickly performed. It requires the addition of a test circuit at each remote port unit and an autotest circuit to coact with the interface. In one embodiment, the digital central office contains automatic maintenance equipment and the test is readily adapted for scheduling by connecting the automatic test circuit to a port on the digital central switch. Moreover, if the test fails, then additional tests can be performed to isolate the problem.

This invention is pointed out with particularity in the appended claims. The above and further objects and advantages of this invention may be better understood by referring to the following detailed description taken in conjunction with accompanying drawings.

BRIEF DESCRIPTION OF THE DRAWINGS

FIG. 9 depicts various messages that can be sent from a call processor to a digital satellite interface;

FIG. 10 depicts various messages that can be sent from a digital satellite interface to a call processor;

FIG. 16 depicts various messages that can be transmitted from a digital satellite interface to a remote digital satellite unit;

FIG. 17 depicts various messages that can be transmitted from the remote digital satellite unit to the digital satellite interface;

FIG. 20 is a block diagram of a diagnostics circuit shown in FIG. 4;

FIG. 21, comprising FIGS. 21A, 21B, and 21C, is a flow diagram that depicts the operations in a maintenance processor and digital satellite interface during an interchange of messages therebetween;

FIG. 22 is a generalized block diagram of an autotest circuit shown in FIG. 2; FIGS. 22A through 22E depict a tone generator circuit, a tone receiver circuit, a frequency detector circuit, an autotest control circuit, and a dial pulse detector circuit, respectively, that are used in the autotest circuit of FIG. 22;

FIG. 25, comprising

FIG. 27, comprising FIGS. 27A through 27D, is a detailed flow diagram of a DSITMO module that is shown in FIG. 24;

FIG. 28, comprising FIGS. 28A through 28D, is a detailed flow diagram of a DSICOM module that is shown in FIG. 24;

FIG. 30, comprising

FIG. 31, comprising

FIG. 35, comprising FIGS. 35A through 35D, is a general, functional flow chart that is useful in understanding the possible interactions that exist during an autotest procedure.

DESCRIPTION OF AN ILLUSTRATIVE EMBODIMENT

A. Telephony Network

Figure 1:
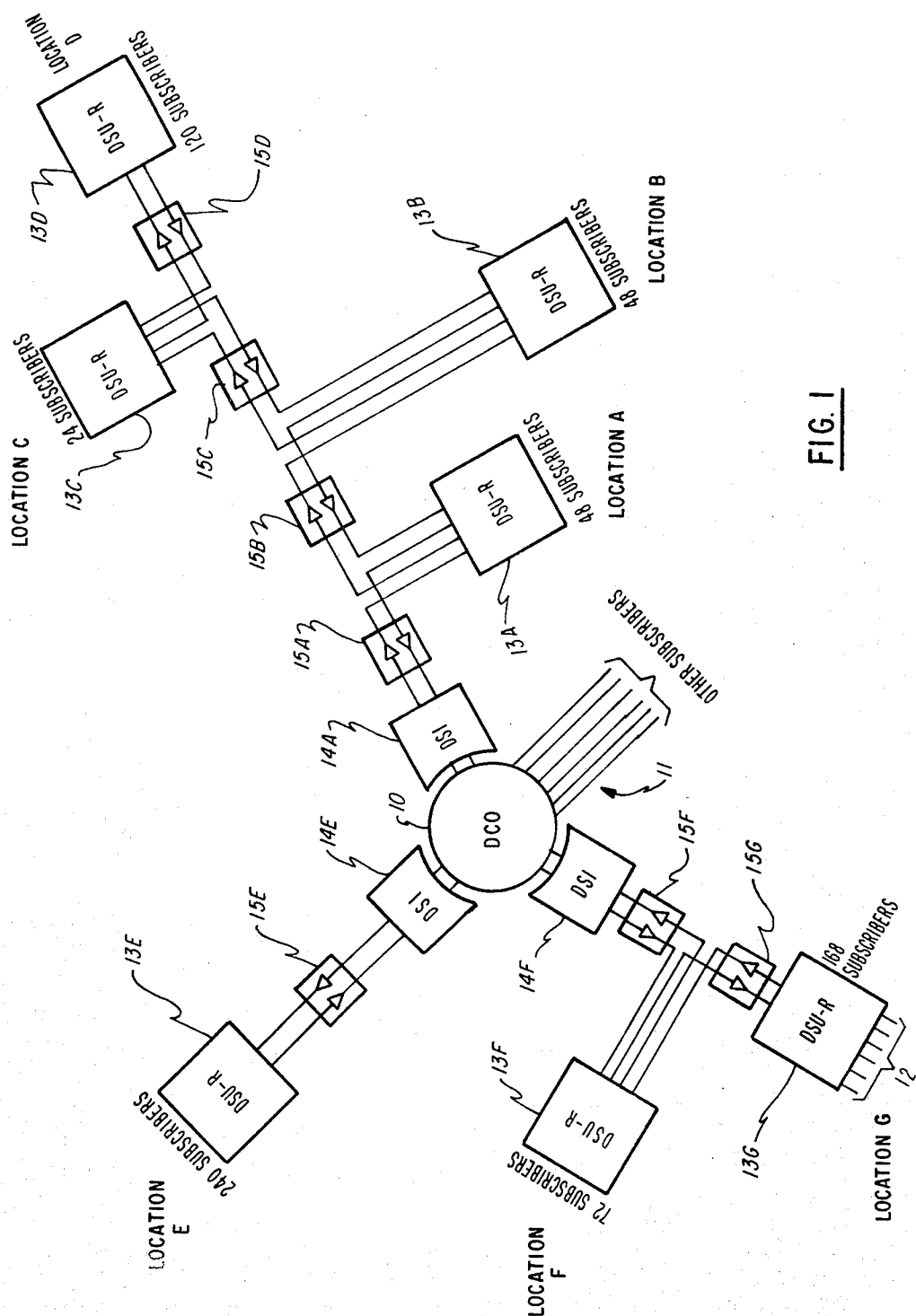
FIG. 1 is a block diagram of a telephony network constructed in accordance with this invention.

FIG. 1 depicts a telephony system that provides various levels of concentration. At the center of the telephony network shown in FIG. 1 is a digital central office (DCO) 10 of the type described in U.S. Pat. No. 4,276,451 and also in U.S. patent application Ser. No. 924,883. A number of local telephone lines 11 emanate from the digital central office 10 and connect to various local subscribers in accordance with the foregoing applications.

This particular network depicts an embodiment of a system in which "remote" subscribers are clustered around various geographically remote locations A through G. A number of telephone lines 12 interconnect these remote subscribers at locations A through G with remote port units that comprise remote digital satellite units (DSU-R's) 13A through 13G (hereinafter generally identified by reference numeral 13) respectively.

Each remote digital satellite unit 13 connects to and operates in response to the digital central office 10 through a digital satellite interface 14A, 14E or 14F (hereinafter generally identified by reference numeral 14) and a multiple path communications link 15A through 15G (hereinafter generally identified by reference number 15). For example, digital satellite interface 14A connects to remote digital satellite unit 13A through a communications link 15A. Digital satellite units 13B, 13C, and 13D are then interconnected by communications links 15B through 15D, thereby to define a daisy chain connection from the digital satellite interface unit 14A. This type of connection would be particularly appropriate where clusters of remote subscribers are dispersed along a line radiating from the digital central office location. The digital satellite interface 14E, communications link 15E, and remote digital satellite unit 13E indicate a type of connection which might be particularly useful in an apartment building in an urban environment.

In the particularly described embodiment, each remote digital satellite unit can connect to as many as 240 subscriber telephone lines such as shown at location E, and each digital satellite interface can handle traffic from up to 240 subscribers. Some typical numbers of subscribers connected to each such remote digital satellite unit 13 are shown on FIG. 1. Moreover, up to 30 digital satellite interfaces 14 can connect to a single digital central office.

From a general standpoint, it can be seen from FIG. 1 that the cabling associated with such a network can be dramatically reduced. Each of the communications links 15 may contain one, two, or three data paths. Thus, there is a potential for a cable reduction from 80:1 to 240:1. The actual concentration that can be achieved depends upon the traffic density of the various remote subscribers and the capacity of the communications link 15.

As described later, the communications link 15 in this embodiment convey pulse code modulated signals over a time division multiplexed path. Each digital satelitte nterface 14 interfaces to the digital central office and converts voice and supervisory information between the format of the digital central office 10 and the format of each communications link 15. The digital satellite interface 14 also reformats the supervisory and voice data signals and assigns a particular time slot, or channel, on the communications link 15 to a particular remote subscriber when that telephone line is being used for a telephone conversation. The number of available channels on the communications link 15 normally is less than the number of subscriber lines.

Each remote digital satellite unit 13 provides an interface between the communications link 15 and the conventional telephone lines that emanate from that unit 13. It couples voice signals to and from the telephone, or subscriber, lines, produces sense supervisory information in response to activities by the subscriber, and responds to control supervisory information received from the communications link 15. In addition, the remote digital satellite unit 13 reformats the supervisory information and, in response to certain of the control supervisory information it receives, routes the information to the appropriate telephone line and also performs the analog/digital conversions that are necessary to receive and transmit analog voice signals over the telephone lines.

Figure 2:
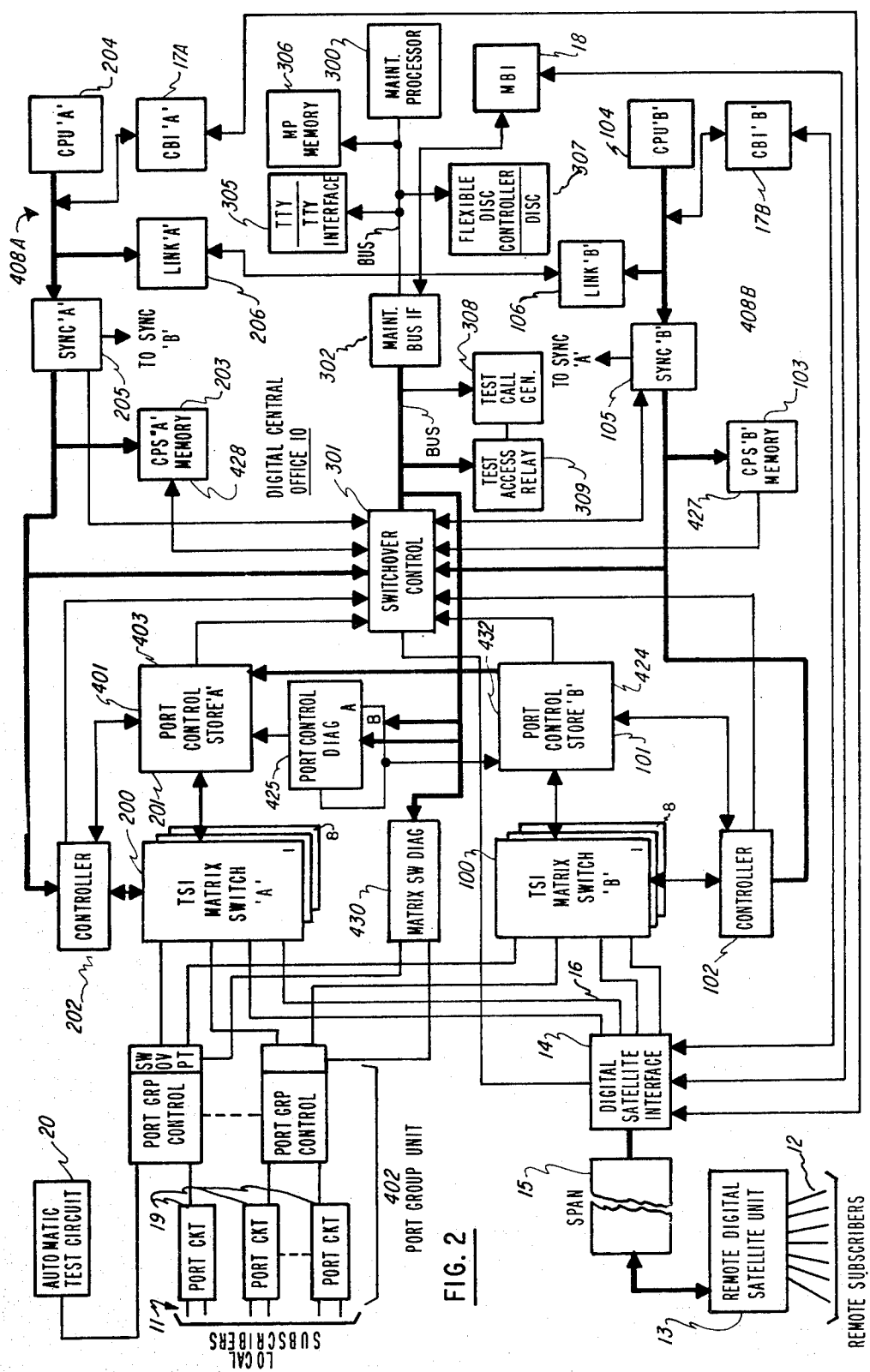
FIG. 2 is a more detailed block diagram of a digital central office in the telephony network shown in FIG. 1.

FIG. 2 depicts modifications to the telephony system disclosed in U.S. Pat. No. 4,276,451 and is taken from FIG. 4 in that disclosure. In addition, FIG. 2 discloses a single digital satellite interface 14, a communications link, called a "span", 15, and a remote digital satellite unit 13 with various telephone lines 12 emanating to a cluster of remote subscribers. Elements that are common to the disclosure in the above-identified applications retain the same reference numerals. Specifically, reference numerals in the range from 100 through 399 are found in U.S. Pat. No. 4,276,451, while reference numerals from 400 through 499 are found in U.S. application Ser. No. 924,833. As their functions are known, only the interconnections to specific elements are set forth. Specifically, the digital satellite interface 14 connects to this system (that is digital central office 10) at four points. First, there are port group highway connections 16 that interconnect the digital satellite interface with port group highways from the TSI matrix switch A 200 and the TSI matrix switch B 100. This enables the digital satellite interface 14 to transmit voice and sense supervisory information to and receive voice and control supervisory information from the port group highway signals in the format of the highway.

A second connection is to the call processing systems by means of a call processor bus interface (CBI). Specivically, a CBI "A" 17A establishes a communications path between the digital satellite interface 14 and CPU "A" 204, while CBI "B" establishes a communications path between the digital satellite interface 14 and the CPU "B" 104. Each CBI 17 can connect to a plurality of other digital satellite interfaces (i.e., up to a total of 30 in one embodiment). Each call processor bus interface 17 modifies data between a format that is compatible with the corresponding call processor 408 and the digital satellite interface 14. Each CBI 17 polls its corresponding digital satellite interfaces 14 for requests for access to its call processing unit 408. Moreover, each CBI 17 detects certain errors and can mask particular digital satellite interfaces 14 thereby to inhibit any operation through those interfaces.

A third connection between the digital satellite unit 14 and the digital central office 10 is by means of a maintenance bus interface (MBI) buffer 18 that establishes a communications path between the digital satellite interface 14 and the maintenance processor 300. The MBI buffer 18 also connects to each digital satellite interface that connects to the call processor bus interfaces 17. The MBI buffer 18 provides a conversion between formats of signals on the bus of the maintenance processor 300 and at the digital satellite interface 14. It modifies timing, expands addressing, and also performs a polling operation to determine when any of the connected digital satellite interfaces 14 wishes to communicate with the maintenance processor 300.

The fourth connection between the digital satellite interface 14 and the digital central office 10 is to the switchover control 301 that establishes which of the two call processing systems actually controls the telephone network.

The first three basic connections provide cooperative communications paths that enable the digital satellite interface 14, span 15, and remote digital satellite unit 13 to operate in response to control of the call processing systems 408A and 408B and the maintenance processor 300 shown in FIG. 2. However, this operation is accomplished with minimal changes to the physical circuits. The primary changes exist in control functions that are utilized by the call processing systems 408 and the maintenance processor 300. Thus, the existing capabilities of the call processing systems 408 shown in FIG. 2 are retained and are utilized in connection with this invention, to thereby further increase call processing efficiency and reduce costs.

As disclosed, a port group unit 402 interconnects the digital central office 10 shown in FIG. 2 to various local subscriber lines 11 through a port circuit 19. However, in this particular embodiment and in accordance with one aspect of this invention, an automatic test circuit 20 that tests the circuitry at the remote digital satellite unit 13 in cooperation with the maintenance processor 300 connects to trunk interface circuitry that connects to the port group control.

B. Communications Link 15

Figure 3:
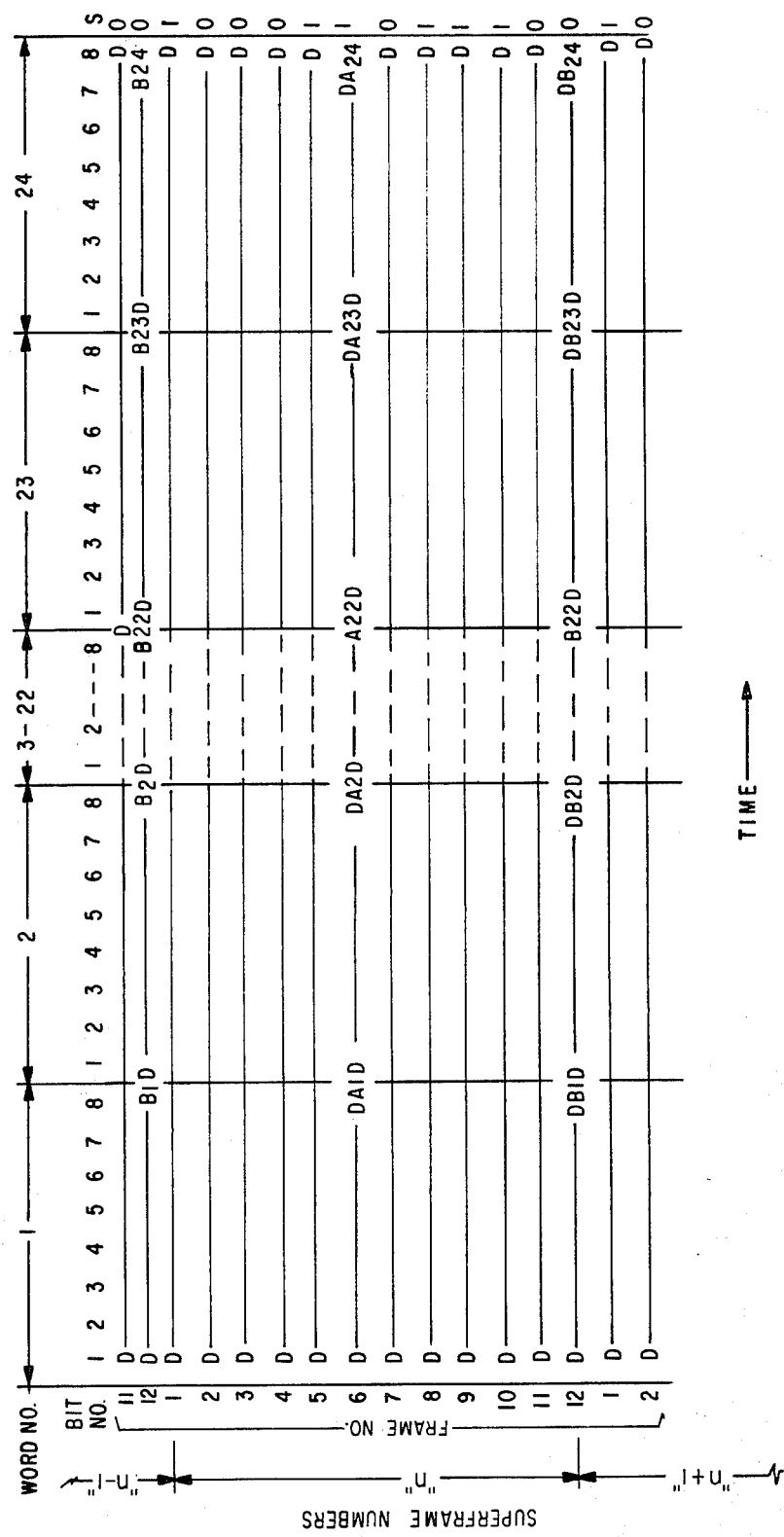
FIG. 3 is a diagram that depicts signal organization over a communications link shown in FIGS. 1 and 2.

The specific structure of various elements shown in FIG. 2 depends, in part, on the nature of the signalling across the span 15. Therefore, it will now be helpful to discuss the span 15 in more detail. A span is a known, differentially driven, electrical connection between two geographically remote points. As described later, the span 15 may include two or three independently operating span circuits or paths. Each span circuit defines a number of time domain channels. The specific organization and meaning of data signals on the channel is set forth in FIG. 3, that depicts the organization of a single "superframe" (i.e., superframe "n") that is passed over one span circuit as a serial bit stream together with portions of prior and following superframes "n−1" and "n+1". Each superframe comprises 12 successive frames (Frame numbers 1 through 12). In turn, each frame comprises 193 bits that form 24 8-bit words and one synchronizing bit. In accordance with this invention, the time interval for each "word" corresponds to a "channel"; thus, word number 1 corresponds to channel 1; and word 24, to channel 24. Moreover, as depicted at the right of FIG. 3, each frame terminates with the synchronizing bit and the pattern of synchronizing bits for a superframe is predetermined thereby to enable losses of synchronization to be readily detected. In this figure, "D" represents a signal that is interpreted as voice data.

Two of the twelve frames convey information corresponding to supervisory information and commands. This is accomplished by a "bit stealing" technique that is implemented during the sixth and twelfth frame times. During the sixth frame, the least significant bit (bit 8) in each of words 1 through 24 is encoded as an "A" signalling but in response to sense supervisory information from the remote digital satellite unit 13 for the subscriber assigned to the corresponding channel. For example, if a subscriber goes off-hook and is assigned channel 7, off-hook information will be transmitted during the A7 bit time (i.e., the least significant bit of word number 7 in the sixth frame). Thus, during the sixth frame, sense supervisory information for 24 subscribers can be transmitted from a remote digital satellite unit 13 to the digital satellite interface 14.

The least significant bits in each of words 1 through 24 during the twelfth frame constitute "B" signalling bits. In this embodiment, the "B" signalling bits are utilized for conveying 24-bit messages between the digital satellite interface 14 and its remote digital satellite units 13.

All the information in the data words, including the least significant bits in each word during the sixth and twelfth frames, are also conveyed to the port group highways 16. Obviously, there may be errors during the sixth and twelfth frames, but the error produces no significant degradation in the quality of the voice that is ultimately heard by the subscriber.

Thus, FIG. 3 depicts a specific embodiment of a time-division muliplexed system that defines a number of channels. As described later, each of these channels is then assigned to a particular subscriber line when that subscriber line is in use. Yet this provides a reasonably rapid transmission technique for the "A" and "B" signalling bits as, in one specific embodiment in which each frame requires 125 microseconds, "A" and "B" bit signalling rates each approach 2,000 bytes per second.

Figure 4:
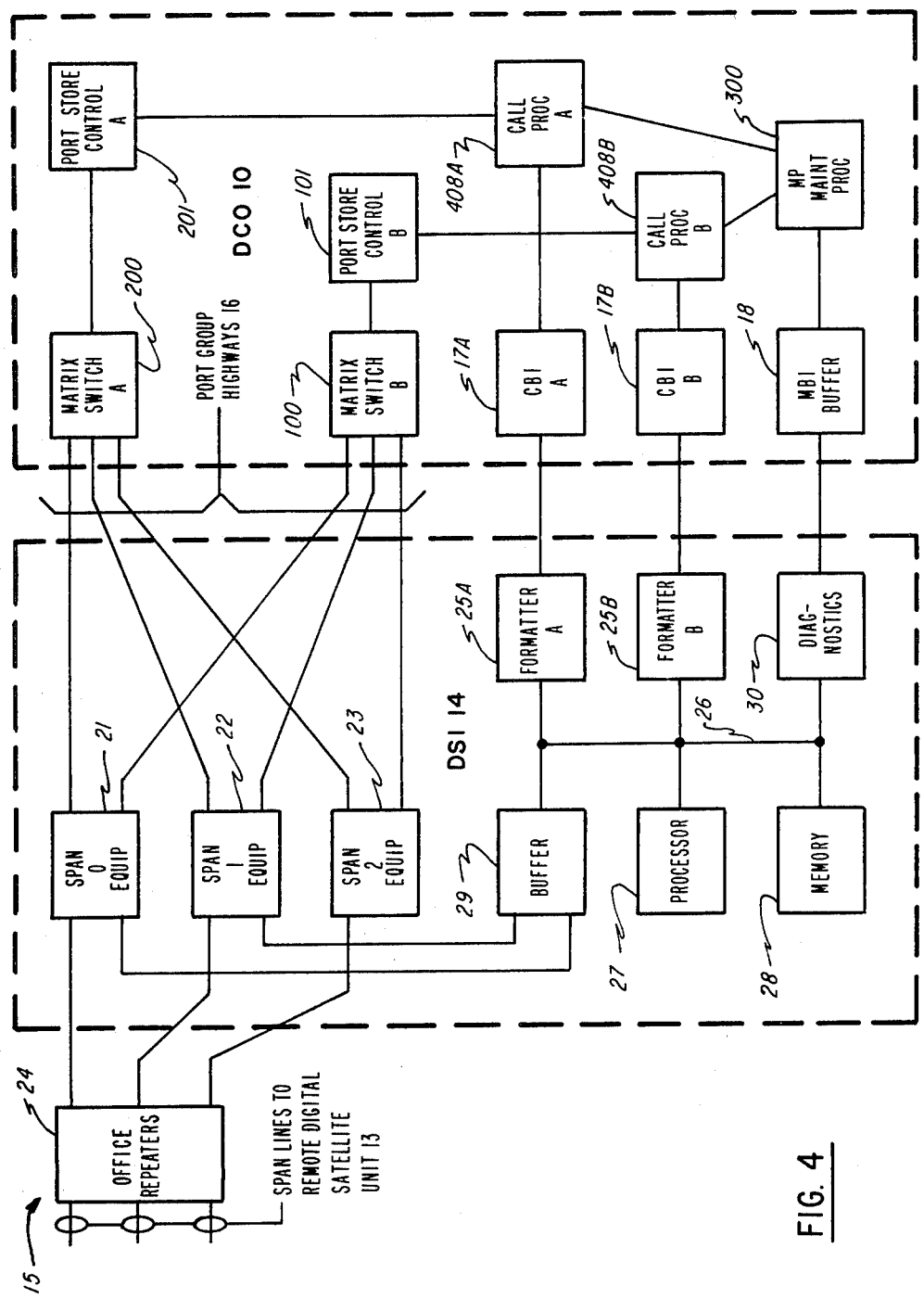
FIG. 4 is a block diagram of a typical digital satellite interface and its connection to the network that is depicted in FIGS. 1 and 2.

FIG. 4 depicts three separate spans 15 that are coupled to span equipment in the DSI 14. Specifically, digital satellite interface 14 contains span 0 equipment 21, span 1 equipment 22, and span 2 equipment 23. Each one of the span equipments 21 through 23 connects to both the TSI matrix switch A 200 and the TSI matrix switch B 100.

Each item of span equipment comprises three functional modules: a span transmitter, a span receiver, and a span interface. The transmitter accepts data from the port group highway connection 16 and formats that data for span compatibility, adds the synchronizing pattern shown in FIG. 3, and routes the information to the span interface for subsequent transfer over office repeaters 24 (i.e. amplifying circuits) that drive the spans 15. The span receiver synchronizes incoming data from the span interface and converts it into a rate and form that are compatible with the port group highway connection 16. The span interface also provides timing for the span equipment and proper signal levels among the digital satellite interface 14, the port group highway connection 16, and the office repeaters 24.

More specifically, a span transmitter synchronizes the equipment to the digital central office 10, formats the signals on the port group highway connection 16 into the span format, inserts the correct synchronizing bit at the end of each frame to achieve the correct synchronizing pattern for each superframe, and then routes the data to the span interface for subsequent transmission over the span 15. The span receiver synchronizes the incoming span data and formats the data for compatibility with the port group highway connection 16. It also routes voice data and supervisory data onto the port group highway connection 16. The span interface connects the digital satellite interface 14 to both the port group highway connection 16 and to the office repeaters 24. The circuitry may also contain bit error comparators. Thus, each span equipment provides a path between the TSI matrix switches 100 and 200 and the spans 15.

To facilitate an understanding of this invention, it will now be helpful to describe, in general terms, the construction and operation of the various circuits that establish various communications paths, namely: (1) the call processor-digital satellite interface path; (2) the digital satellite interface-remote digital satellite unit path; and (3) the maintenance processor-digital satellite interface path.

C. Call Processor-Digital Satellite Interface Path

Each call processor-digital satellite interface path includes one of the call processor buffer interfaces 17A and 17B and the respective call processing systems 408A and 408B as shown in FIG. 4. Independently operable formatter circuits 25A and 25B in the digital satellite interface 14 connect to the interfaces 17A and 17B respectively and complete the paths to a bussing structure 26 associated with a controlling processor 27, a memory 28 that is utilized by the processor 27, and a buffer 29. The buffer 29 is part of the communications path between the digital satellite interface 14 and corresponding remote digital satellite units 13. More specifically, the buffer 29 acts as an input/output interface between the bus 26 and the span equipments 21 through 23. A diagnostics circuit 30 also connects to the bus and is described later in connection with the maintenance processor-digital satellite interface path.

Figure 5:
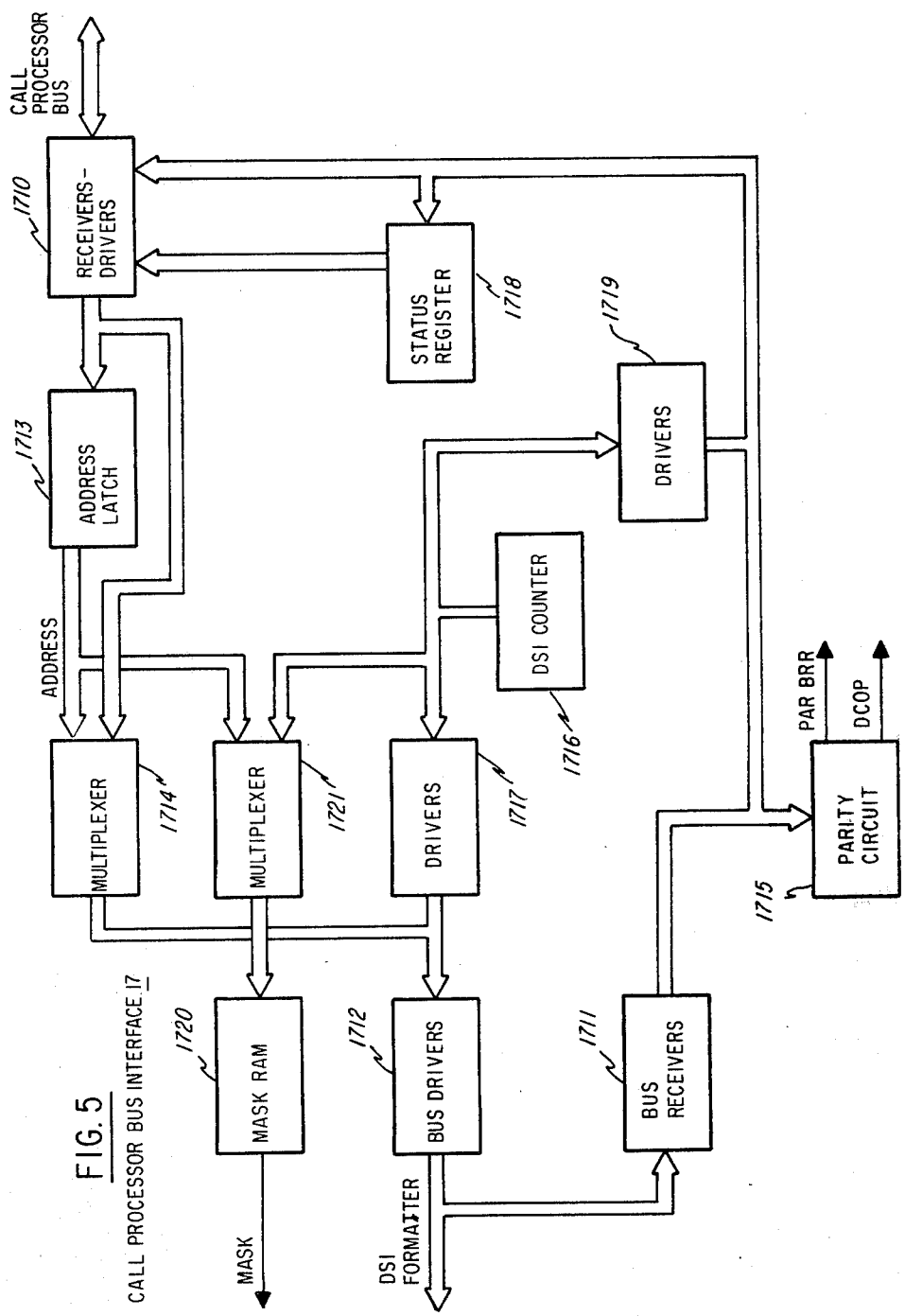
FIG. 5 is a detailed block diagram of the data paths in a call processor bus interface shown in FIG. 4.

FIG. 5 depicts one call processor bus interface (CBI) 17. It includes receivers-drivers 1710 that connect to the bus from a corresponding one of the call processors 408A and 408B, and bus receivers 1711 and bus drivers 1712 that connect to a corresponding one of the formatters 25A or 25B. Each call processor bus interface 17 extends the corresponding call processor bus to the corresponding formatter. Address signals are coupled to an address latch 1713 and are selectively coupled to the drivers 1712 through a multiplexer 1714 if the address corresponds to a location associated with the specific digital satellite interface 14. Moreover, data from a call processor 408 is routed from the receiver-drivers 1710 through the multiplexer 1714 to the bus drivers 1712. Other circuitry establishes various delays and controls to enable the communications. If data is to be retrieved, the data is received at the receivers 1711 and routed to the receivers-drivers 1710. A parity circuit 1715 monitors parity errors.

In addition to the foregoing, each CBI 17 contains a counter 1716 that provides polling of the various plural interfaces 14 that may connect to the CBI 17 through drivers 1717. Polling occurs when a call processor 408 is not communicating with that CBI 17. If a digital satellite interface requests service, the information is routed from receivers 1711 to a status register 1718 that is periodically interrogated by the respective call processor 408.

It also is possible to "mask out" a specific interface 14. A mask random access memory (RAM) 1720 can be loaded with an appropriate mask bit through the receiver-drivers 1710 and a multiplexer 1721. Each time counter 1716 identifies an interface during polling, the number is sent through the multiplexer 1721 and the mask RAM 1720 generates a MASK signal if the corresponding interface has been masked out. This masking, however, does not inhibit communications between the interface 14 and each call processor 408.

Figure 6:
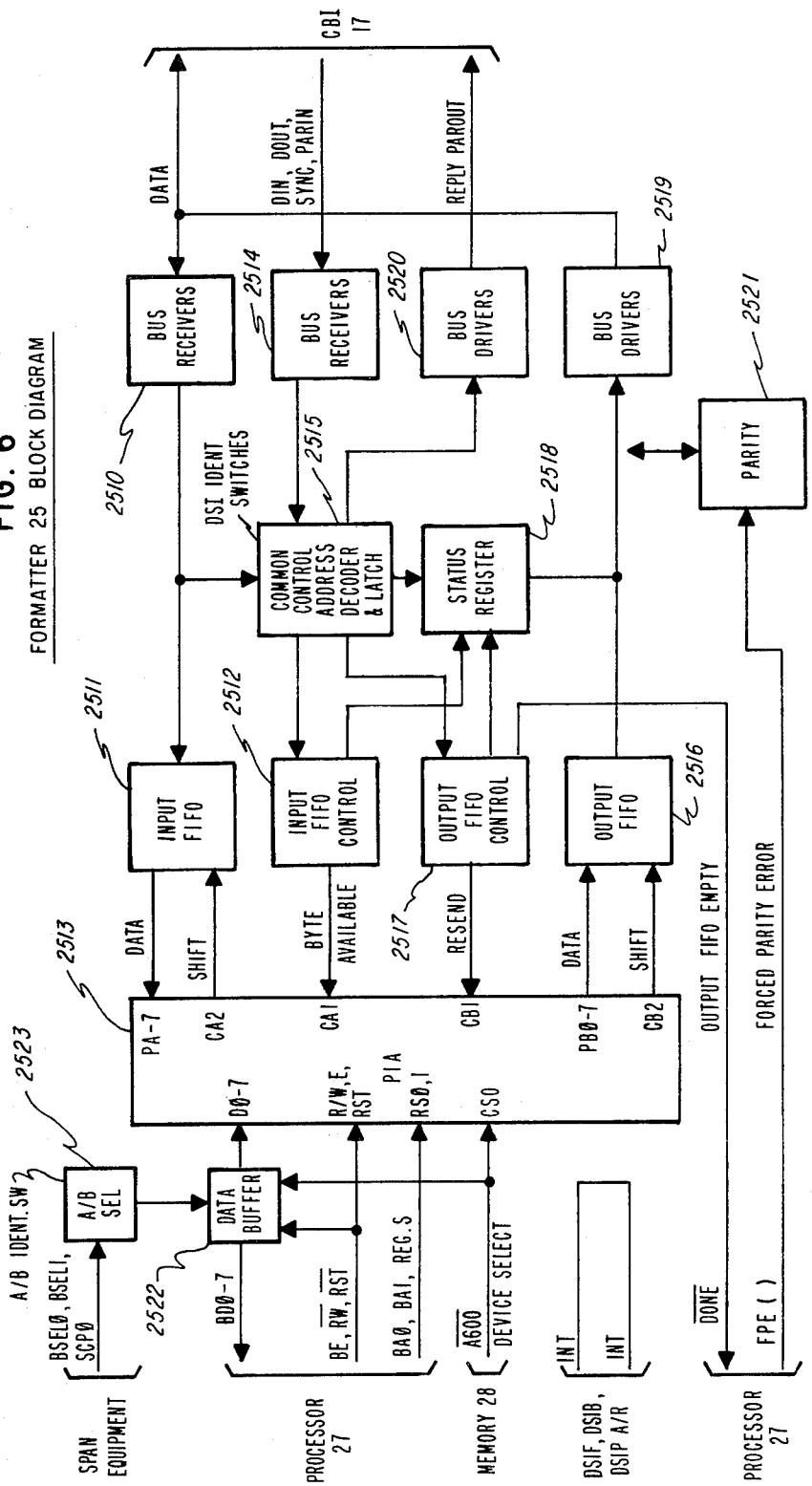
FIG. 6 is a detailed block diagram of the data paths in a formatter shown in FIG. 4.

As previously indicated, a formatter 25, as shown in FIGS. 4 and 6, receives data from a call processor and transfers it to the processor 27 in FIG. 4 and also transfer data from the processor 27 to the call processor. Communications through a formatter 25 are in the form of messages. Incoming messages are received from the bus drivers 1712 in FIG. 5 by bus receivers 2510 in FIG. 6. These messages are transmitted serially in 8-bit bytes and are transferred into a first-in/first-out memory (FIFO) 2511. An input FIFO control 2512 controls transfers into the input FIFO 2511 from bus receivers 2510 and out to a standard programmable interface adapter 2513. Whenever call processor 408 sends a message to the interface 14, it addresses the corresponding input FIFO 2511 and sends the data to be loaded in the input FIFO 2511 with corresponding control signals that are received in bus receivers 2514 and coupled to common control, address decoder and latch circuitry 2515. The input FIFO control 2512 responds by shifting data into the input FIFO 2511. As is known, data being input to such a FIFO automatically shifts to the output. When a data byte is at the output of the input FIFO, the input FIFO control 2512 generates a BYTE AVAILABLE signal to an input of the programmable interface adapter 2513 and thereafter the information is shifted from the input FIFO 2511 into data inputs of the programmable input adapter 2513 by means of SHIFT signals.

When a message is to be transferred to a call processor 408, it passes through an output FIFO 2516 under the control of an output FIFO control circuit 2517 When the output FIFO 2516 is empty, the control 2517 transmits a RESEND signal to the programmable interface adapter 2513. As a message is sent to the output FIFO 2516 over data lines, SHIFT signals are also sent. After the message is sent, the output FIFO control 2517 terminates the RESEND signal. In addition, the output FIFO control 2517 sets a SERVICE REQUEST bit in a status register 2518.

Each call processor 408 periodically addresses the status register 2518 in each formatter 25 and reads the status register through bus drivers 2519 along with control signals that are passed through bus drivers 2520. When the call processor 408 determines that the output FIFO 2516 contains a message, it addreses the output FIFO 2516 and reads successive message bytes as they are presented under the control of the output FIFO control 2517. When the message has been completed, the output FIFO control 2517 asserts the RESEND signal, thereby to enable another message to be sent.

As formatters 25 are included in each of several digital satellite interfaces that can connect to a call processor bus interface, a call processor 408 communicates with a specific formatter 25 by first identifying the digital satellite interface and then using common addresses to address the formatter. Thus, after the particular digital satellite interface has been selected, only the formatter in that interface will respond to subsequent signals even though the specific formatter address is common to all of the formatters. This condition exits until the call processor 408 transmits another message that unlatches and, thereby, "deselects" or releases the digital satellite unit.

A parity circuit 2521 checks all addresses and data to detect parity errors and set a parity error bit in the status register 2518.

A data buffer 2522 connects between the processor 27 and the programmable interface adapter 2513. It contains various connections to the processor 27 and the memory 28 that enable the programmable interface adapter 2513 to perform its control operations.

When the formatter is used in a network constructed in accordance with FIG. 2, one or the other of the call processing systems, identified as the "A" or "B" system, actually controls switching. An A/B selection circuit 2523 includes an A/B identification switch that is set in accordance with the connection of a formatter 25 to either the "A" or "B" call processor. The processor 27 will transfer data to the output FIFO's 2516 in both formatters 25A and 25B in FIG. 4. However, it will respond only to the formatter that is connected to the selected call processor 408A or 408B. Specifically, a SELECT A/B signal from the switchover control 301 in FIG. 2 and the span equipment appears as a BSEL0 signal in FIG. 6. This signal, when asserted, enables the data buffer 2523 in formatter 25A and disables the data buffer in formatter 25B so the "A" system controls call processing. When the BSEL0 signal is not asserted, the "B" system controls call processing. If span 0 span equipment 21 is removed, an SCP0 signal will be asserted and a BSEL1 signal, from span 1 equipment 23 which carries the same information, is utilized.

Figure 7:
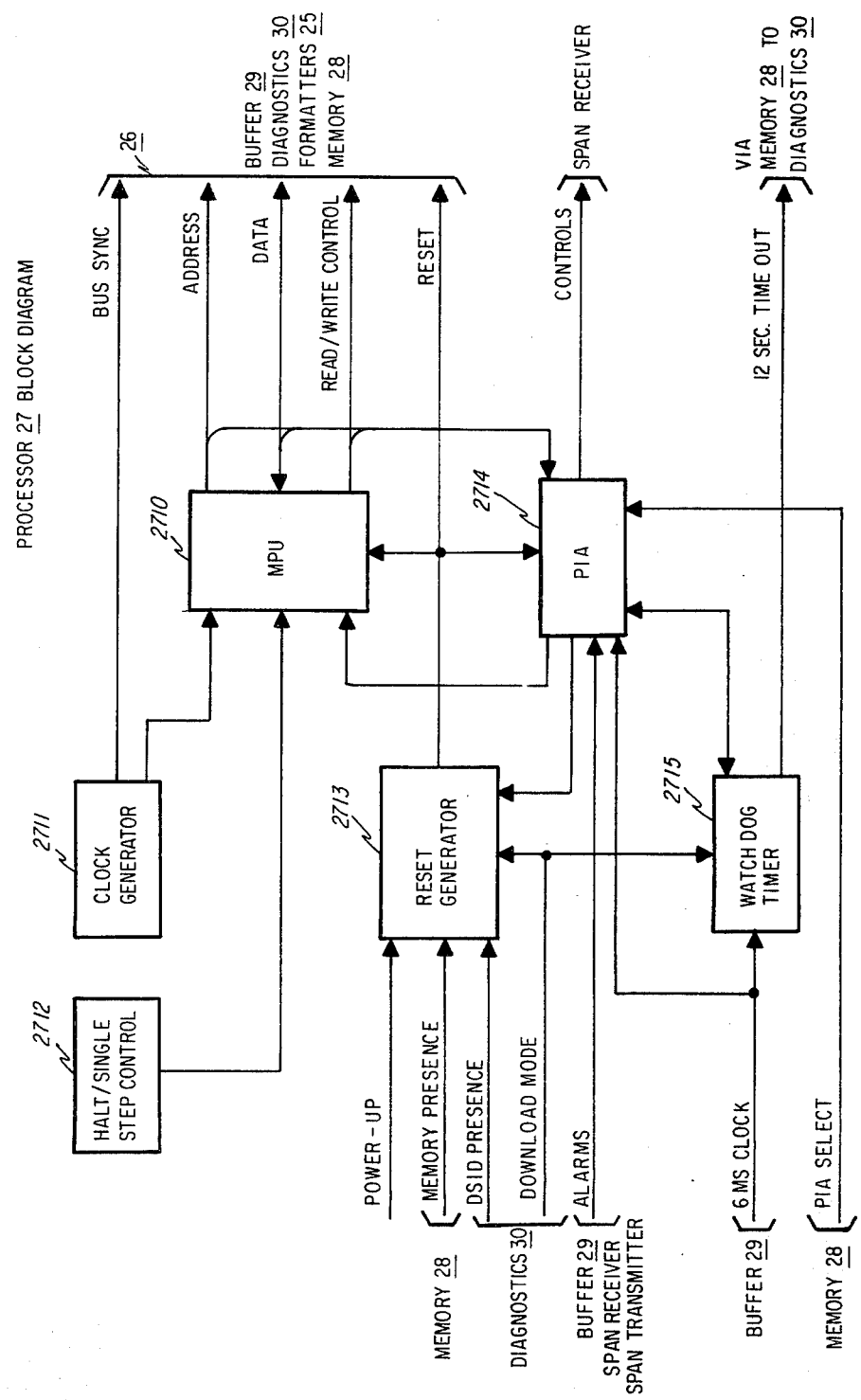
FIG. 7 is a detailed block diagram of the data paths in a processor shown in FIG. 4.
Figure 8:
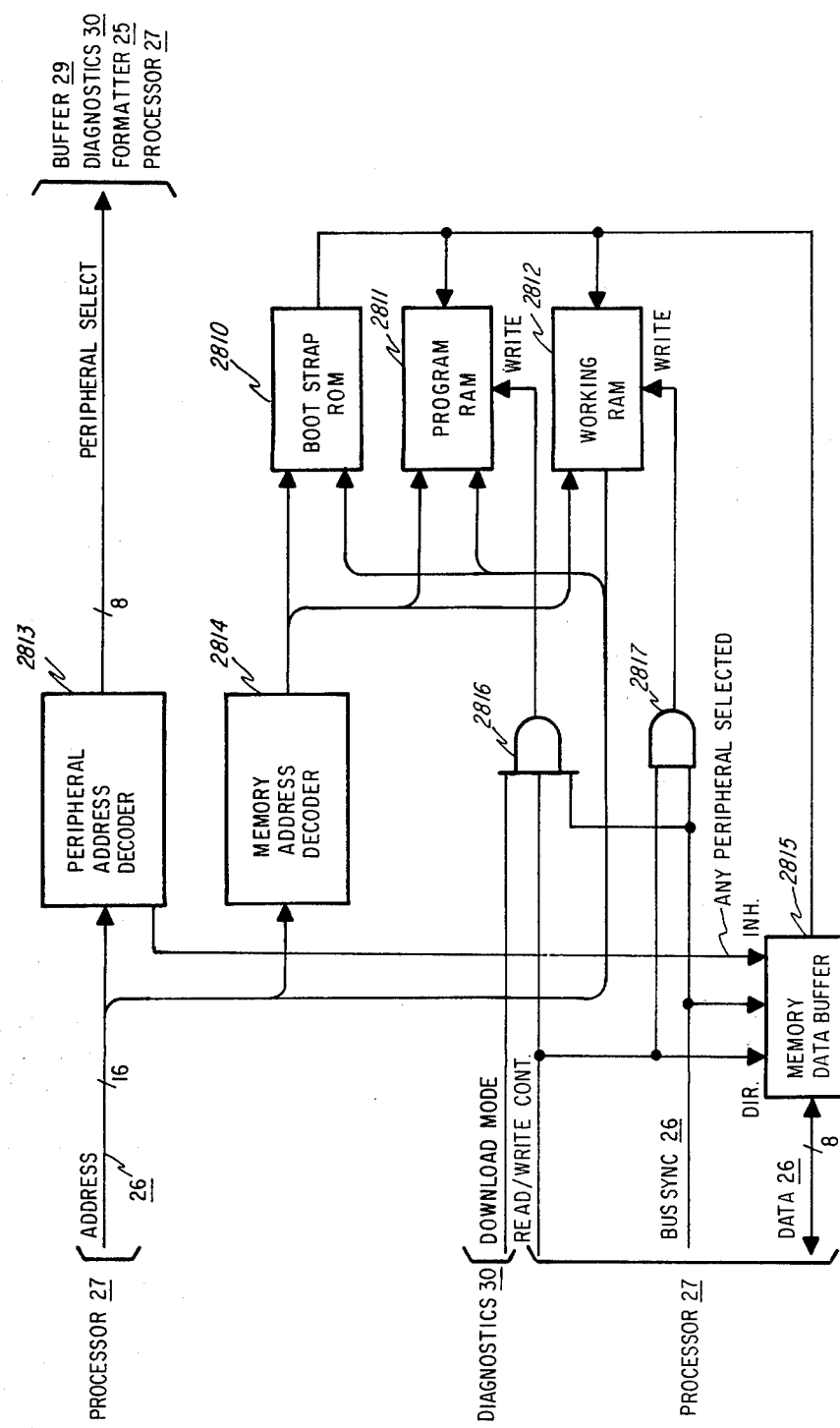
FIG. 8 is a detailed block diagram of the data paths in a memory shown in FIG. 4.

Communications between a call processor and the interface 14 shown in FIG. 4 also require interaction of the processor 27 and the memory 28. The processor 27 and memory 28 comprise a conventional, microprogrammed digital computer system. The processor 27 is shown in FIG. 7 and the memory 28 in FIG. 8. The processor 27, in this particular embodiment, is a Motorola 6800 microprogrammed digital data processing system. It includes a microprocessor unit (MPU) 2710 that connects to various other units including a clock generator 2711, a halt/single step control 2712, a reset generator 2713, a programmable interface adapter 2714, and a watchdog timer 2715.

The clock generator 2711 supplies various clocking signals required to sequence the MPU 2710 through its various processing steps. Every six milliseconds, or some other predetermined time, the buffer 29 generates a 6 MS CLOCK signal that interrupts the MPU 2710 through the programmable interface adapter 2714, thereby to initiate routine call processing or maintenance and administration actions that constitute a DSI control program. One such maintenance function, or action, is examination of alarm inputs presented to the programmable interface adapter 2714 from the buffer 29, the span receiver, and the span transmitter.

The halt/single step control 2712 provides a troubleshooting aid and allows the normal cycling of the MPU 2710 to be inhibited. The watchdog timer 2715 is normally periodically reset as the MPU 2710 performs various functions. If, however, the MPU fails to execute its functions in a normal mode that would reset the watchdog timer 2715, the timer 1715 times out and interrupts the MPU 2710 to initiate a recovery sequence.

The BUS SYNC, ADDRESS, DATA, READ/WRITE CONTROL, and RESET signals are applied to the bus 26 to be conveyed to the formatters 25A and 25B, memory 28, buffer 29, and diagnostics circuit 30 in FIG. 4. In addition, DATA signals can be received from each of these elements under the control of the other signals.

The memory 28 comprises a bootstrap ROM 2810, a program RAM 2811, and a working RAM 2812. The bootstrap ROM 2810 contains a small portion of program that is automatically addressed when a POWER-UP signal is applied to the reset generator 2713 in FIG. 7. Such bootstrap programs are well known. Addresses are applied to a peripheral address decoder 2813 and a memory address decoder 2814. A memory data buffer 2815 interconnects the data paths between the processor 27 and each of the memories 2810, 2811, and 2812. The memory data buffer 2815 is inhibited, however, if the peripheral address decoder 2813 decodes a peripheral address.

During any reset operation of the call processing system, the maintenance processor 300 (FIGS. 2 and 4) loads information into the program RAM 2811 and/or the working RAM 2812. Specifically, this is done when the diagnostics circuit 30 (FIG. 4) generates a DOWNLOAD signal and a WRITE signal. This will cause DATA signals, representing programs and a data base, to be loaded into both the program and working RAM's 2811 and 2812 as logical AND circuits 2816 and 2817 enable writing operations into these memories. Otherwise, only a reading operation can occur in response to ADDRESS signals from the processor 27.

The formats of messages that may be sent between the digital satellite interface 14 and the call processor 408 are depicted in FIGS. 9 and 10. Each message comprises at least one 8-bit byte. The first byte comprises a 4-bit group that identifies the message and a second 4-bit group that identifies the number of bytes in the message. Thus, the ORIGINATE message in FIG. 10 contains the hexadecimal value "05", where the "0" indicates the ORIGINATE message and the "5" identifies that the message contains a total of 5 bytes. An ORIGINATE message indicates a remote subscriber has gone off-hook. The second byte in the ORIGINATE message contains the calling ('ING) satellite line number (SLN) of the remote subscriber. The third byte contains an assigned channel number, the fourth byte contains a "all channels busy" delay count, and the fifth byte contains party identification bytes. The second, third, and fifth bits, then, completely identify the calling party and the channel number on the span equipment 15.

Figure 11:
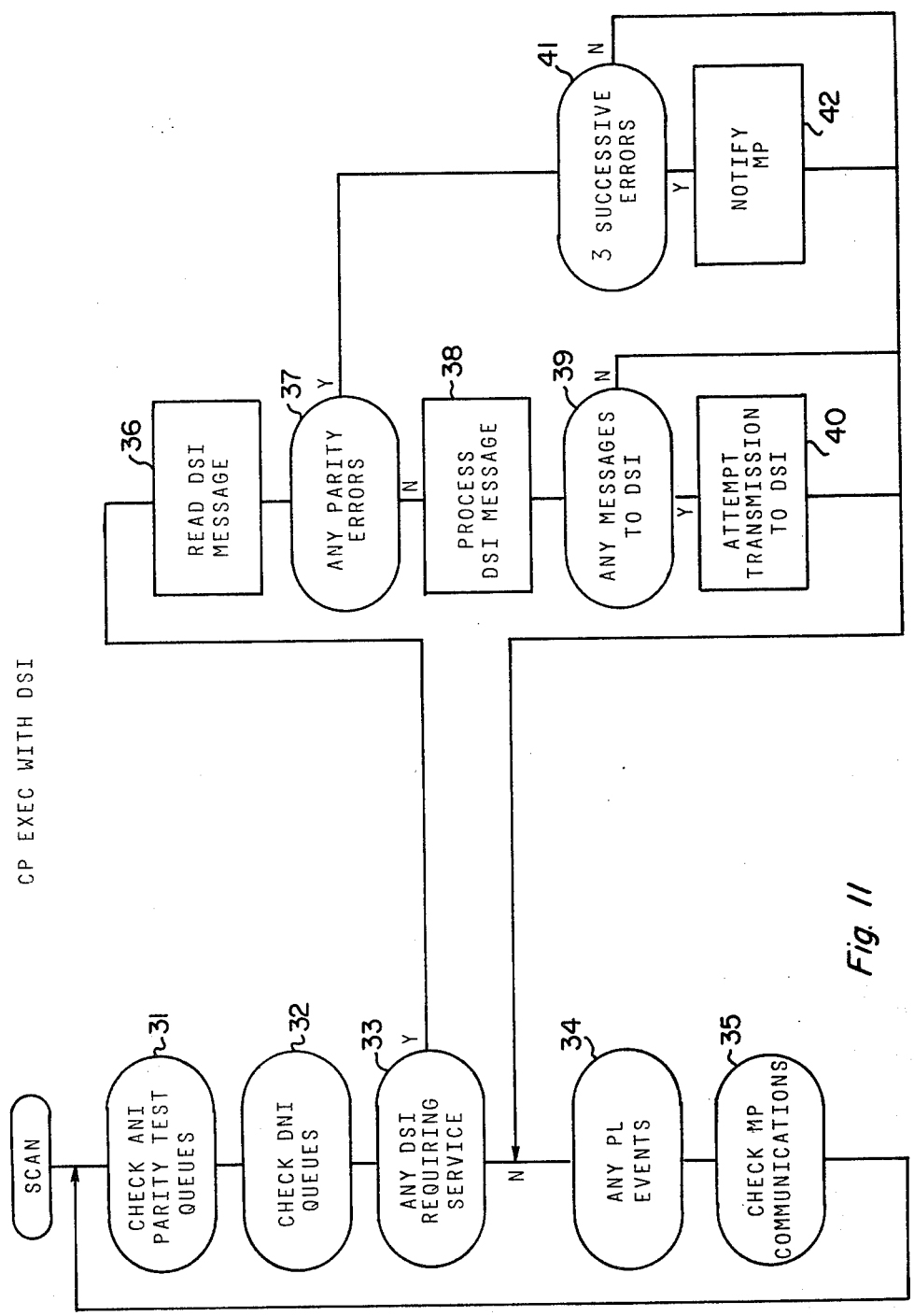
FIG. 11 is a generalized flow diagram of the control functions used by a call processor in receiving and transmitting the messages in FIGS. 9 and 10.

FIG. 11 is an overview of the call processor executive program performed by the call processing system in U.S. patent application Ser. No. 924,883, as modified by the addition of the digital satellite unit 13 and interface 14. In that original program, several sequences of tests were made. They are generally depicted without any decisions in FIG. 11 as sequence 31 in which the call processor checks ANI party tests queues and sequence 32 in which the call processor checks DNI queues. Sequence 33' is new and it and other new sequences are described later. If no digital satellite interface 14 requires service, the call processor uses sequence 34 to detect PL events and sequence 35 to determine whether any maintenance processor communications are required. Operations then loop back to sequence 31.

Now referring to sequence 33, if a digital satellite interface 14 does require service, operations shift to a series of sequences during which the call processor can read the message, process the message, and then transfer a message back to the digital satellite interface 14. Sequence 36 reads the message and, in sequence 37, determines if the parity circuit 1715 in FIG. 5 detected any parity errors. If no parity errors are detected, the message is processed in sequence 38. If a return message is to be transmitted to that interface 14, sequence 39 enables its transmission in sequence 40.

If a parity error is detected in sequence 37, sequence 41 determines whether parity errors have been detected during three successive attempts to transmit the message. If a fewer number of attempts have been made, sequence 41 completes by shifting operations back to sequence 34 and, as the request for service will not have been fully serviced, sequence 33 will again divert to sequence 36. If parity errors are detected during three successive attempts to transmit a message. however, the call processor 408 uses sequence 42 to notify the maintenance processor 300 of the error through its respective link circuits 106 or 206 (FIG. 2).

Figure 12A:
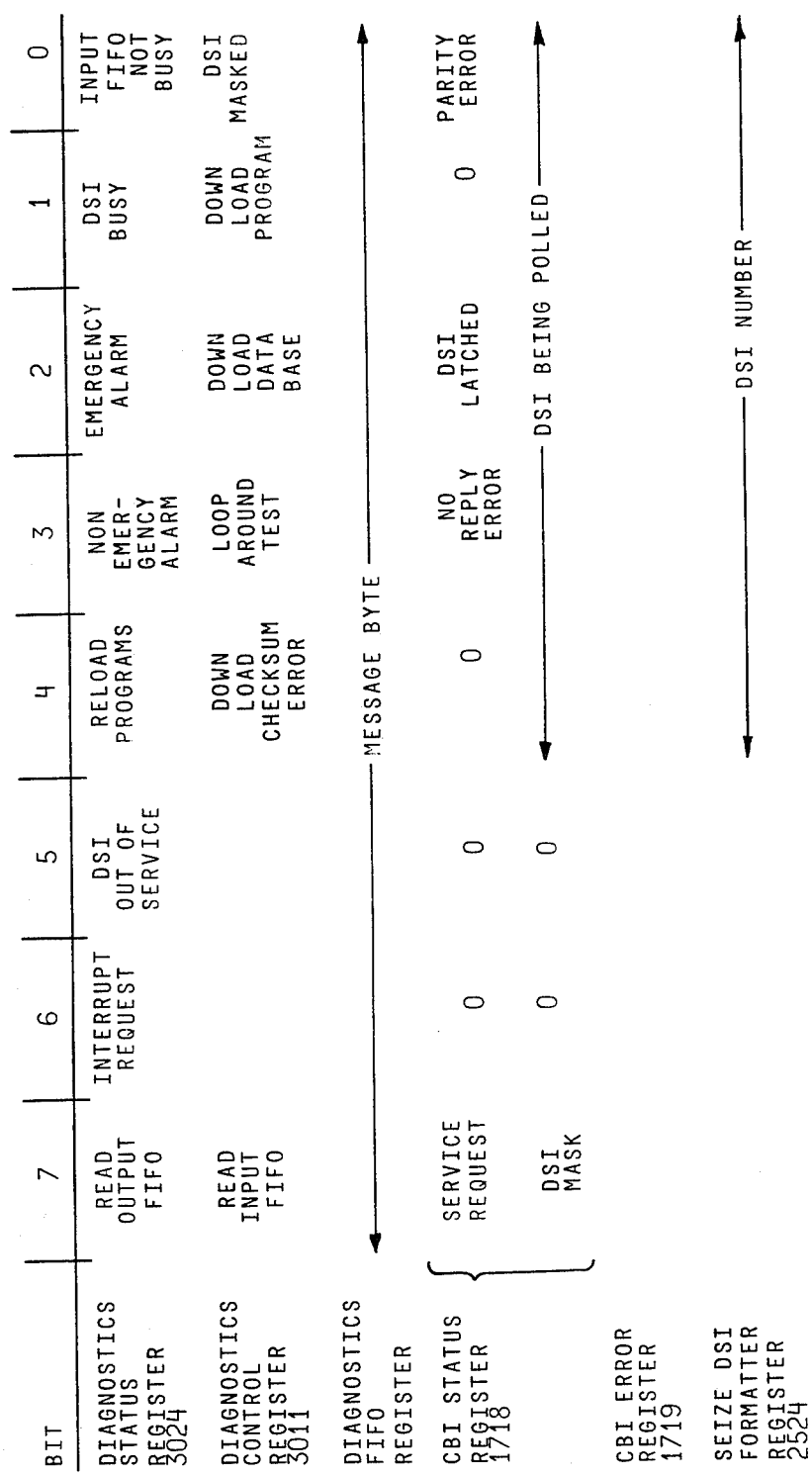
FIG. 12 comprises FIGS. 12A and 12B and is a memory map that depicts various memory locations and that is useful in understanding the flow diagram of FIG. 13.
Figure 12B:
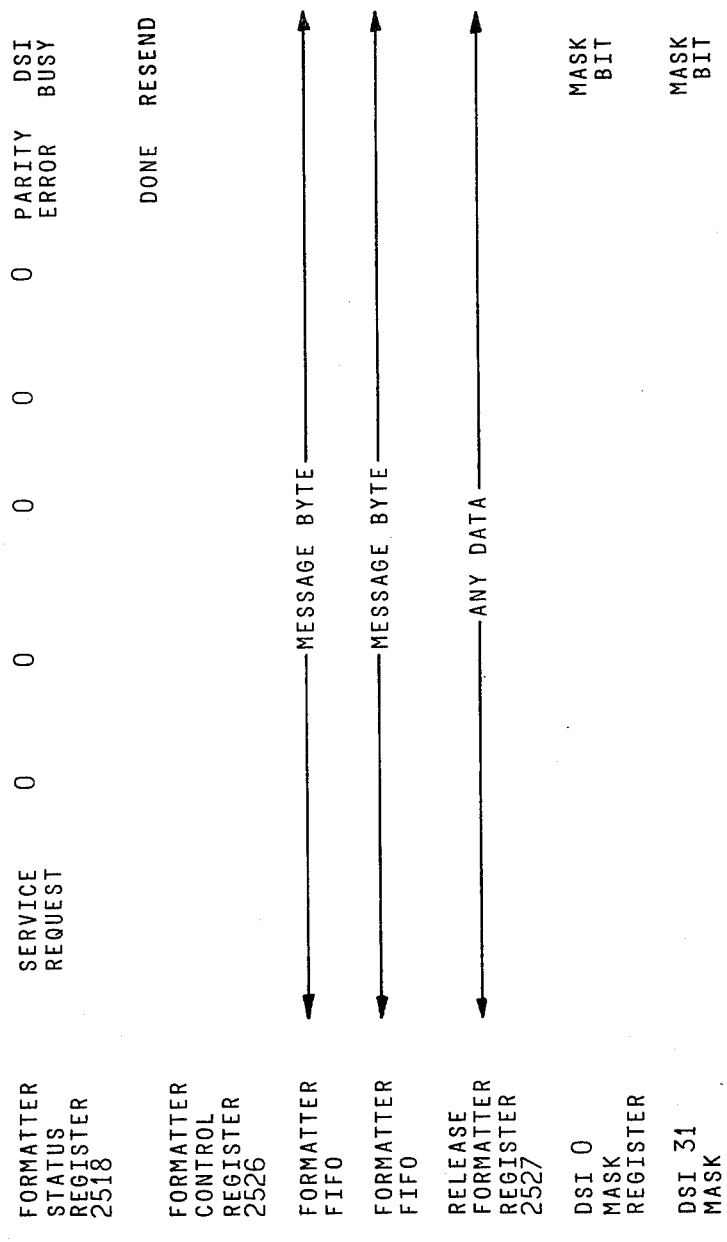
Figure 12:
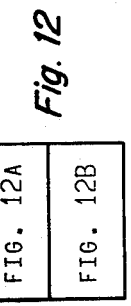

FIGS. 12A and 12B depict various registers that can be addressed by the call processor. Certain of these registers are used during the transmission and receipt of messages between the call processor and a digital satellite interface 14, as set forth in more detail in FIGS. 13A and 13B. If sequence 33 in FIG. 11 indicates that one of the digital satellite interfaces 14 requires service, the call processor processes sequence 36 shown in both FIGS. 11 and 13A. Specifically, at step 43 the call processor reads the CBI status register 1718 shown in FIGS. 5 and 12A. The CBI status register 1718 (FIG. 12A) comprises two 8-bit bytes. The most significant bit of one of the bytes is a "SERVICE REQUEST" bit which contains a "1" (i.e., is set) if the corresponding digital satellite unit is requesting service. This polling is accomplished under the control of the DSI counter 1716 in FIG. 5 so, in step 44, the satellite number is stored in a SEIZE DSI FORMATTER register 2524, (FIG. 12A) in the circuit 2515 (FIG. 6) that contains the DSI number in five least significant bits.

Then the call processor roads a data byte by performing a reading operation from the output FIFO 2516 (step 45). When this occurs, the data byte is transferred through data drivers 2519 onto the data path through the CBI 17 to the respective call processor 408. The call processor 408 reads the first byte and immediately determines the message length. If more message bytes are to be received, step 46 branches back to step 45 to read the successive data bytes from the output FIFO 2516. When the complete message is transferred, sequence 36 in FIG. 11 has been completed and sequence 37 tests for parity errors.

Figure 13A:
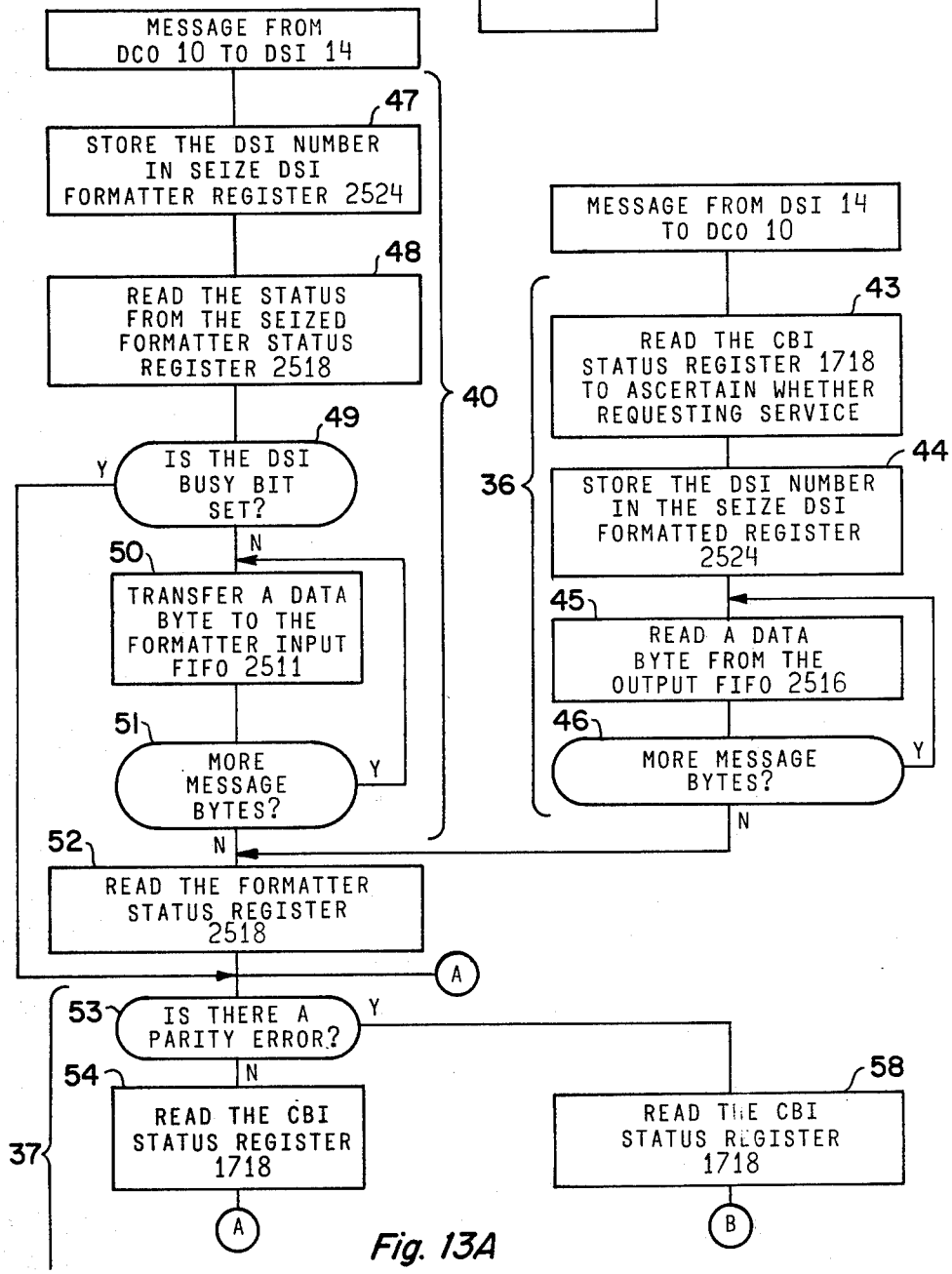
FIG. 13 comprises FIGS. 13A and 13B and is a flow diagram of the operations required to transfer messages between the call processor and the digital satellite interface shown in FIG. 4.
Figure 13B:
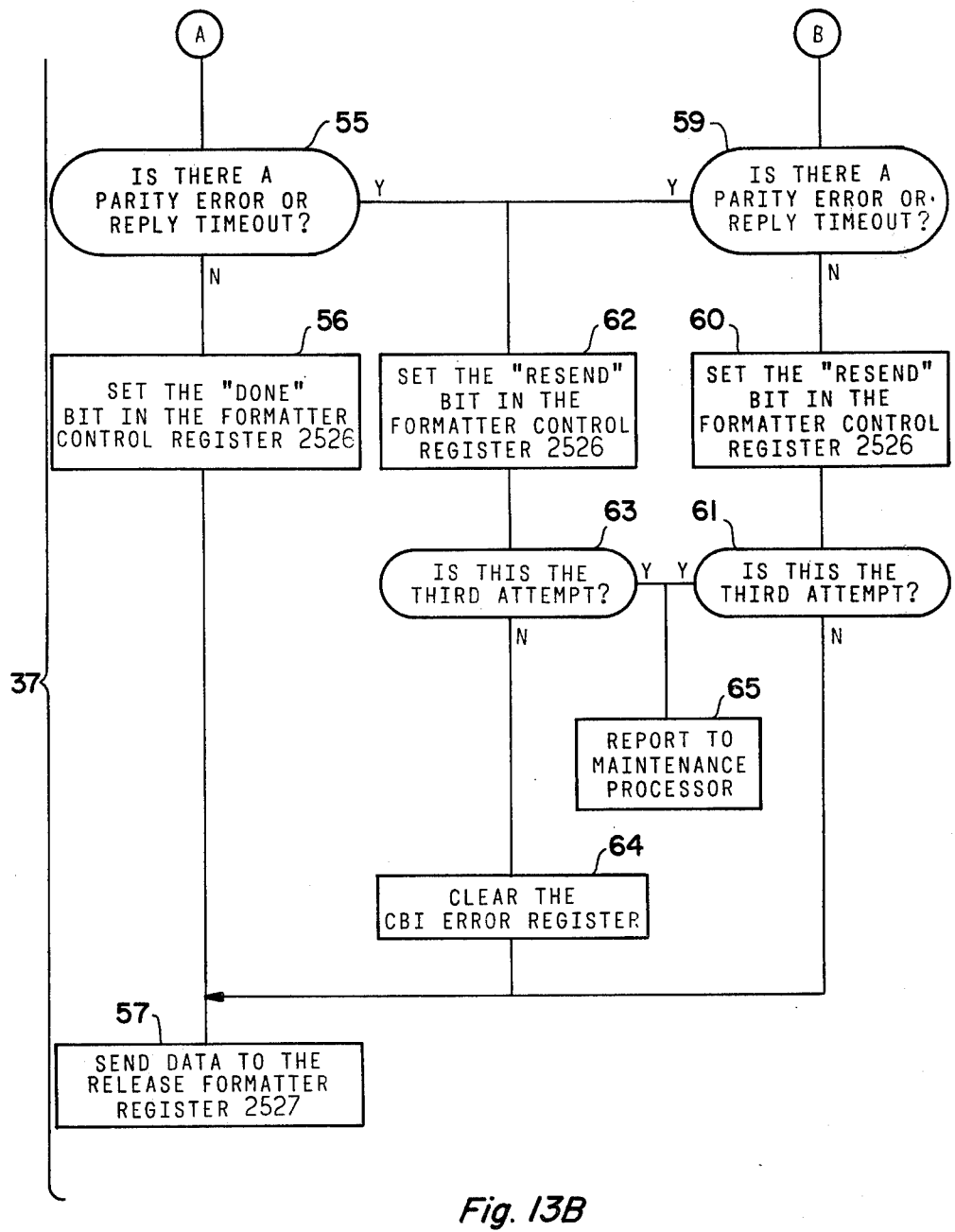

Sequence 40 in FIG. 11 is established by steps 47 through 51 in FIG. 13A. If a message is to be sent, the call processor 408 again stores the DSI number in the least significant bits of the SEIZE DSI FORMATTER register 2524 shown in FIG. 12A (step 47) and then reads the status register 2518 (FIG. 12B) seized formatter (step 48). As shown in FIG. 12B, the least significant bit is a DSI BUSY bit. If that bit is set, no message can be sent and step 49 bypasses steps 50, 51, and 52. However, if the DSI BUSY bit is cleared, a data byte is transferred to the input FIFO 2511 in FIG. 6. Again, the first byte identifies the total number of bytes in the message, so the call processor "knows" if additional message bytes are to be sent. If they are, step 51 branches back to step 50 until all the message bytes are sent, whereupon step 51 branches to step 52 so that formatter status register 2518 is read. The formatter status register 2518 is also read after a message is sent to the call processor based upon the branch of step 46.

The formatter status register 2518 contains a PARITY ERROR bit. If there is no indication of a parity error in the formatter status register, step 53 branches to step 54 in which the call processor reads the CBI status register 1718 in FIGS. 5 and 12A to determine if a parity error or a reply timeout has been detected at the CBI. The CBI status register 1718 includes a PARITY ERROR bit and a DSI LATCHED bit. If neither of these bits is set, step 55 branches to step 56 whereupon the call processor sets a DONE bit in a formatter control register 2526 located in the circuit 2515 in FIG. 6 (bit 1 in FIG. 12B) and then sends data to a fictitious release formatter register 2527 in step 57. A writing operation to the release formatter register 2527 address produces the release operation.

Now assuming that there is a parity error indicated in the formatter status register 2518, step 53 branches to step 58 where the CBI status register 1718 is again read. If there is no parity error and no reply timeout signified by bits 8 or 10 in the CBI status register 1718, step 59 branches to step 60 whereupon the RESEND bit in the formatter control register 2526 in the circuit 2515 is set. If this not a third attempt, step 61 branches back to step 57. As a result, the DONE bit is not set in the formatter control register 2526. Thus, the next polling of the DSI status register 2518 will show the need for a transmission to the call processor.

If there is a parity error or reply timeout detected in either of steps 55 or 59, operations transfer to step 62 which again sets the RESEND bit in the formatter control register 2526 in circuit 2515. In step 63 a test is made to determine if this is the third attempt to read or write the register. If it is not, step 63 branches to step 64 whereupon the appropriate one of the PARITY ERROR of DSI LATCHED bits in the CBI error register 1719, which has the same form as the CBI status register 1718 in FIG. 12A, is cleared. Then step 64 transfers operations back to step 57. If three attempts are made to transmit a message to or receive a message from the digital satellite interface 14, steps 61 or 63 will branch to step 65 whereupon the error is reported to the maintenance processor 300 over the communications path between the maintenence processor and the digital satellite interface 14 as described later.

D. Digital Satellite Interface -- Remote Digital Satellite Unit Path

Figure 14:
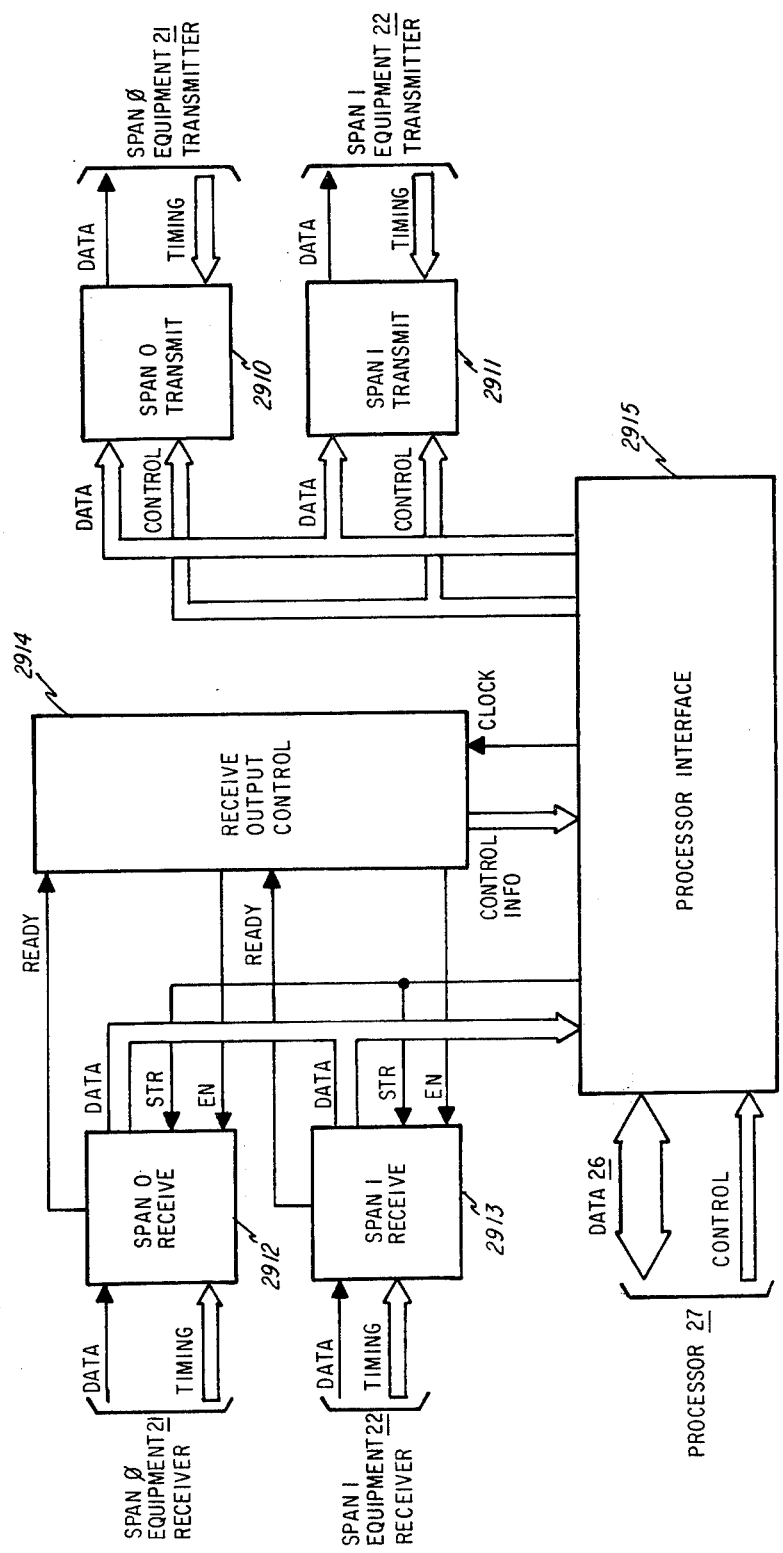
FIG. 14 is a detailed block diagram of the data paths for a buffer shown in FIG. 4.

Referring again to FIG. 4, the communications path between the digital satellite interface 14 and an associated digital satellite unit 13 includes, at the central location, the buffer 29, span equipments 21 through 23, and the office repeaters 24 that connect the span equipments to the span 15. The buffer 29 enables communications between the processor 27 and the remote units of the system, using the "B" signalling bits, and is shown in FIG. 14. It includes two span transmit sections 2910 and 2911, two span receive sections 2912 and 2913, a receive output control circuit 2914, and a processor interface 2915 constituted by a conventional programmable interface adapter that is compatible with the processor 27 in FIG. 4.

Each of the transmit sections 2910 and 2911 has the same construction, and each receives data from the processor 27 by way of the processor interface 2915. Each contains a FIFO with serial/parallel, input/output capabilities. The processor interface 2915 provides data signals in parallel and control signals for shifting in data and indicating the loading of data. Moreover, each of the transmit sections 2910 and 2911 receives an enabling input that controls whether the data is routed to span 0 transmit section 2910 or span 1 transmit section 2911.

Each SHIFT IN STROBE signal causes data to be loaded in parallel into a FIFO input register and then to ripple through the FIFO to the output register. When the data has been loaded, the processor 27 asserts DATA LOADED signal that sets a latch on both transmit sections to provide an input to a span output enable latch.

Timing signals from the transmitter in the corresponding span equipment include a synchronizing signal that will set the output enable latch on the first synchronizing signal following the assertion of the DATA LOADED signal. This enables the corresponding FIFO outputs in the sections 2910 and 2911 so that the data is shifted serially on a strobe provided by the transmitter section in the span equipment at a time corresponding to the "B" signalling bit times. Whenever the DATA LOADED signal is not asserted between two successive synchronizing signals from the span equipment, neither of the FIFO outputs will be enabled in the transmit sections 2910 and 2911 so that a sequence of "1"'s, representing an "IDLE" message (FIG. 16), will be transmitted onto the spans as the "B" signalling bits.

The span 0 receive section 2912 and span 1 receive section 2913 contain identical circuits, including FIFO's that receive incoming span data from the span equipment receivers in response to a STROBE signal provided by the receivers. Other timing signals include a SYNC pulse, that clears the FIFO and associated receive counters, and a message received indication prior to the reception of a SPAN message. More specifically, incoming data, in serial form, is shifted into the FIFO's by the strobe signal. Then the receive counter is incremented until it indicates that all the "B" signalling bits (24 bits in the specific example shown in FIG. 3) have been received. When this occurs, a SPAN MESSAGE RECEIVED signal is asserted.

After each SYNC pulse is received by the corresponding receive sections 2912 and 2913, the receive output control 2914 alternately enables the outputs of the receive sections 2912 and 2913, searching for a message other than an IDLE message. When such a message is received SPAN RECEIVE MESSAGE READY signal is asserted to set a flag in the processor interface 2915. Each SYNC pulse from either span clears the SPAN RECEIVE MESSAGE READY signal. When the processor 27 reads the processor interface 15, it also clears the corresponding flag.

The processor interface 2915 provides the processor 27 with an indication of which span has the incoming message. This is accomplished by means of a FIFO ENABLE signal that indicates the span 1 receive section 2913 when it is asserted and the span 0 receive section 2912 when it is not asserted. The processor 27 obtains the data by parallel extraction of the enabled FIFO's output register. Each reading operation is followed by a shifting of the information in the corresponding FIFO, under the control of SHIFT OUT pulses, so the successive groups of bits are received. Each SHIFT OUT pulse also sets an OUTPUT REGISTER EMPTY signal, causing an empty indication counter to be incremented. The empty indication disappears following the next SHIFT OUT pulse unless the entire message has been extracted from the receive section 2912 or 2913.

The office repeaters 24 in FIG. 4 are transparent to all BUS signals. They eliminate noise and ground potential differences caused by noncontiguous placement of interfaces. They comprise differential receivers and differential drivers for producing transfers over the span equipment 15. Therefore, there is no need for a further description of the repeaters 24.

Figure 15:
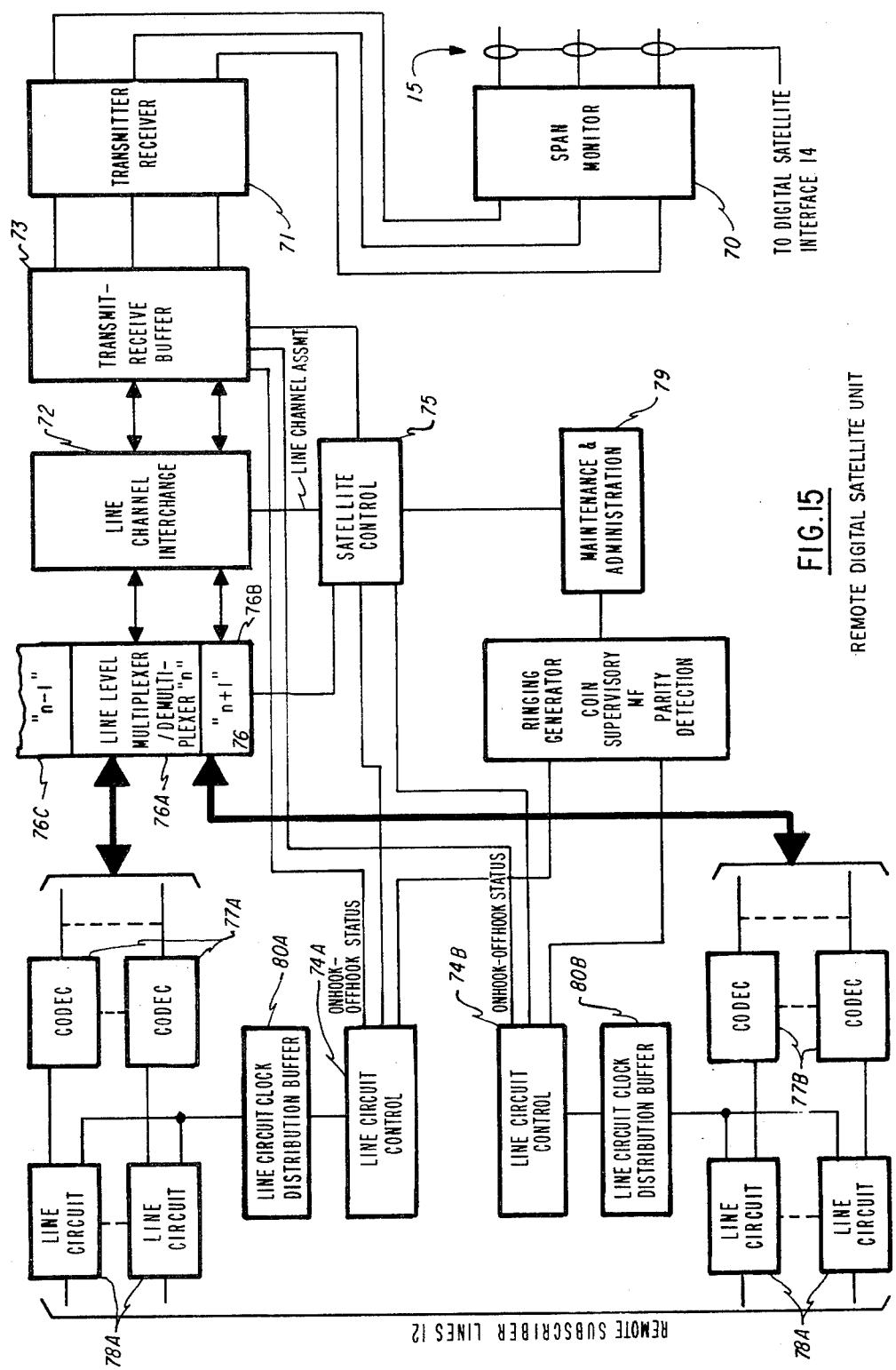
FIG. 15 is a block diagram of a remote digital satellite unit shown in FIGS. 1 and 2.

FIG. 15 is a basic block diagram of a typical/remote digital satellite unit. The individual paths in the span 15 connect to a span monitor 70. The span monitor 70 reports alarm conditions upon detection of a faulty waveform (specifically, bipolar violations), pulse voids, or sustained synchronization fault (so-called "carrier group alarm condition") during the pulse code modulation transmission. If one of the spans is operating as a backup span, the span monitor 70 provides circuitry for performing the necessary switching to the backup span in place of a faulty span under the control of messages from the digital satellite interface. It also responds to the incoming signals to generate the basic clock waveforms that are required for the operation of the unit.

The span monitor 70 also connects to a transmitter/receiver circuit 71. The transmitter portion receives digital voice data signals in pulse code modulated form from a line channel interchange 72 together with an identification of the span channel that is to carry that information and inserts the data signals into the bit stream being transmitted onto the span at the appropriate channel time. The transmitter also injects the proper framing synchronizing signals such as shown in FIG. 3. Moreover, the transmitter derives functions necessary for a transmit-receive buffer 73, which inserts the "A" and "B" signalling bits during frames 6 and 12 of each superframe.

The receiver portion of each circuit 71 receives signals from the span 15, converts them into a form that is compatible with the remainder of the circuit, and derives a clocking signal. Necessary timing functions are provided so that the "A" and "B" signalling bits can be extracted. The receiver utilizes the identification of the channel from the line channel interchange 72 to route each eight-bit word (see FIG. 3) into an appropriate storage location in interchange 72. The receiver can also generate a frame alarm any time it does not detect the correct synchronizing pattern.

The transmit/receive buffer 73 also monitors the hook status information from line circuit controls 74A and 74B and extracts information from incoming messages to be utilized by a satellite control 75. In addition, the buffer 73 responds to polling operations by inserting bits into a data stream at the correct time to indicate a need to communicate with the call processor, as described later.

The line channel interchange 72 controls the transfer of voice data signals between multiplexing and demultiplexing circuits 76 and the transmit/receive buffer 73 and transmitter/receiver 71. The line channel interchange 72 also provides the necessary timing to ensure that the correspondence between a channel and a line is maintained.

The line level multiplexer/demultiplexer circuit 76 gathers data representing voice data received in digital form from several CODEC circuits 77A and 77B (hereinafter generally referred to as 77) associated with a group of line circuits 78A and 78B (hereinafter generally referred to as 78). In a particular embodiment, this circuit contains one or more circuits that connect to forty-eight line circuits 78. The circuits arrange this data into an 8-bit wide format which may then be interrogated by the line channel interchange 72 through appropriate addressing techniques. Similarly, the demultiplexing circuitry in each line level multiplexer/demultiplexer circuit converts signals received from the line channel interchange 72 into a format appropriate for transfer into the corresponding CODEC circuit 77, where the information is converted into analog form for transmission to a remote subscriber through an appropriate line circuit 78. The CODEC circuits 77 and line circuits 78 operate as discussed in U.S. Patent Application 924,883.

Messages from the digital satellite interface 14 are routed from the buffer 73 to the satellite control 75. The satellite control 75 decodes these messages and sends appropriate signals that pertain to remote channel assignment messages to the line circuit controls 74A and 74B. It also sends remote line channel assignments and line disconnect messages to the line channel interchange 72 and decodes information to be sent to a maintenance and administration circuit 79. These messages are encoded in the "B" signalling bits.

The line circuit control circuits 74A and 74B (hereinafter generally referred to as 74) perform a number of functions. They process all originating requests; that is, when a subscriber takes his telephone off-hook, a corresponding line circuit control circuit 74 responds. Each line circuit control 74 assigns channels on the span and disconnects lines as directed by the digital satellite interface 14. The circuits 74 also control party identification processing and encode ORIGINATE messages with the proper party information. They process all terminating traffic, control ring trip, supply hook status information to the digital satellite interface 14 by properly encoding the "A" signalling bits, and perform a number of other functions. In one specific embodiment, each line circuit control circuit 74 can accommodate up to 120 line circuits.

Each line circuit control circuit 74 is coupled to the line circuits 78 through a line circuit clock distribution buffer circuit 80. This circuit sequences and buffers data between the line circuit control 74 and the line circuits 78.

As will now be apparent, each of the call processors 408, the digital satellite interfaces 14, and the remote digital satellite units 13 have the capability of performing a number of functions independently and then communicating various items of information. This information is communicated by messages that are conveyed between the digital satellite interface 14 and the remote digital satellite unit 13 over the spans 15. It will now be helpful to discuss the content of these messages and the general sequence of operations in each of the units.

The digital satellite interface 14 operates by polling all the remote digital satellite units 13 connected to it by sending polling information during each of the B signalling times. As is apparent from the prior discussion and inspection of FIGS. 3, 16, and 17, each message comprises 24 bits. Referring to FIG. 16, a POLL message comprises 24 bits arranged in 4-bit groups that are represented in hexadecimal notation. The POLLING message has a code byte "1" followed by ten 1's and ten 0's, hence the hexadecimal sequence "FFC00". The entire POLL message (i.e., "1FFC00") is sent serially through each remote digital satellite unit 13 and is returned as a POLL RESPONSE message shown in FIG. 17 during the same frame. There is a positional correspondence between the positions of each of the ten 1's and ten 0's and each of the units 13. If a particular digital satellite unit 13 wishes to communicate with the digital satellite interface 14, it reverses the bits in the corresponding positions in the POLL message. For example, if a third digital satellite unit 13 (e.g., at location C in FIG. 1) desires service, the poll response will be "1DFC80".

An analoqous TEST POLL message and corresponding TEST POLL RESPONSE message are shown in FIGS. 16 and 17 and identified by a code "5". The sequence of bits following the code in the TEST POLL message is the same as in the POLL message; that is, the TEST POLL message is "5FFC00". During a test poll, however, each remote digital satellite unit 13 alters its corresponding bits, whether service is requested or not. If any remote unit is connected, then the TEST POLL RESPONSE message should be "5003FF". Other messages will be discussed as this invention is described.

A further discussion of FIG. 18 will enable a better understanding of the operation of the digital satellite interface 14 during the transmission and reception of the POLL and POLL RESPONSE messages. When the system is energized, a start-up sequence is executed and the system is initialized (step 81). During a first step 82 in sequence "IRQP", the processor 27 awaits the completion of a predetermined interval that corresponds to an interruption rate. "IRQP" and other mnemonics in ellipses throughout the figures are identification points and will help in coordinating the flow of operations that are described in this particular figure and other more detailed figures.

Each time an interruption occurs, step 82 branches to step 83, whereupon the processor 27 tests various conditions, described later, and, in response to those conditions, transmits or processes messages (step 84). If a message is to be sent, step 84 branches to an "HSKPG" sequence, shown in FIG. 18B. Otherwise, control transfers to step 85 in an "RMS" sequence, wherein the processor 27 determines whether a transfer is to occur to the maintenance processor 300. If such a transfer is to occur, step 54 branches to the "HSKPG" sequence in FIG. 18B.

When a test poll should occur, the polling sequence "PTPG" begins at step 86. The TEST POLL message "5FFC00" is sent in step 87 and the TEST POLL RESPONSE, which should be "5003FF", is tested in step 88. If satisfactory results are obtained, the polling sequence is complete and control passes to the "HSKPG" sequence. Otherwise, certain diagnostic processing is performed in step 89 before control passes to the "HSKPG" sequence.

If it is time for polling but not a test poll (step 86), control passes from step 86 in FIG. 18A to step 90, whereupon the digital satellite interface 14 transfers the POLL message ("1FFC00") shown in FIG. 16. The POLL RESPONSE message shown in FIG. 17 is then tested in step 91 and, if no digital satellite unit 13 has requested service, operations transfer to the "HSKPG" sequence.

It is possible that multiple requests for service exist in a POLL RESPONSE message. The control programs in the digital satellite interface 14 arbitrate any such multiple simultaneous requests and determine which of multiple remote digital satellite units 13 requesting service will be accepted. Each remote digital satellite unit 13 has a number assigned to it and this number is called a remote group number. Thus, when any contention has been resolved, the digital satellite interface 14 sends a POLL ASSIGNED message (FIG. 16) with a first byte of "7" in step 92. The next byte is the remote group number that identifies one of the possible remote digital satellite units 13; the remaining bytes are all zeroes. Only the designated remote digital satellite unit will respond to the POLL ASSIGNED message.

The digital satellite unit 13 processes a returned message and transfers the message to the digital satellite interface 14 during the next twelfth frame time of the next superframe. More specifically, if the POLL ASSIGN message in FIG. 16 is successfully processed, the remote digital satellite unit 13 transmits an OK message Ex0000, where "x" is "1" if the transmission will be over span O and "2" if the transmission will be over span 1, represented by the setting of S0 and S1 bits in a second byte in the OK message shown in FIG. 17. Then that message is processed by the digital satellite interface in step 93.

After step 93 or in response to other branches depicted in FIG. 18A, the "HSKPG" sequence begins, whereupon an ALL CHANNELS BUSY counter and timer are updated in step 94 and the memory 28 is tested in step 95. Various flags and timers are cleared or set to specific values in step 96 and then the system prepares for a new interrupt in step 97. When this has been completed, control passes back to step 82 and the "IRQP" sequence shown in FIG. 18A.

E. Basic Call Processing

It now will be helpful to describe a typical operation of a telephone switching system in response to telephone calls that originate on one of the remote subscriber lines 12 and also that terminate at one of the remote subscriber lines 12. First, assume that one subscriber, a calling subscriber, in the telephone network is calling another subscriber, a called subscriber. The calling subscriber's line 11 is the "CALLING" or "'ING" line, while the called subscriber's line is the "CALLED" or "'ED" line.

The digital central switch includes in its memory information that identifies every telephone number and whether that number corresponds to a local line 11 or one of the remote lines 12. For a remote line 12, the memory contains a satellite line number (SLN) that uniquely identifies each remote line 12.

When a remote line 12 is the "'ED" line, the call processor sends a 5-byte TERMINATE message, shown in FIG. 9. This message identifies the satellite line number for the "'ED" line, and the port number of the CALLING line. It also contains other information that is useful in completing the call. If the message is properly received, the digital satellite interface tests a GST signal in the TERMINATE message that indicates a ground start. If the bit is set, the digital satellite interface 14 sends a ground start message, specifically a unique DSI STATUS message (see FIG. 10) to the call processor 408.

Otherwise the interface 14 processes the TERMINATE message and sends a CONNECT message that is shown in FIG. 10. This message has a command value "2" and includes six bytes. The second byte contains the 'ED SLN and the third byte contains an assigned channel number which identifies the time slot on the span 0 or span 1 equipment that will be used. This assignment is made by the digital satellite interface 14. The fourth and fifth bytes contain the DCO's 'ING port number that was sent to the DSI in the TERMINATE message. If the digital central office 10 in FIGS. 1 and 2 establishes a path from the calling subscriber line to the called subscriber line, a RING LINE message, shown in FIG. 9, is sent. The RING LINE message identifies the 'ED SLN and includes ringing control and ringing type bytes. The ringing control byte identifies the calling and called frequencies and the ringing type bytes identify whether normal, emergency, re-ring revertive, or cease ring operations are to occur.

When this sequence is complete, the digital satellite interface 14 sends a TERMINATE message to the remote digital satellite unit 13. This message is shown in FIG. 16, with a code of "8". It includes the ring code received from the RING LINE message in FIG. 9, the satellite line number (SLN), the assigned channel number, and the span number. When this message has been sent, a MESSAGE COMPLETE message "71" in FIG. 10 is transmitted by the digital satellite interface 14 back to the call processor 400.

At this point, the 'ED line, or called line 12, rings. When the subscriber answers the phone, the remote digital satellite unit 13 senses the OFF-HOOK signal and stops the ringing. Moreover, at this time the "A" signalling bits shift to an off-hook value, so the digital central office can connect the calling line to the assigned channel on the T1 span through a corresponding time slot in the port group highway, whereupon the call proceeds.

When a calling subscriber takes a line off-hook, the corresponding remote digital satellite unit 13 requests service in response to a POLL message from the digital satellite interface 14. When a POLL ASSIGNED message for that digital satellite unit is received, the response is not the OK message shown in FIG. 17. Rather, an ORIGINATE message, having a code "2", is sent that also identifies the satellite line number. It also includes a disconnect (DS) bit, a send try fail (SF), a party update (PU), and party identification (PI) bits. In response, the digital satellite interface 14 determines whether the line load controls are properly operating. If not, the digital satellite interface 14 sends a LINE CONTROL message shown in FIG. 16 with a disconnect (DS) bit set. If the line load control is operating properly, the digital satellite interface 14 then determines whether all available channels on the span are busy. If they are, the satellite line number (SLN) Is loaded into an all channels busy queue and will be eventually transferred out of the queue as the channels become free.

Once a channel is available and selected by the digital satellite interface 14, it sends an ORIGINATE RESPONSE message with a code "8" shown in FIG. 16 back to the remote digital satellite unit 13. This message includes the satellite line number, the span number, and the channel number. The digital satellite unit interface 14 also sends an ORIGINATE message (FIG. 10) having a first byte "05" to the call processor 408. This message includes the 'ING SLN, the assigned channel number, an all channels busy delay count, and the PARTY ID. If an automatic test is being performed, then operations divert to an autotest sequence described later. Otherwise, the digital central office will attempt to establish a path for a dial tone.

When the remote subscriber receives the dial tone, the subscriber will begin to dial and transmit dial digits. These digits are encoded in the "A" signalling bits that are transferred over the port group highway in the "A" bit of the corresponding channel. Then the digital central office will complete the call processing by transferring the call to the 'ED line. If the satellite line number requires some answer supervision, the digital central office will send a LINE CONTROL message shown in FIG. 9, having a first byte value "23" with the satellite line number and other information. Otherwise, the process is completed and the call proceeds.

When a remote subscriber line 12 is either the originating or the terminating line, the completion of a telephone call requires that the remote subscriber line be disconnected from the call processor. Under normal call processing, the call processor ascertains whether a given telephone line has become idle. If it has, and the line involved is a remote subscriber line 12, the digital central office sends a DISCONNECT message, shown in FIG. 9 with a first byte "12" and the satellite line number to the digital satellite interface 14. Although the DISCONNECT message shown in FIG. 9 is sent in this particular instance, lines can also be disconnected by the CHANNEL DISCONNECT and LINE CONTROL messages. However, with a normal DISCONNECT message the digital satellite interface receives that message and determines whether the channel assignment has been sent to the remote digital satellite unit 13. If it has not, the digital satellite interface 14 transmits a LINE CONTROL message (code equal "9") with the disconnect (DS) bit set. If the channel assignment has been sent, then the digital satellite interface 14 sends a LINE CONTROL message with a remote line control disconnect (RD) set and a single party line (SP) bit set or cleared. If the channel assignment has been sent to the remote digital satellite unit 13, the LINE CONTROL message is sent with the disconnect (DS) bit set and the single party line bit either set or cleared.

Assuming that the remote digital sattellite unit receives the DISCONNECT message, as indicated by the receipt of an OK message, the digital satellite interface 14 then sends a CHANNEL DISCONNECT signal to the call processor. This message, shown in FIG. 10, identifies the satellite line number and the assigned channel number. In addition, the digital satellite interface makes the channel available for subsequent calls. If the satellite line number is on-hook, subsequent processing by the digital satellite interface 14 terminates. However, if the remote subscriber is still off-hook the remote digital satellite unit 13 sends a special ORIGINATE message with the disconnect (DS) bit set to operate as a DISCONNECT message. Then the digital satellite interface 14 sends a RELEASE message, shown in FIG. 10, to the call processor and the call processor updates its control information by indicating that that satellite line number is now idle. This completes the disconnection procedure.

F. Maintenance Processor—Digital Satellite Interface Path

The communications path for maintenance purposes between the digital central office 10 and digital satellite interface 14 shown in FIG. 4 includes the MBI buffer 18, that connects to the maintenance processor (MP) 300, and the diagnostic circuit 30, that interconnects the MBI buffer 18 and the busing structure 26. The MBI buffer 18 is shown in block diagram in FIG. 19. Like the call processor bus interface (CBI) 17, the MBI buffer 18 provides a buffered interface between the maintenance processor 300 and the digital satellite interface 14. This path transfers diagnostic information between the digital satellite interface 14 and the maintenance processor 300 and also loads programs into the memory 28 on FIG. 4 from the maintenance processor 300. Each MBI buffer 18 can connect to 30 digital satellite interfaces 14. However, like the call processor bus interface 17, the circuitry is essentially transparent in operation.

Figure 19:
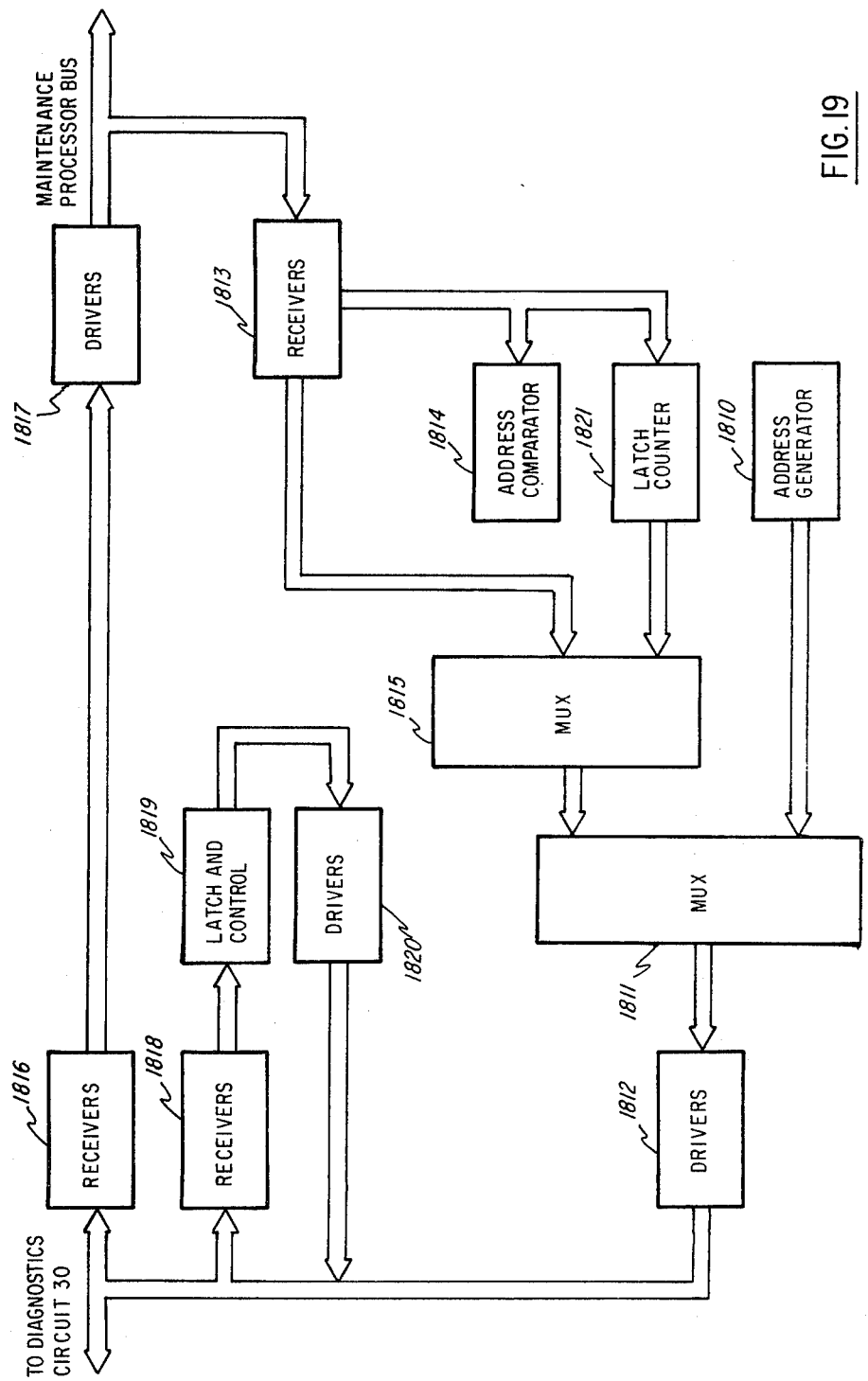
FIG. 19 is a block diagram of a maintenance interface buffer shown in FIG. 4.

The MBI buffer 18 has two modes of operation. When the MBI buffer 18 is not in use, polling occurs. In FIG. 19, an address generator 1810 produces addresses identifying the diagnostic circuit 30 in each digital satellite interface in succession. A multiplexer 1811 is enabled in this polling mode to couple the signals from the address generator 18 through drivers 1812 to the diagnostic circuits 30. If the digital satellite interface identified by the address desires to transmit a message to the maintenance processor 300, it will respond with a flag signal that is detected to disable the address generator 1810 until the interruption has been serviced.

When the maintenance processor 300 wishes to send information to the diagnostics circuit 30, it transmits signals that first are passed through receivers 1813, multiplexer 1814, multiplexer 1811, and drivers 1812 to the diagnostics circuit 30.

If the digital satellite interface 14 wishes to transmit a message to the maintenance processor, it energizes receivers 1816 and drivers 1817, so the message normally passes directly through to the maintenance processor 300. However, if the MBI buffer 18 is conducting a polling operation when the digital satellite interface 14 attempts to access the maintenance processor 300, receivers 1818 couple the information into a latch and control circuit 1819 that retains the information until the poll has been completed, whereupon polling will be terminated and drivers 1820 will transfer the information back through the receivers 1816 and the drivers 1817.

Now referring to FIG. 20, messages to the digital satellite interface 14 from the maintenance processor 300 pass through receivers 3010 in the diagnostics circuit 30 to a control register 3011, an address decoder 3012, and an input FIFO 3013. The address decoder 3012 decodes the address; if it corresponds to its digital satellite interface (DSI) address, subsequent messages transfer into the input FIFO 3013 for transfer through a programmable interface adapter 3014 to the memory 28 in FIG. 4. When the processor 27 wishes to transmit a message to the maintenance processor 300, it passes the data through a data buffer 3015 and the programmable interface adapter 3014 into an output FIFO 3017. The output message can then be transferred through bus drivers 3018 to the maintenance buffer interface 18.

The input and output FIFO's 3013 and 3017 operate in response to signals from FIFO control units 3019 and 3020, respectively. Diagnostics circuit 30 initiates the operation through an interrupt control circuit 3021 that produces control signals through bus drivers 3022. Various control signals from the maintenance bus interface buffer 18 are received by receivers 3023. A programmable interface adapter 3016 interfaces the control portion of the diagnostics circuit 30 and the processor 27.

The diagnostics circuit 30 performs several functions and operates under several modes. It can transfer messages from the processor 27 to the maintenance processor 300 and transfer messages from the maintenance processor 300 back to the processor 27. It indicates to the processor 27 or the maintenance processor 300 when an incoming message is available for the respective processor or when an output message can be sent from the respective processor. Moreover, the diagnostics circuit 30 signals the maintenance processor 300 if any emergency or nonemergency alarm conditions exist, if there is a request to transfer programs to the memory 28, specifically the program RAM 2811 and working RAM 2812 in FIG. 8, or when either the processor 27 or the memory 28 has been unplugged. When the maintenance processor begins to transfer information to the memory 28, the diagnostics circuit 30 signals the processor 27. It also signals the processor 27 to perform loopback testing and check some error testing. Finally, the diagnostics circuit 30 interrupts the maintenance processor 300 and provides an interrupt mask.

The message transfer function is important to this invention and can best be understood by referring to FIG. 21 taken in conjunction with FIGS. 19 and 20. Referring first to FIG. 21A, a message is sent from the maintenance processor 300 to the digital satellite interface 14 by seizing the MBI buffer 18 and then seizing an appropriate diagnostics circuit 30 in one of the digital satellite interface units connected to the MBI buffer 18. This is accomplished in step 21A by addressing the MBI buffer 18 in step 501 thereby to seize the MBI buffer 18. This is accomplished when the address comparator 1814 in FIG. 19 decodes an address in the receivers 1813 corresponding to the MBI buffer 18. Buffer 18 then enables the receivers to couple subsequent signals through the multiplexer 1815, the multiplexer 1811, and the drivers 1812 to the diagnostics circuit 30. Next, in step 502, the maintenance processor 300 addresses a fictitious location in the MBI buffer 18 that corresponds to the receivers 1813. This allows subsequent data to be transferred to the diagnostics circuit 30. Next, the maintenance processor 300 addresses one digital satellite interface in order to seize it (step 503).

Once a particular digital satellite interface 14 is seized, the maintenance processor 300 reads the diagnostics status register 3024 that is shown in FIGS. 20 and 12A. If a DSI OUT OF SERVICE bit in the register is set, step 505 diverts to step 506 and the maintenance processor types a maintenance message. As the message cannot be sent to the digital satellite interface 14 at this time, the flow diverts to step 507, whereupon the maintenance processor 300 again addresses the MBI buffer 18 to release it. Now the polling operation can continue.

Assuming that the seized digital satellite interface 14 is in service, step 505 diverts to step 508 to test bit 0 of the status register 3024, i.e., an INPUT FIFO NOT BUSY bit. If the input FIFO 3013 is not busy, step 508 branches to step 509, whereupon the maintenance processor clears a READ INPUT FIFO bit in the diagnostics control register 3011 and then sends a multiple byte message to the digital satellite interface 14 in steps 510 and 511. When all the bytes have been sent, step 511 branches to step 512 so the maintenance processor 300 can set the READ INPUT FIFO bit in the control register 3011 and then release the MBI buffer 18 in step 507.

Figure 21B:
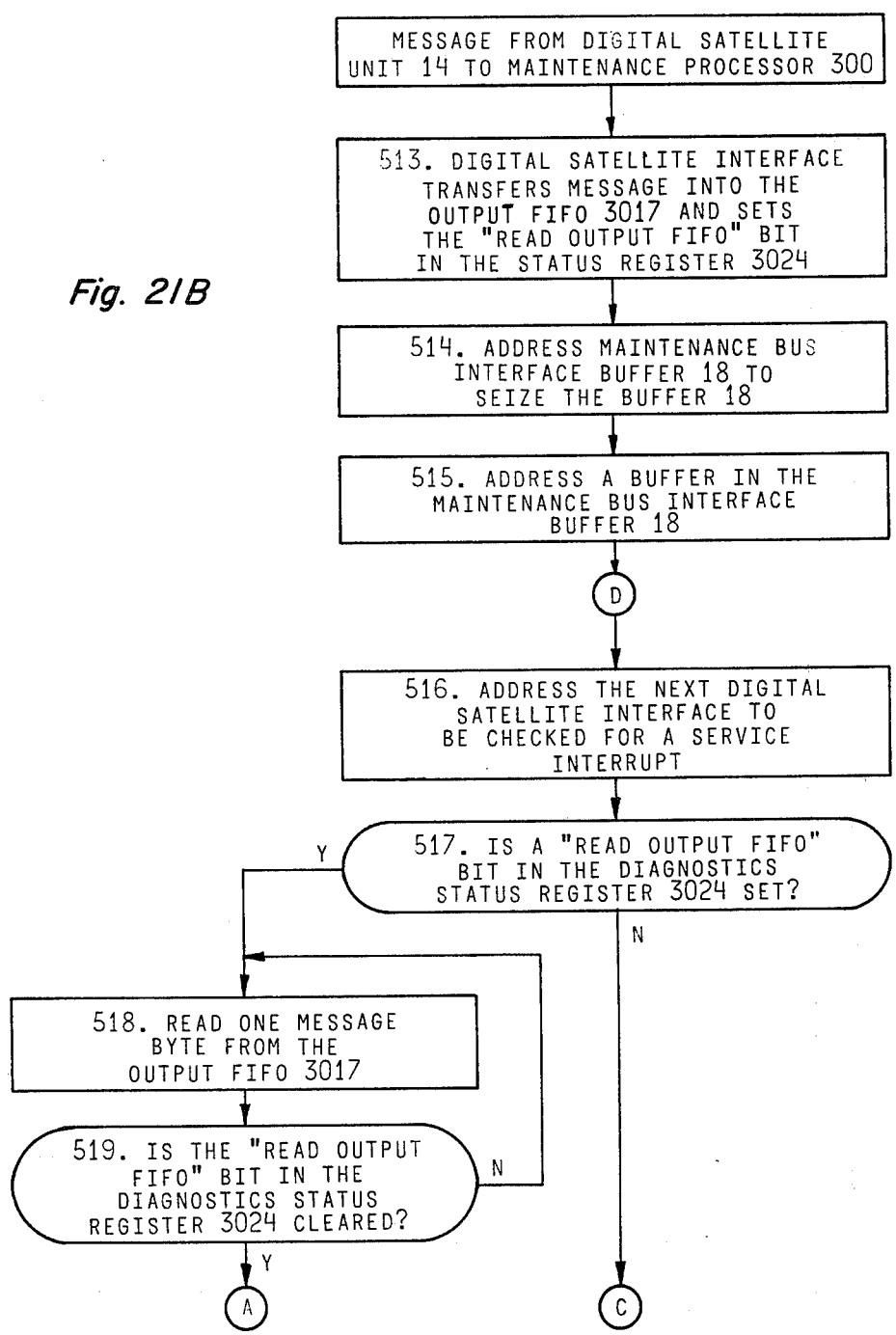

The process for transferring a message from a digital satellite interface 14 to the maintenance processor 300 begins in step 513 in FIG. 21B when a digital satellite interface transfers a message into its output FIFO 3017 in FIG. 20 and sets the READ OUTPUT FIFO bit in the status register 3024 also shown in FIG. 12A. This change in state will cause an interruption of the maintenance processor 300.

In order to service this interruption, the maintenance processor 300 addresses the MBI buffer 18 to seize it in step 514 and then addresses the fictitious location in step 515 to enable communications with diagnostics circuit 30. These steps correspond to steps 502 and 503. Next, the processor addresses the next digital satellite interface to be checked for a service interrupt in step 516. If a READ OUT FIFO bit in the corresponding diagnostics status register 3024 is set (step 517), one message byte is retrieved from the output FIFO 3017 in step 518. Additional bytes will continue to be retrieved until the maintenance processor 300, in step 519, "sees" that the READ OUTPUT FIFO bit in the diagnostics status register 3024 has been cleared. When this occurs, step 519 branches to step 507 to release the MBI buffer 18.

Figure 21C:
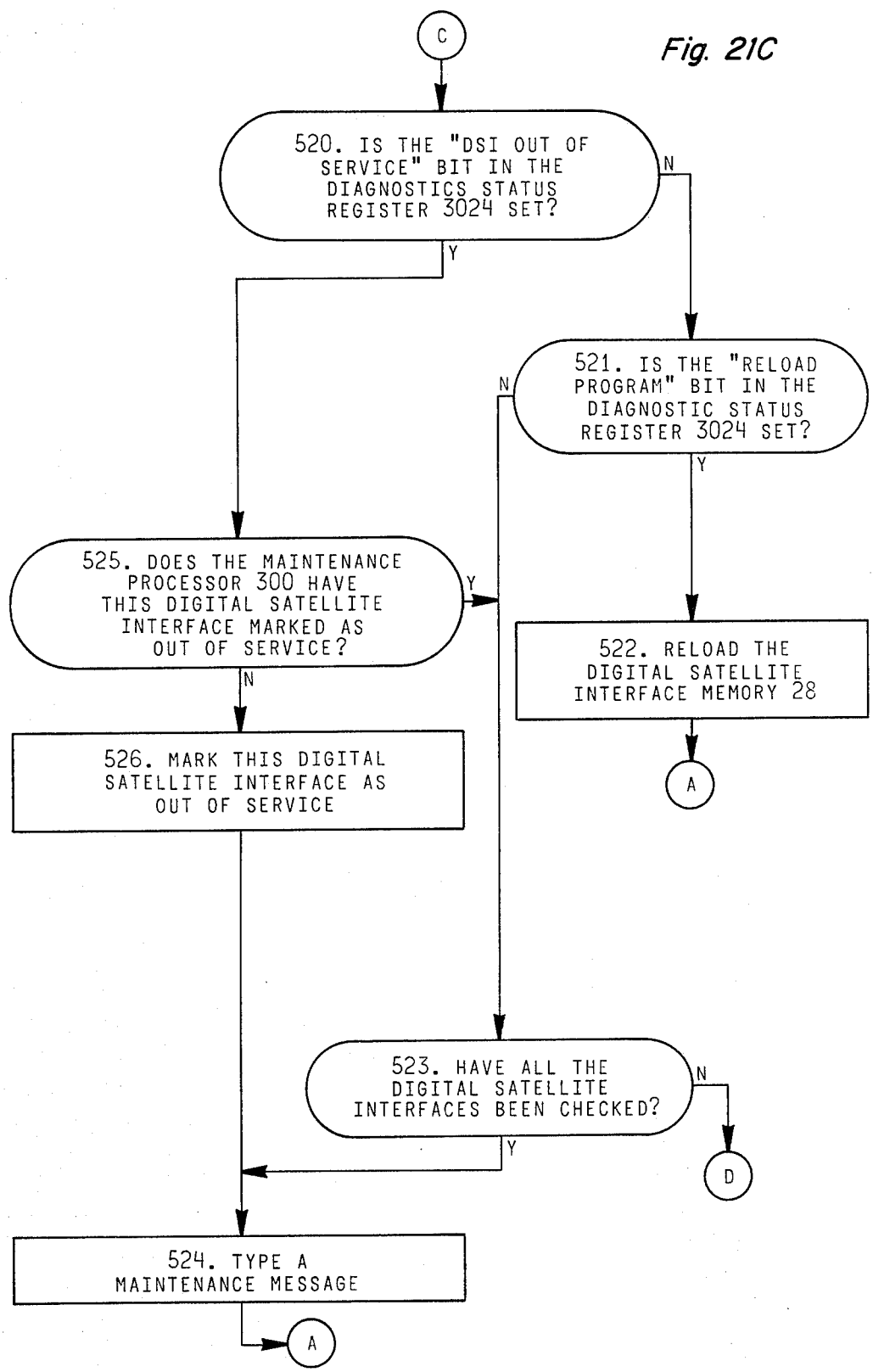

If the READ OUTPUT FIFO bit is not set in step 517, control passes to step 520 in FIG. 21C. The maintenance processor 300 tests a DSI OUT OF SERVICE bit in the diagnostics status register 3024 shown in FIGS. 12A and 20. Assuming that the digital satellite interface is plugged in and is in service, step 520 branches to step 521 to reload the program memory 2811 in step 52 if a RELOAD PROGRAMS bit is set and return to step 507 in FIG. 21A. If the RELOAD PROGRAMS bit is not set, the maintenance processor 300 determines whether all the digital satellite interfaces 14 have been checked (step 523). If they have, a maintenance message is typed (step 524) on the teletypewriter 305 in FIG. 2. If they have not, control passes back to step 516 in FIG. 21B.

If the identified digital satellite interface is out of service, then control passes from step 520 to step 525 to enable the maintenance processor 300 to mark the interface 14 out of service in step 526 and type a message in step 524. It marking has already occurred, control passes to step 523.

G. Automatic Remote Line Testing

To understand the operation and testing procedure, it will be first helpful to describe the autotest circuit 20 (FIG. 2) and then the circuitry in each of the the maintenance and administration circuits 79 of FIG. 15 in each of the remote digital satellite units 13. Basically, the autotest is scheduled by the maintenance processor and is initiated when a message is transmitted from the maintenance processor 300 to the digital satellite interface to enable a test call to be made. Tables corresponding to the test call sequence are maintained in the DSI memory 28. When a test call is initiated, the digital satellite interface 14 determines the availability of the line for the autotest and initiates a telephone call through the call processors 408 to the autotest circuit 20. After the call path is established, autotest circuit 20 and the autotest circuitry in the designated remote digital satellite unit 13 perform a simple, three-part test. First, the automatic test circuit 20 in FIG. 22 issues a tone, in digital form, that is transmitted to the remote line over the port group highways as normal voice data. If the autotest circuitry shown in FIG. 23 detects that tone, it transmits a tone and dial pulses that are conveyed back to the automatic test circuit 20. The automatic test circuit compares the tone and dial pulses against certain frequency and timing criteria. If this test passes, the digital satellite interface 14 terminates the calland sends a TEST COMPLETE message to the maintenance processor, If, however, the call is not completed successfully then the digital satellite interface initiates its own set of diagnostic steps, using successive test calls, to further isolate the fault without involving the maintenance processor 300.

i. Autotest Circuit 20

As shown in FIG. 2, the autotest circuit 20 connects to trunk port circuits in one port group unit 402. Specifically, the autotest control circuit, as shown in FIG. 22D, receives DAA signals from the port group control that represent FAST SENSE supervisory bits that carry the hook status information. When an autotest sequence is initiated, the digital central office establishes a path for the FAST SENSE bits from the remote line directly through the call processing system to the automatic test circuit 20 as the DAA signals. An ADS(−) pulse is a port strobe pulse that corresponds to the sample time slot assigned to the particular location of the circuit 20 in the port group unit 402.

The port group unit 402 also includes multiplexers and demultiplexers for the voice data and for the supervisory data. A DBA signal to the tone receiver in FIG. 21B represents voice data that is retrieved from the voice data demultiplexer. DBM, DBC, and ADD signals to the frequency detector in FIG. 22C are timing signals that are retrieved from the port group unit 402. The DBM signal, in this specific embodiment, is an 8 KHz sampling signal that strobes CODEC circuits in the line circuits and thus corresponds to the rate at which the audio signals are sampled and converted into digital form. The DBC signal is a 128 KHz basic clocking signal for the CODEC's. CODEC circuits are segregated into odd and even groups. The ODD signal selects one or the other group; that is, the odd or even group.

Figure 22A:
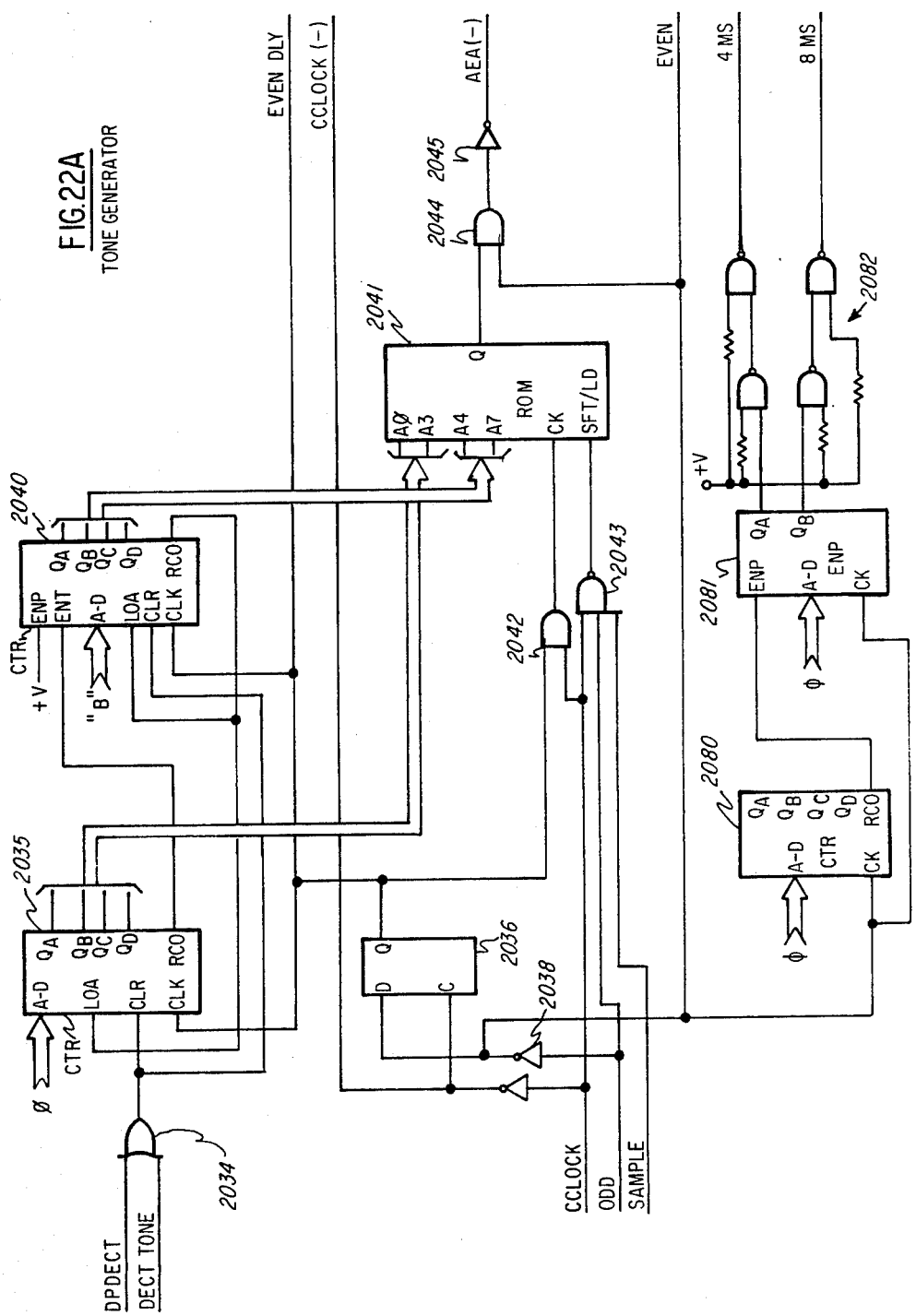
Figure 23:
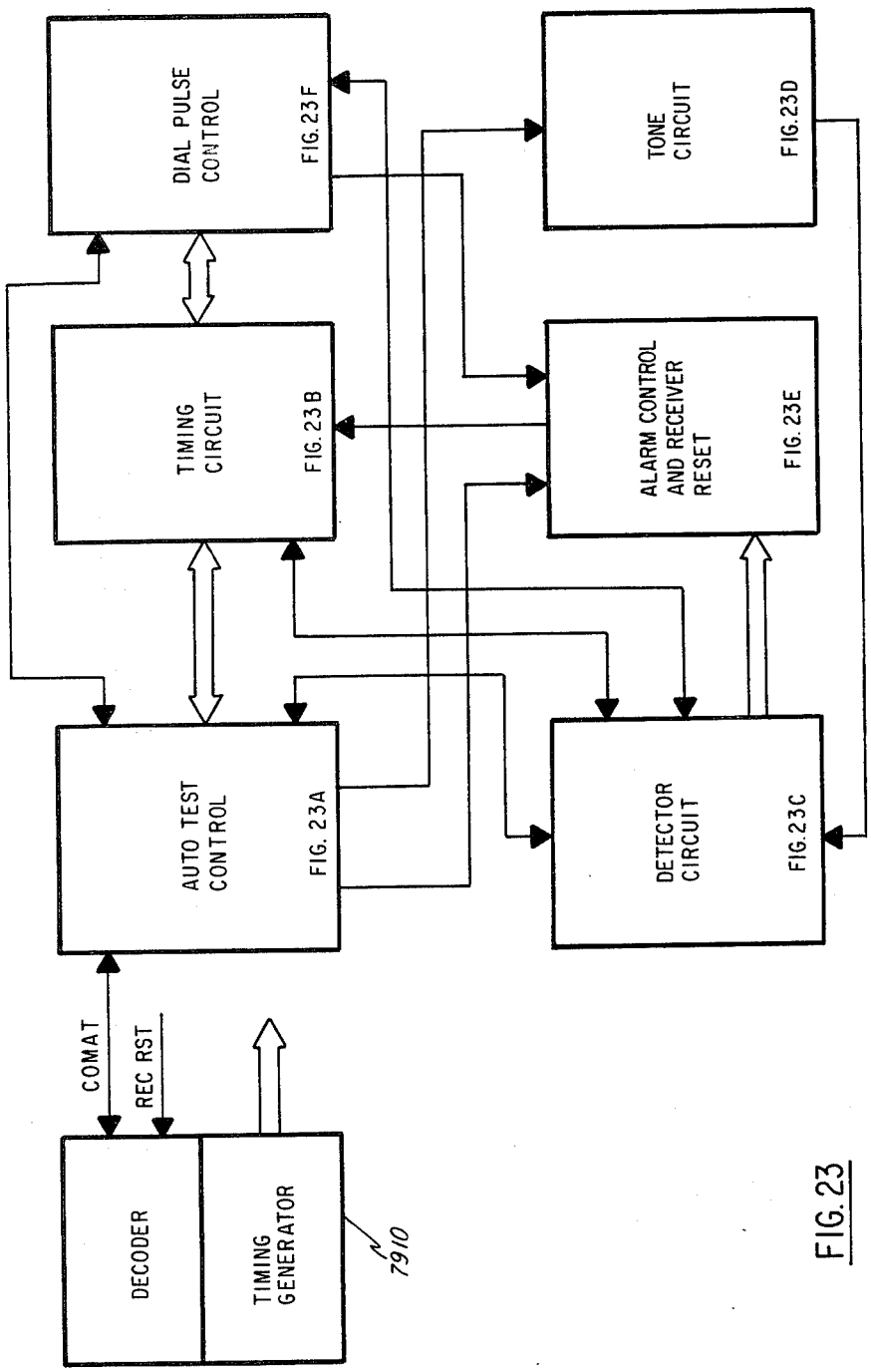
FIG. 23 depicts a portion of a maintenance and administratin circuit shown in FIG. 15.

The tone generator depicted in FIG. 22A generates an AEA signal that corresponds to voice data in digital form that would otherwise be retrieved from the CODEC in the local line circuit; this voice data is transferred onto the port group highway through the voice data multiplexer. The frequency detector in FIG. 22C generates an ADV signal which corresponds to the SLOW SENSE information; it indicates the presence of the autotest circuit 20. A DAC signal carries the FAST SENSE supervisory information which, in the autotest circuit, signals test success or failure.

The DAA signal is periodically strobed by a corresponding ADS(−) or port strobe, pulse into a latch 2010 in FIG. 22D. When the "A" signalling bits on the span indicate that the remote unit is selected (i.e., is "off hook") and the call is completed to the autotest circuit 20, the latch 2010 sets to generate an OFF-HOOK signal that is applied to an AND gate 2011. A test flip-flop 2012 is cleared by an internal ON-HOOK signal that is generated by OR gate 2013 in FIG. 22E when a power circuit 2014 is energized or an ON-HOOK signal is generated from a set of counters 2015. This is an internal status signal.

Referring to FIG. 22D, when the test flip-flop is cleared, it also clears a state counter 2016 and enables a decoder 2017 to assert a RESET signal. The RESET signal energizes an OR gate 2018 that then enables the AND gate 2011. When the flip-flop 2010 sets, the AND gate 2011 energizes an AND gate 2019, enabled when a DP DECT dial pulse detect signal from the decoder 2107 is not asserted. As a result, the AND gate 2019 energizes a NOR gate 2020 so the counters 2022 and 2023 can begin to count. A RESET COUNTER signal is not asserted, so that parallel loading inputs to the counter 2022 are not energized. The counter 2023, in tandem with the counter 2022, is disabled while the carry (RCO) output of the counter 2022 is not asserted. A four millisecond pulse is applied to the clocking inputs of both counters 2022 and 2023.

If the latch 2010 remains set for 16 milliseconds, the output counter 2022 will clock and set the test flip-flop 2012. While the internal ON HOOK signal is active, the inverted 4MS pulses from an inverter 2024 energize an AND gate 2025. However, during testing, the ON HOOK signal is not asserted, so the overriding clearing signal is removed. When the test flip-flop 2012 sets, it removes a clearing input to the state counter 2016 and enables a multiplexer 2026 to select an input in response to the output of the state counter 2016 so that a succeeding 4MS pulse can advance the state counter 2016.

Figure 22B:
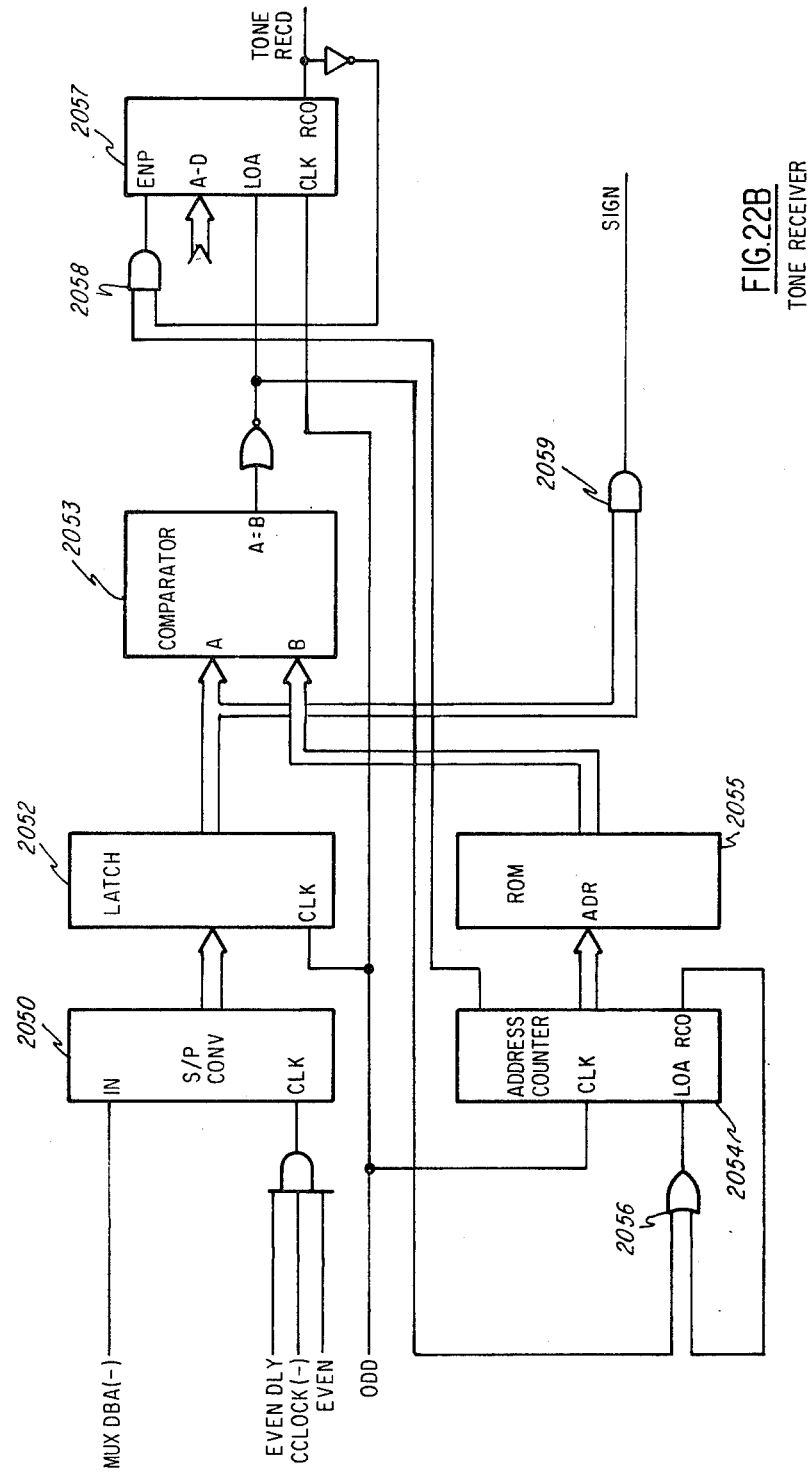
Figure 22D:
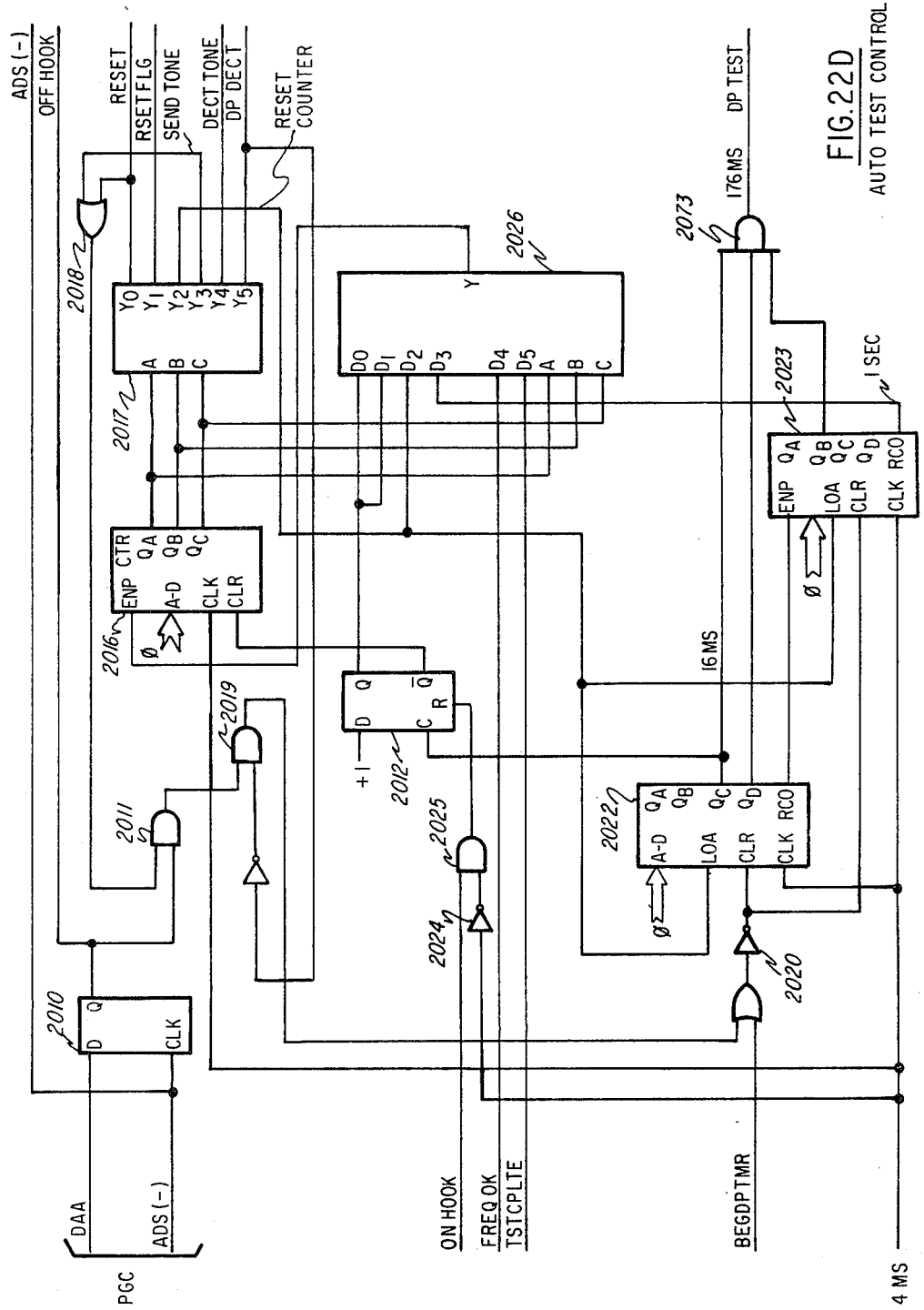
Figure 22E:
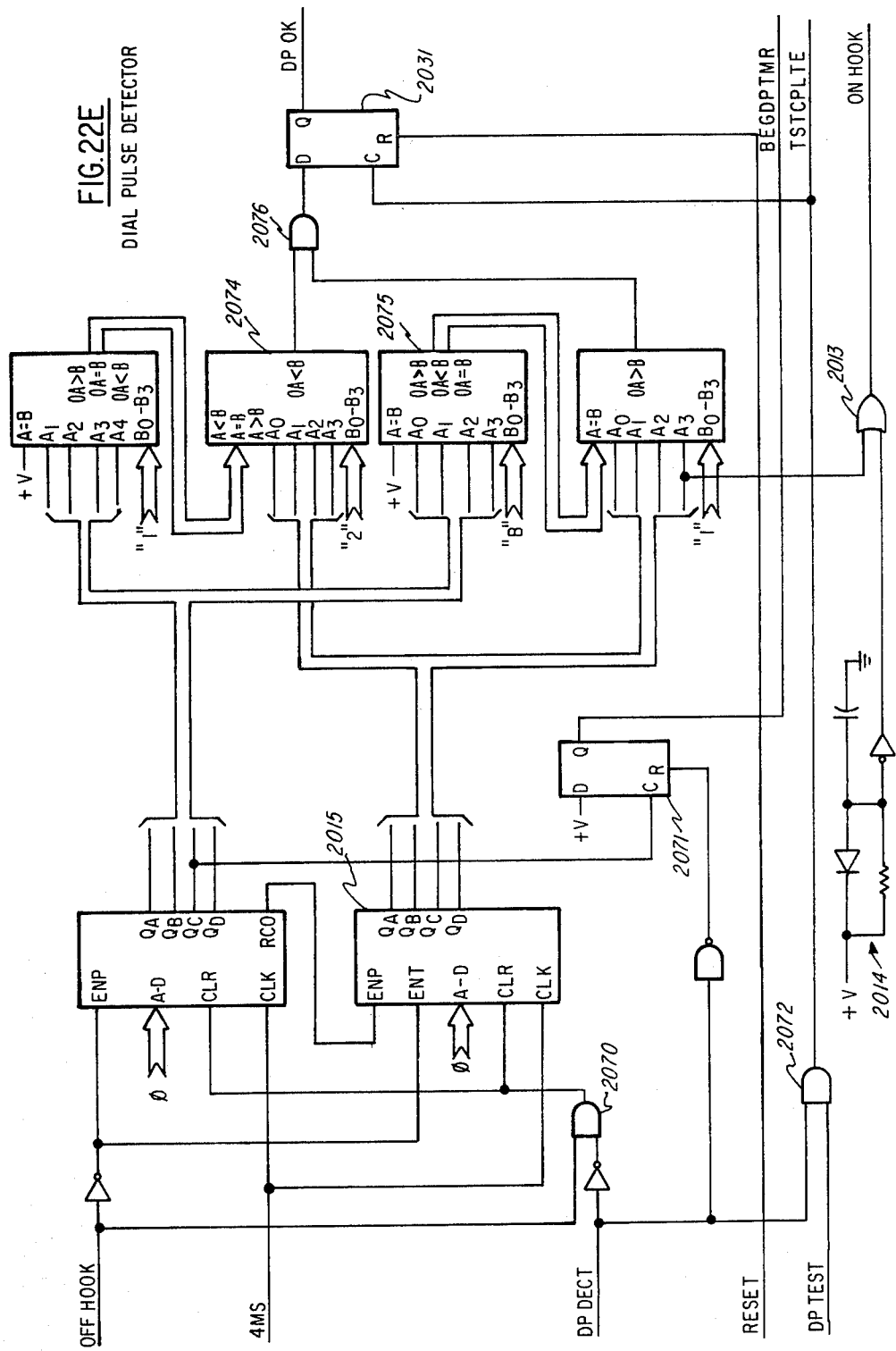

During this first state, the RESET signal from the decoder 2017 is coupled to the dial pulse detector in FIG. 22E and the frequency detector in FIG. 22C. Specifically, the RESET signal energizes OR gates 2027 and 2028 in FIG. 22C, thereby to disable an OR gate 2029 and enable a counter 2030 to begin counting from a preset value at an 8 millisecond pulse rate. The counting will continue until a carry (RCO) signal is generated, which defines a 96 millisecond test window. Referring to FIG. 22E, the RESET signal clears a DP (dial pulse) OK flip-flop 2031.

The next 4MS pulse advances the state counter 2016, so the decoder 2017 generates a RSETFLG signal corresponding to a new state. The output from multiplexer 2026 remains asserted so the state counter 2016 advances on the next 4MS pulses. During this state, the RSETFLG signal clears a FREQ OK flip-flop 2032 in the frequency detector in FIG. 22C.

When the counter 2016 in FIG. 22D again advances, the decoder 2017 generates a RESET COUNTER signal and corresponding state. The RESET COUNTER signal clears the counters 2022 and 2023 so they are initialized for a subsequent operation. In addition, the RESET COUNTER signal passes through the multiplexer 2026 to enable the next 4MS pulse to advance the state counter 2016 and establish a SEND TONE state.

The SEND TONE signal from the decoder 2017 energizes the OR gate 2018 so the AND gate 2011 is again energized to allow the counter 2022 to advance with successive 4MS pulses. Both the DECT TONE and the DP DECT signals are not asserted, so an OR gate 2034 (FIG. 22A) is deenergized which enables a counter 2035 to advance in response to EVEN DLY clocking signals from a flip-flop 2036.

The flip-flop 2036 responds to signals that are derived from the DBM, DBC, and ADD signals. Specifically, a buffer 2037, in FIG. 22C, buffers these signals to produce SAMPLE, CCLOCK, and ODD signals, respectively. Referring again to FIG. 22A, an inverter 2038 produces an EVEN signal, which is the complement of the ODD signal, that is applied to the D input of the flip-flop 2036 and the high-speed CCLOCK pulses then clock the flip-flop 2036 at the beginning of each even time interval. When this occurs, the flip-flop 2036 clocks the counter 2035 to produce an address.

At the beginning of each successive even interval, additional address will be generated in sequence.

The sequence of addresses from the counter 2035 and a cascaded counter 2040 address successive locations in a read-only memory ROM 2041 that produces a serial bit stream corresponding to samples of a hypothetical tone. These samples are then clocked in response to the coincidence of the EVEN DLY and CCLOCK signals sensed by an AND gate 2042 and are shifted out in serial form under the control of the CCLOCK, ODD, and SAMPLE signals that are applied to a NAND gate 2043. The serial bit stream from the memory 2041 is applied to the port group highway as AEA signals by an AND gate 2044, that is enabled during the EVEN bit time, and an inverting driver 2045.

This tone is sent for a one-second interval established by the counters 2022 and 2023. When the one-second interval has terminated, the CARRY output from the counter 2023 energizes the selected input to the multiplexer 2026, thereby to enable the next 4MS pulse to advance the 2016 is again disabled by the multiplexer 2026 as the FREQ OK signal from the flip-flop 2032 in the frequency detector of FIG. 22C is not asserted. The DECT TONE signal from the decoder 2017 energizes the OR gate 2034 and turns off the tone generator in FIG. 22A.

The digital representations of the tone from the remote signal line are received as DBA signals in a serial-to-parallel converter 2050 in the tone receiver of FIG. 22B. These signals are shifted serially into the converter 2050 on each coincidence of the EVEN DLY, inverted CCLOCK, and EVEN signals sensed by an AND gate 2051. Whenever the ODD signal is asserted, the converter 2050 contains a full digital representation of the tone and the ODD signal clocks that representation into a latch 2052, whereupon the latched representation is conveyed to one input of a comparator 2053. In addition, each ODD signal clocks an address counter 2054; however, that counter cannot advance until a comparison is found. Thus, the comparator 2053 compares for an identity between the first word from a memory (ROM) 2055 and the words latched in latch 2052. The contents of ROM 2055 are identical to the contents of ROM 2041 in FIG. 22A. When an identity is achieved, the address counter 2054 begins to advance. If the received tone and the tone from the ROM are not in phase, the address counter 2054 will be reloaded to an initial value through an OR gate 2056 because the comparison test will fail. If the tones are in phase, the address counter 2054 will continue to advance. An AND gate 2058 then is alternately energized and deenergized by the least significant bit from the counter 2054. After a predetermined number of comparisons are received, the counter 2057 produces a carry (RCO) output that is a TONE RECD signal. This signal disables the AND gate 2058 and prevents further counting.

In addition, the two most significant bits from the latch 2052 contain sign information representing the zero crossings of the signal. These bits are fed through an AND gate 2059 that asserts an SIGN signal when the tone signal is positive. The SIGN signal is sent to a counter 2060 in the frequency detector of FIG. 22C. SIGN signal changes should occur at twice the tone frequency. The counter 2060 advances until a 96 ms test window defined by the counter 2030 ends or the counter 2060 generates a carry which energizes a threshhold device 2061 and disables the counter 2060. Normally, both comparators 2062 and 2063 will have energized and AND gate 2064 at the end of the test window, so the carry output signal from the counter 2030 sets the FREQ OK flip-flop 2032.

The TONE RECEIVED signal from the counter 2057 in FIG. 22B also energizes an OR gate 2065 in FIG. 22C. This enables the buffer 2037 to energize the DAC line that provides the FAST SENSE supervisory signals to the port storage area of the circuit 20.

The FREQ OK signal is coupled back to the autotest control in FIG. 22D, so the multiplex 2026 enables the state counter 2016 to advance and produce a DP DECT state, wherein the incoming dial pulses are detected. When this occurs, the multiplexer 2026 again disables the counter 2016 as a TSTCPLTE signal, indicating completion of the test, is not asserted. The DP DECT signal is coupled to the tone generator 22A and the dial pulse detector in FIG. 22E. Referring first to FIG. 22A, the DP DECT signal energizes the OR gate 2034 and turns off the tone generator.

Referring to FIG. 22E, the DP DECT signal, when asserted, disables an AND gate 2070 and enables the counter 2015. In addition, the DP DECT signal enables a BEGIN DIAL PULSE TIMER flip-flop 2071 to be clocked by an output from the counter 2015. It also enables an AND gate 2072 to generate the TSTCPLTE signal when a DP TEST signal from an AND gate 2073 in the autotest control of FIG. 22D is asserted later.

The OFF HOOK signal, representing the presence of supervisory "A" bits from the remote line, is asserted during a dial pulse "make" period and not asserted during a dial pulse "break" period. While the OFF HOOK signal is asserted, the cascaded counter 2015 cannot advance, but it can advance, at a 4 millisecond pulse rate, when the OFF HOOK signal is not asserted. Thus the counter 2015 measures the "make" time of successive dial pulses. After a "make" signal lasts for 16 milleseconds, the counter 2015 clocks the flip-flop 2071. The resulting BEGDPTMR signal then enables the counters 2022 and 2023 to begin to advance. After 176 milliseconds, or 192 milliseconds after the arrival of the first dial pulse, an AND gate 2073 asserts the DP TEST signal. This corresponds to a nominal time interval for two dial pulses.

When the DP TEST signal is asserted, the flip-flop 2031 FIG. 22E is checked. A comparator 2074 ensures that the total "make" time for the dial pulses is below a maximum; a comparator 2075 ensures that the total "make" time for the dial pulses is above a minimum. Thus, if an AND gate 2076 is energized at the assertion of the DP TEST signal, the TSTCPLTE signal from the AND gate 2072 is asserted. The flip-flop 2031 sets indicating that the received dial pulses are within tolerance.

The TSTCPLTE signal is coupled back to the autotest control in FIG. 22D, while the DP OK signal is received in the frequency detector in FIG. 22C. Referring first to FIG. 22C, the DP OK signal energizes the OR gate 2065 so that the DAC signal, representing the FAST SENSE information bits, conveys the indication of success or failure to the port group control and port group state. In the autotest control of FIG. 22D, the TSTCPLTE signal energizes the selected input of the multiplexer 2026 so the next 4MS pulse advances the state counter 2016 to a final state.

The four millisecond and eight millisecond pulses are achieved by decoding the EVEN signals through counters 2080 and 2081 and a decoding network 2082 (FIG. 22A).

ii. Remote Autotest Circuit

Figure 23A:
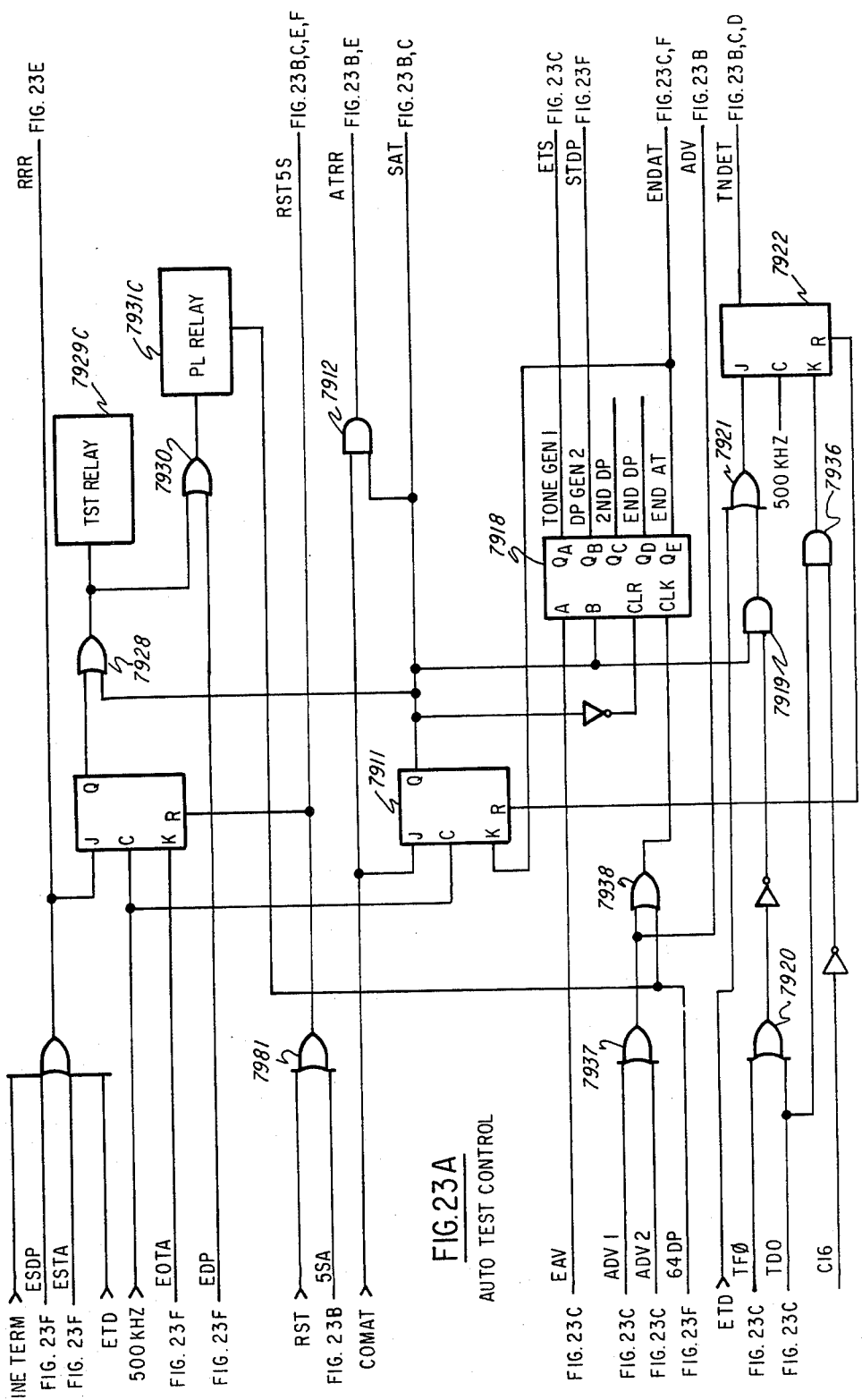
FIGS. 23A through 23F depict an autotest control circuit, a timing circuit, a detector circuit, a tone circuit, an alarm control and receiver reset circuit, and a dial pulse circuit, respectively, that are used in the circuit of FIG. 23.

Now referring to FIGS. 23 and 23A through 23F, a decoder and a timing generator 7910 generate a commence autotest (COMAT) signal when an autotest command message is sent to the remote digital satellite unit. Referring to FIG. 23A, the COMAT signal is applied to a start autotest flip-flop 7911 that is set in response to a 500 KHz clocking signal, thereby to assert a start autotest (SAT) signal. The SAT signal is coupled to an AND gate 7912, a state register 7918, an AND gate 7919, and an OR gate 2928 of FIG. 23A. It also enables a counter 7915 in the timing circuit in FIG. 23B and various elements in the detector circuit in FIG. 23C.

Figure 23B:
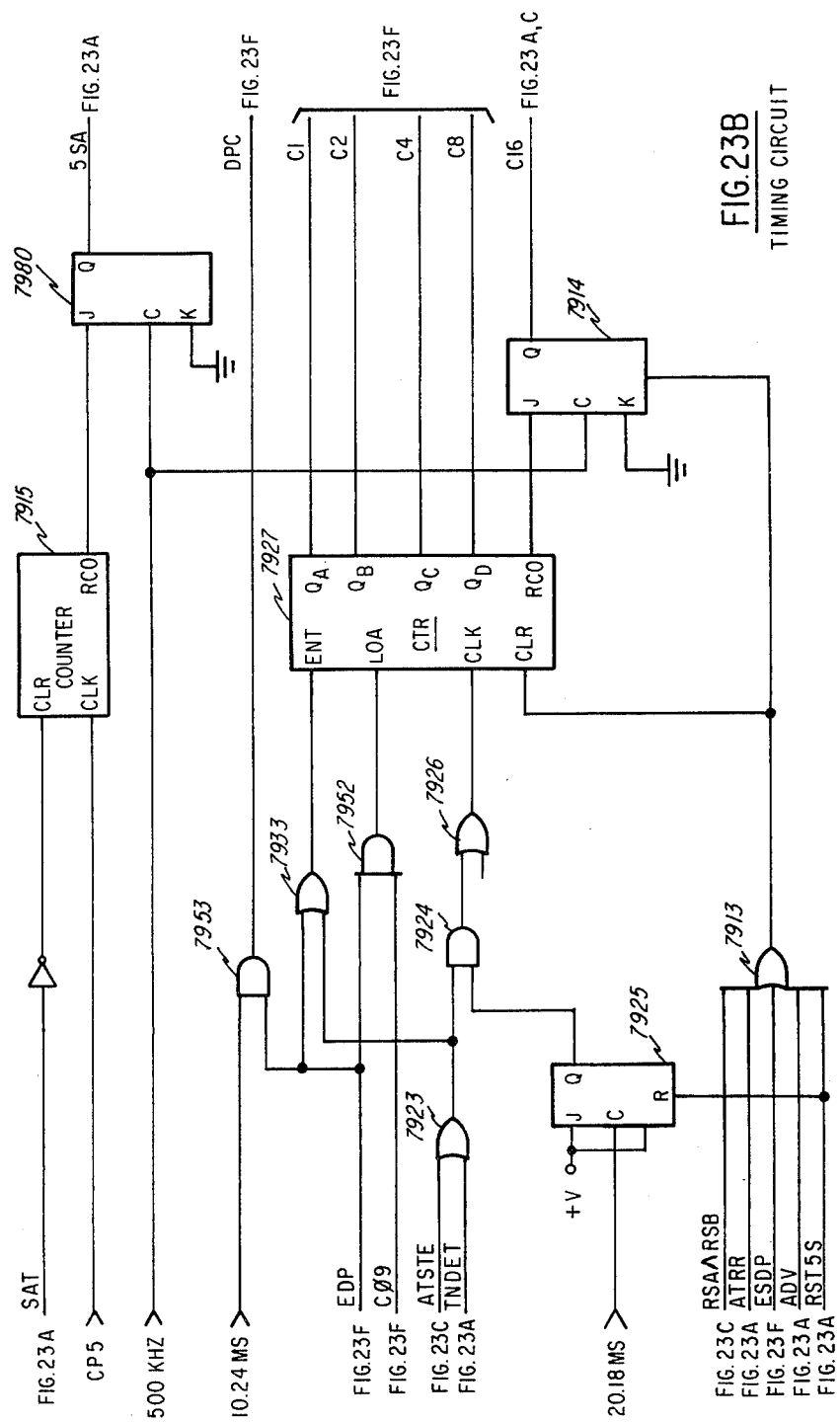
Figure 23C:
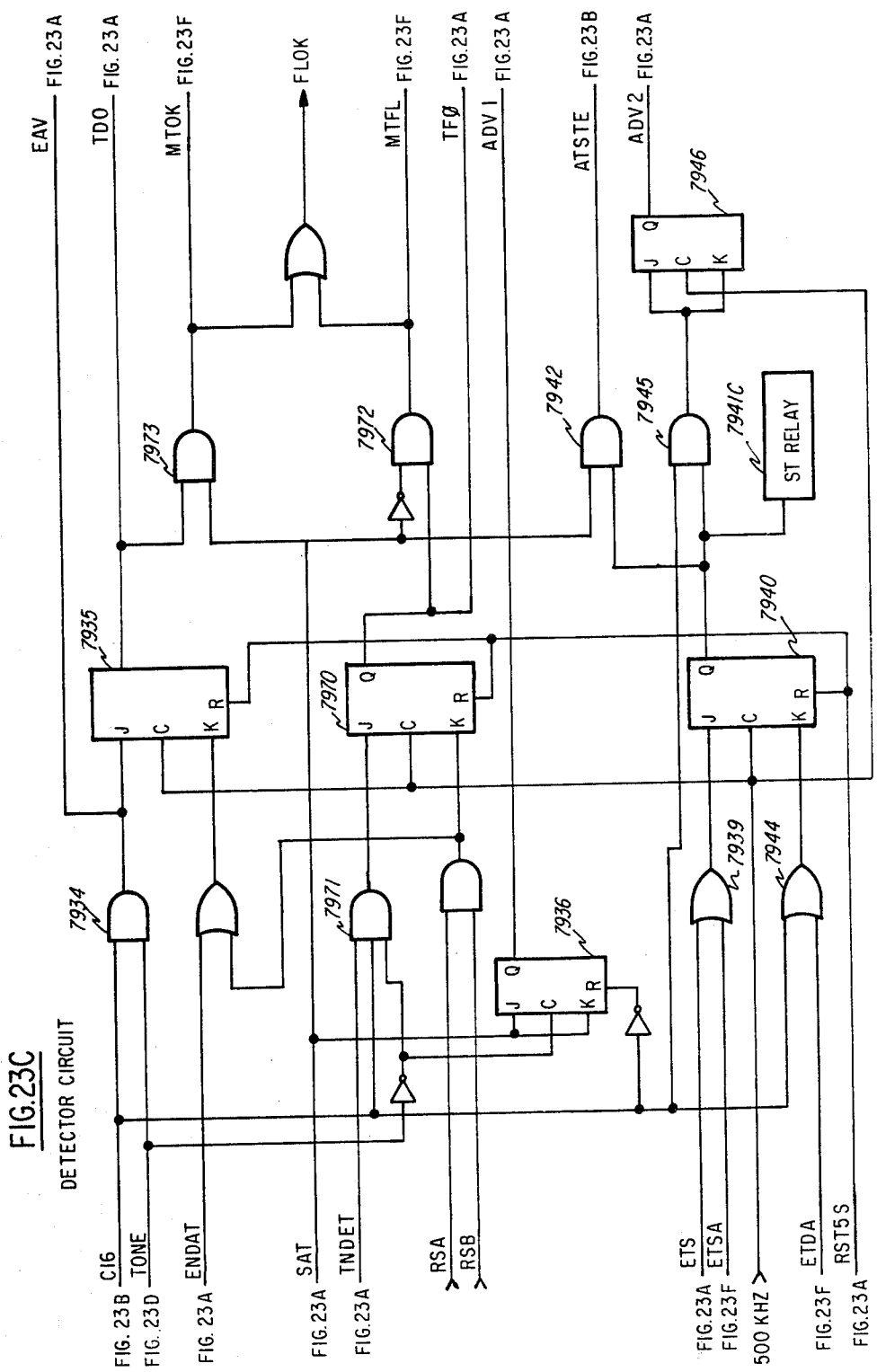
Figure 23D:
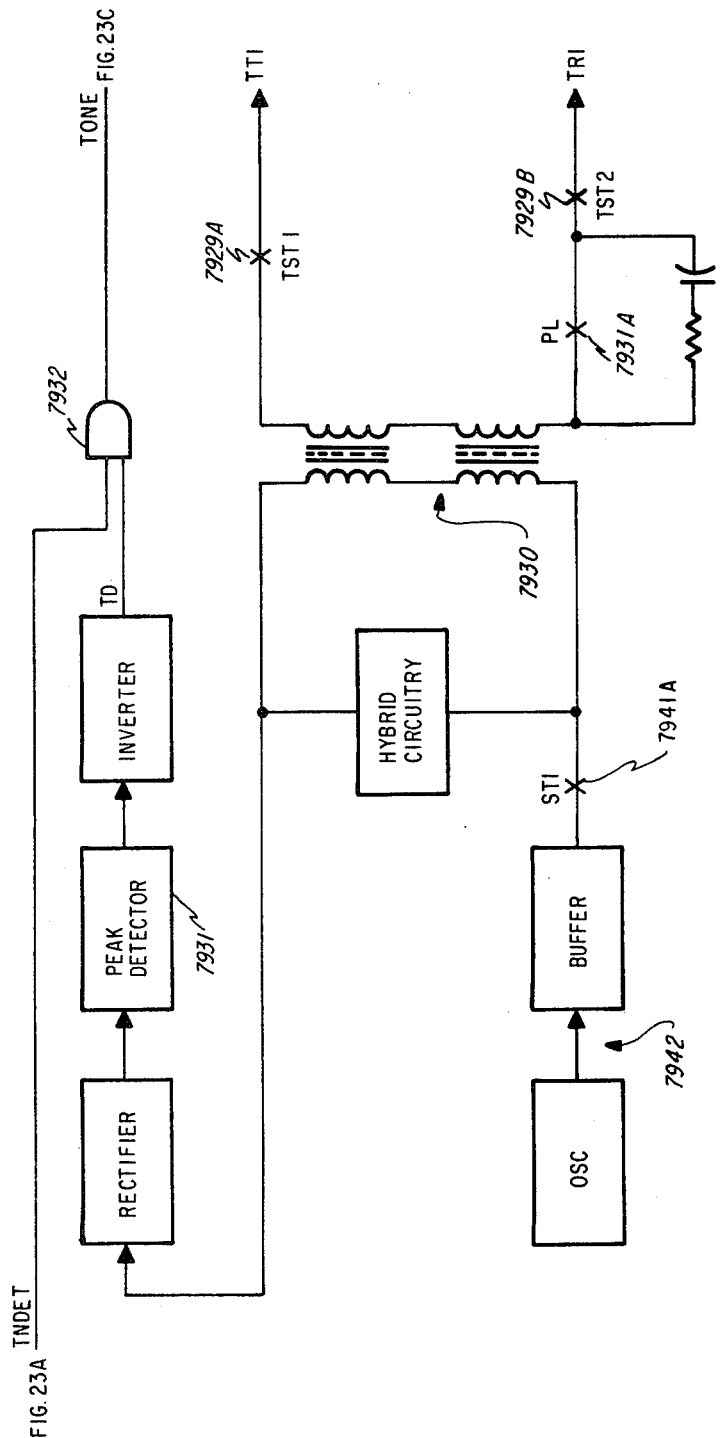
Figure 23E:
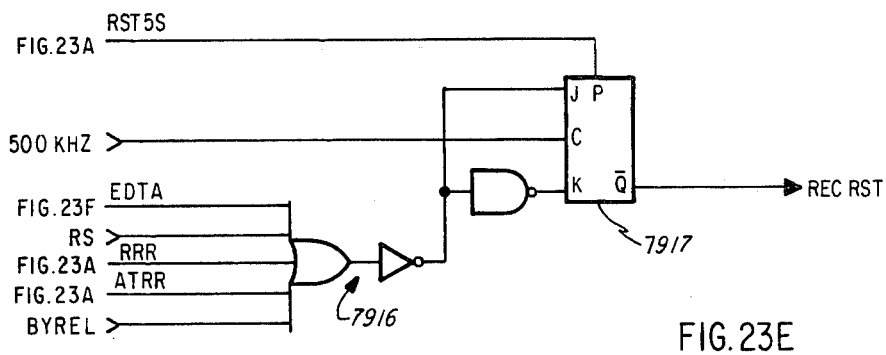

Referring to FIG. 23A, the AND gate 7912 is energized to assert an autotest reset (ATRR) signal that is coupled to the timing circuit in FIG. 23B and to an alarm control and receiver reset circuit in FIG. 23E. The ATRR signal energizes an OR gate 7913 in FIG. 23B, thereby to clear a test function timer comprising a C16 flip-flop 7914 and a counter 7927. It also causes an NOR gate 7916 (FIG. 23E) to condition a flip-flop 7917 so it asserts a REC RST signal so long as an RST5S resetting signal is not asserted. The assertion of the REC RST signal causes the circuitry 7910 in FIG. 23 to shift the COMAT signal to a nonasserted level. However, the flip-flop 7911 remains set because an ENDAT signal from the state shift register is not asserted.

The SAT signal enables the counter 7918 in FIG. 23A. In addition, a NOR gate 7920 enables the AND gate 7919, so the SAT signal energizes an OR gate 7921, that can also be energized by an enable tone detect (ETD) signal that is generated during a manual test, thereby to condition an ENABLE TONE DETECT flip-flop 7922 to be set to generate a tone detect (TNDET) control signal.

The TNDET signal from the flip-flop 7922 is coupled to the timing circuit in FIG. 23B, the detector circuit in FIG. 23C, and the dial pulse detector circuit in FIG. 23D. In FIG. 23B, the TNDET signal energizes an OR gate 7923 that enables an AND gate 7924 to pass a clocking pulse from a dividing JK flip-flop 7925 through an OR gate 7926 as a clocking input to the test function timer counter 7927. The OR gate 7923 also energizes an OR gate 7933 that enables the counter 7927 to advance. In FIG. 23D, the TNDET signal enables a gate 7932 to generate a TONE sign 1 that is coupled to the detector circuit in FIG. 23C if an incoming tone from the autotest circuit 20 is detected.

The SAT signal from the flip-flop 7911 also energizes an OR gate 7928 (FIG. 23A), thereby to energize a relay coil 7929C in a test relay. When the relay coil is energized, two normally open relay contacts connect one side of a hybrid circuit to TT1 and TR1 test leads to the test access relays of the associated line circuits. One such test access relay disconnects a subscriber from the line circuit and enables the test relay to substitute the test circuitry in FIG. 23. The OR gate 7928 also energizes another OR gate 7930 and energizes a coil 7931C of a PL relay. The PL relay contacts 7931A in FIG. 23D close to complete a path from the hybrid circuit of the autotest circuit through the test relay and TT1 and TR1 connects to the test access relay.

During this first state, incoming signals are monitored. If a tone is received, it is coupled through hybrid circuitry 7930 (FIG. 23D) and a tone detector network 7931. If the tone is detected, the AND gate 7932, enabled by the TNDET signal, is energized to produce a TONE signal that is coupled back to the detector circuit in FIG. 23C.

After an interval determined by the counter 7927, the flip-flop 7914 sets and generates the C16 signal. This energizes an AND gate 7934 in FIG. 23C to generate an event advance (EAV) signal and enable tone detected flip-flop 7935 to set, thereby to generate a tone detected output (TDO) signal. The assertion of the TDO signal conditions the gates 7919 through 7921 and an AND gate 7936 so the flip-flop 7922 can then clear while the EAV signal conditions the state shift register 7918 to set a first stage at the next clocking transition. Referring to FIG. 23C, the SAT signal conditions a flip-flop 7936 to be toggled to a set condition when the tone transmission from the automatic test circuit 20 at the digital central office 10 (FIG. 1) terminates. When this occurs, an ADV 1 signal is generated. The ADV 1 signal energizes OR gates 7937 and 7938 in FIG. 23A to clock a "1" into a first stage of the state shift register 7918, thereby to end the first, or tone receive, state and to enter a tone generating state signified by an enable tone send (ETS) signal. In addition, an ADV signal from an OR gate 7937 in FIG. 23A clears the counter 7927 and flip-flop 7914 in FIG. 23B. This shifts the C16 signal to a nonasserted state, thereby deenergizing the AND gate 7934 to allow the tone detect flip-flop 7935 and the flip-flop 7936 to clear. Moreover, the clearing of the flip-flop 7914 shifts the EAV signal in FIG. 23C to a nonasserted state, thereby conditioning the state shift register 7918 to shift its contents in response to clocking transitions.

In the tone generating state, the tone circuit in FIG. 23D generates the return tone that is coupled to the autotest circuit 20 in FIG. 22 to perform the second test step. Specifically, the ETS signal energizes the OR gate 7939 in FIG. 23C, thereby to enable an ENABLE TONE SEND flip-flop 7940 to set and to energize an ST relay coil 7941C. This closes ST1 contacts 7941A in FIG. 23D and enables a tone from a buffered oscillator circuit 7942 to be coupled through th hybrid circuitry 7930 onto the line through the PL contacts 7931A and TST contacts 7920A and 7929B to the test access relay. In addition, the coincidence of the SAT signal and the setting of the flip-flop 7940 energize an AND gate 7942 that asserts an autotest tone started (ATSTE) signal that energizes the OR gate 7923 in FIG. 23B accordingly, the test function timer, including the 7927 and flip-flop 7914, defines the interval over which the tone is sent.

At the end of the defined interval, the flip-flop 7914 sets and, through an OR gate 7944, conditions the ENABLE TONE SEND flip-flop 7940 to clear, which deenergizes the ST relay coil 7941C. The C16 signal also energizes an AND gate 7945 that conditions a flip-flop 7946 to set and generate an ADV2 signal. The ADV2 signal advances the test function shift register 7918 in FIG. 23A to a DP GENERATING state and, through the resulting ADV signal from the OR gate 7937, clears the test function timer. This ends the second test step and conditions the circuit in FIG. 23 to produce the final, dial pulsing, step.

Figure 23F:
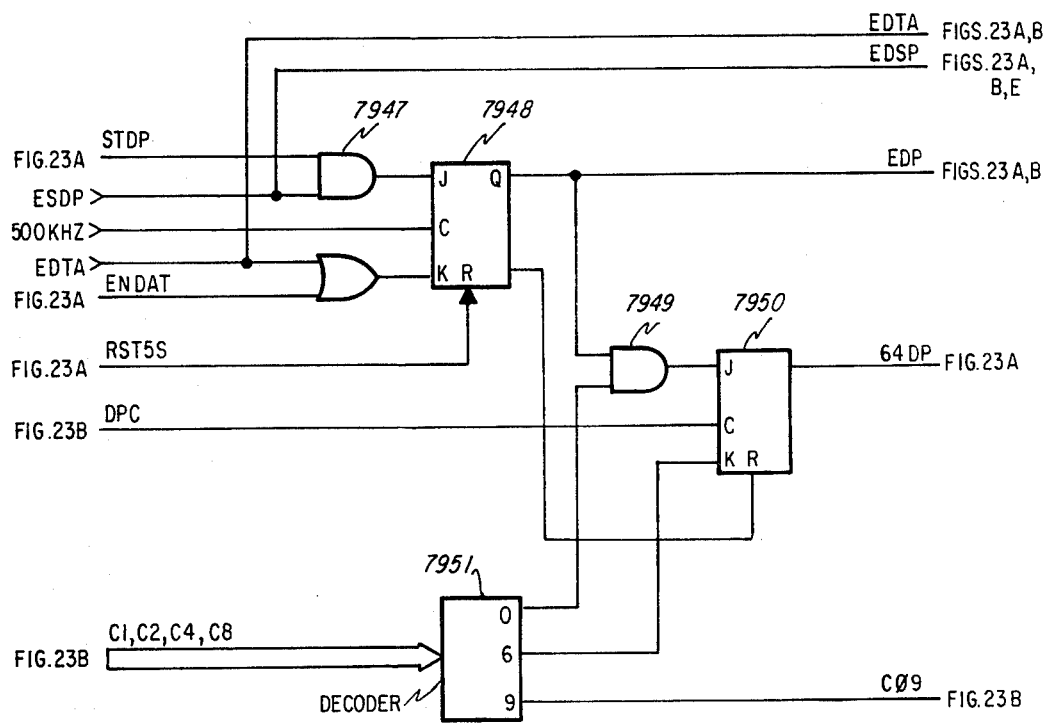

In this state, a start dial pulsing (STDP) signal is sent to the dial pulse circuit in FIG. 23F from the state shift register 7918. An AND gate 7947, in FIG. 23F, is enabled by an ESDP signal from other circuitry in the maintenance and administration unit 79. Thus a flip-flop 7948 is conditioned to set and generate an enable dial pulsing (EDP) signal. Because counter 7927 is cleared, a decoder 7951 enables AND gate 7949, which is then energized by the EDP signal. The energization of AND gate 7949 conditions a flip-flop 7950. The EDP signal also enables an AND gate 7952 in FIG. 23B. As the test function timer 7927 advances, its signals are fed to a decoder 7951 in FIG. 23F. When the counter 7927 reaches a count of "6", the decoder conditions the flip-flop 7950 to toggle. When the counter 7927 reaches a count of "9", the AND gate 7952 loads the counter 7927, thereby clearing it. The clocking frequency for flip-flop 7950 is selected so it acts as a break-make flip-flop that produces the dial pulses of the correct timing. An AND gate 7953 generates a dial pulse counting (DPC) signal of the correct frequency. Each time the 64DP signal is asserted, it advances the state shift register 7918 in FIG. 23A and deenergizes the PL relay 7931C to thereby produce a break in the DC path from the line circuit. Thus, the first break pulse in the dial pulse train occurs. Sixty milliseconds later, the counter 7927 reaches a count of six so the decoder 7951 in FIG. 23F conditions the make-break flip-flop 7950 to reset. When this occurs, the make-break flip-flop 7950 clears and the PL relay coil 7931C in FIG. 23A is again energized, thereby closing the relay to produce a break time. Thirty milliseconds later, the decoder 7951 in FIG. 23F reaches a count of nine. This conditions the AND gate 7952 (FIG. 23B) to reset the test function timer counter 7927 and to condition the flip-flop 7950 (FIG. 23F) to again be set, which identifies the beginning of the next break interval. The setting of flip-flop 7950 causes the shift register 7918 to advance to a 2ND DP state. The same sequence again occurs; that is, the PL relay is deenergized for a 60 millisecond break period followed by a 30 millisecond make period. At the end of this time, when the flip-flop 7950 is set, the shift register 7018 advances to generate an END DP signal that enables another dial pulse to be sent. After this dial pulse, the shift register generates an end autotest (ENDAT) signal that conditions the flip-flop 7935 (FIG. 23C) and the EDP flip-flop 7948 in FIG. 23F to be cleared. This completes the sequence in the circuitry of FIG. 23.

FIG. 23C also shows a tone fail flip-flop 7970. If no tone is detected at the completion of the detection time, an AND gate 7971 conditions the flip-flop 7970 to set, thereby generating a TFO signal. The TFO signal enables the flip-flop 7922 in FIG. 23A to clear and causes an AND gate 7972 to be energized, thereby to produce an MTFL signal that indicates a failure to detect tone in a manual test (i.e., the SAT signal is not asserted).

As previously indicated, the timing circuit in FIG. 23B includes a five-second timer that comprises a counter 7915 and a flip-flop 7980. As long as the SAT signal is asserted, the counter advances. If a test is not seuccessfully completed at the end of the five-second time interval, the timer energizes an OR gate 7981 in FIG. 23A to generate an RST5S signal that is also energized in response to an RST signal that is generated on a power-up sequence or by the maintenance and administration circuit 79 in FIG. 15. The RST5S signal also presets the flip-flop 7917 in FIG. 23E.

H. Autotest Operation

With this understanding of the circuitry in the autotest circuit 20 and the maintenance and administration circuit 79, it is now possible to describe the various communications that occur during an autotest.

i. Maintenance Processor Operations

Figure 24:
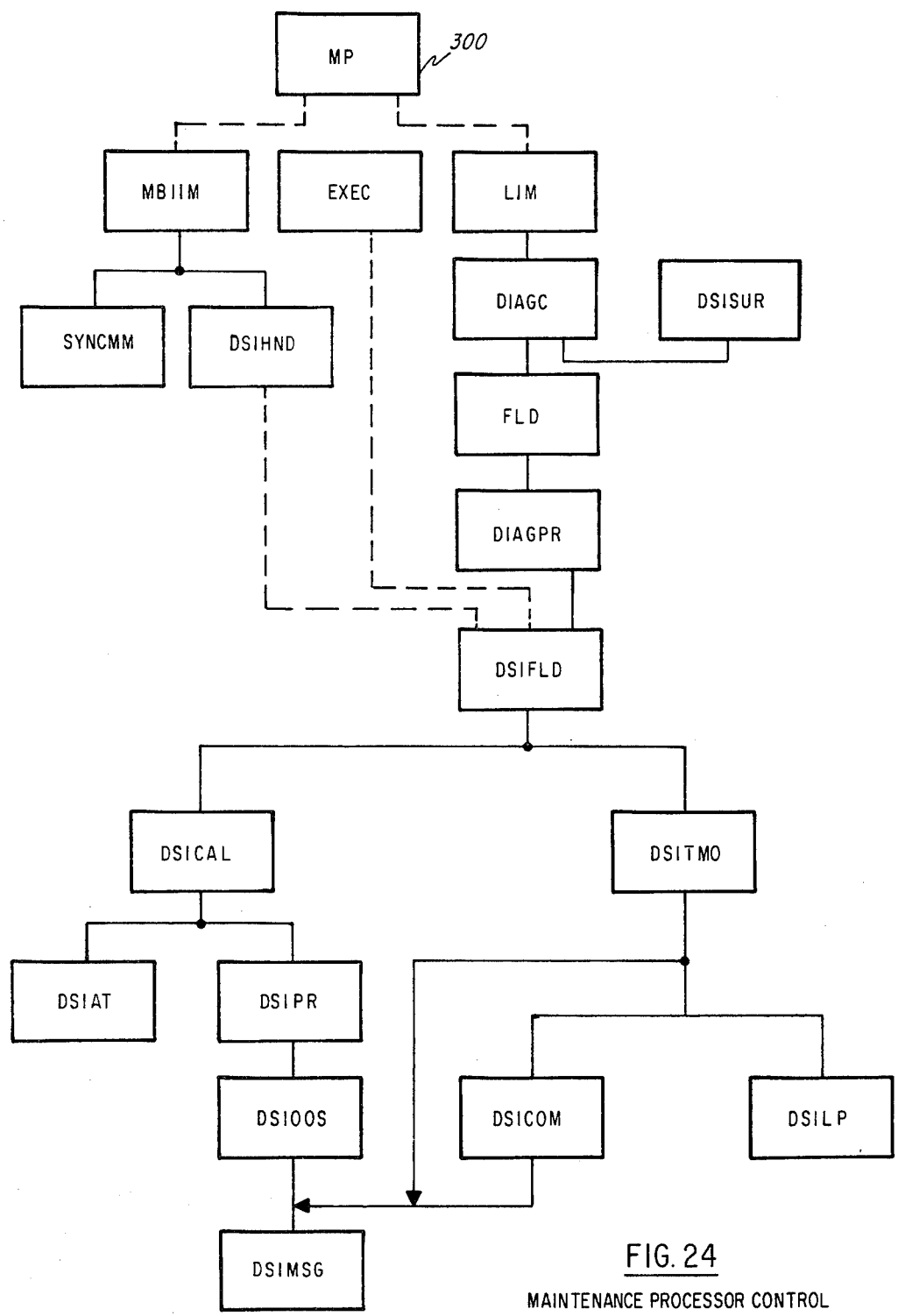
FIG. 24 is a block diagram that depicts the organization of certain control modules utilized by the maintenance processor.

As previously indicated, the maintenance processor 300 initiates an automatic testing operation. FIG. 24 depicts the maintenance processor 300 with a number of associated control modules (i.e., programs). There are a number of other modules but they are not disclosed, as they bear no relationship to this invention. The MBLIM, SYNCMM, LIM, DIAGC, FLD, and DIAGPR modules are all modules that are utilized in a conventional, digital central office.

Several modules can transfer control to a DSIFLD module. For initiating an autotest, the EXEC module is the calling module. The DSIFLD module determines that the EXEC module is the calling module and shifts to a DSITMO module that establishes a path with a digital satellite interface and sends an autotest message to the digital satellite interface. This requires the utilization of a DSICOM module. A message may or may not be typed on the teletypewriter 305 in FIG. 2 by a DSIMSG module as a result of this sequence, depending upon certain parameters that are set in the DSITMO module.

After some predetermined period of time, the digital satellite interface 14 will send the maintenance processor a message indicating that the autotest is complete, which produces an interruption request. A DSIHND module diverts operations through the DSIFLD module to a DSICAL module that calls a DSIPR module if printing is required. The DSIAT module verifies the check-in of the correct DSI; if the correct DSI does not check in, various diagnostics are provided. The DSIPR module decodes the incoming message, causes an alarm if required, and prints an appropriate message. It may then shift to a DSIOOS module to take the digital satellite interface out of service before using the DSIMSG module to print the message on a console.

FIGS. 25A through 25D is a basic interface flow diagram that outlines the transfer of information between the maintenance processor and the digital satellite interface, the subsequent control and monitoring of the autotest, and actions that are taken in response to the autotest. However, it emphasizes the procedures for placing an autotest call. FIGS. 26 through 29 are detailed flow diagrams of certain of the modules shown in FIG. 24 that are used during these procedures by the processor 27.

Figure 25A:
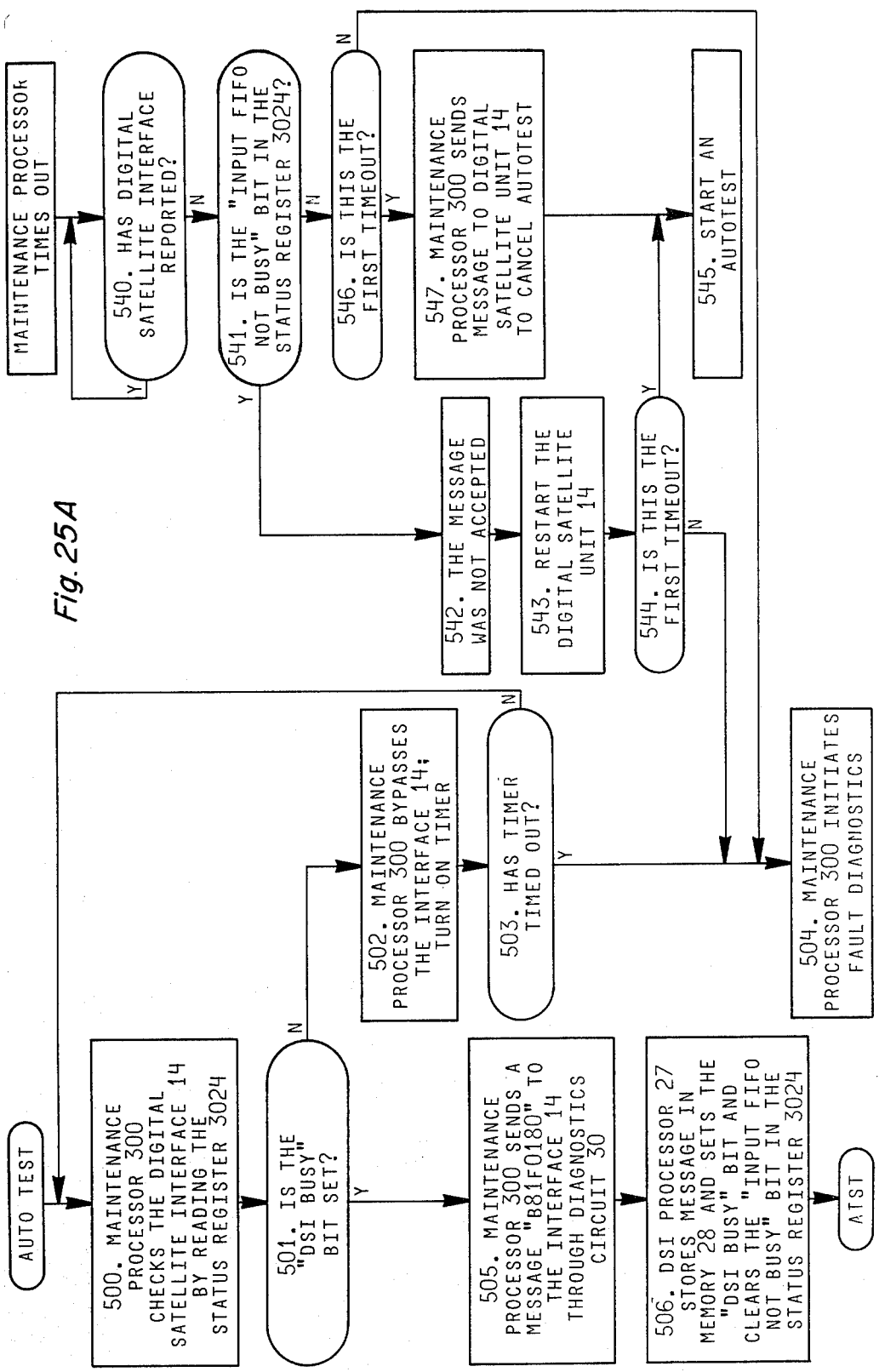
FIGS. 25A through 25D, is a basic interface flow diagram that establishes the relationships among the various transfers that occur during an autotesting operation.

Referring first to step 500 in FIGS. 25A, the maintenance processor checks the digital satellite interface status register to determine if an autotest can begin. If the digital satellite interface is busy, step 501 branches to step 502 which then shifts operations to a time out test in step 503. If no time out is detected, step 503 shifts operations back to step 500 so the test can be rescheduled. When a time out does occur, step 503 branches to step 504 to initiate fault diagnosis.

If the identified digital satellite interface is not busy, the maintenance processor 300 sends a message to the identified digital satellite interface in step 505 that initiates the autotest and resets the timer in the maintenance processor that is utilized in step 503.

Figure 26:
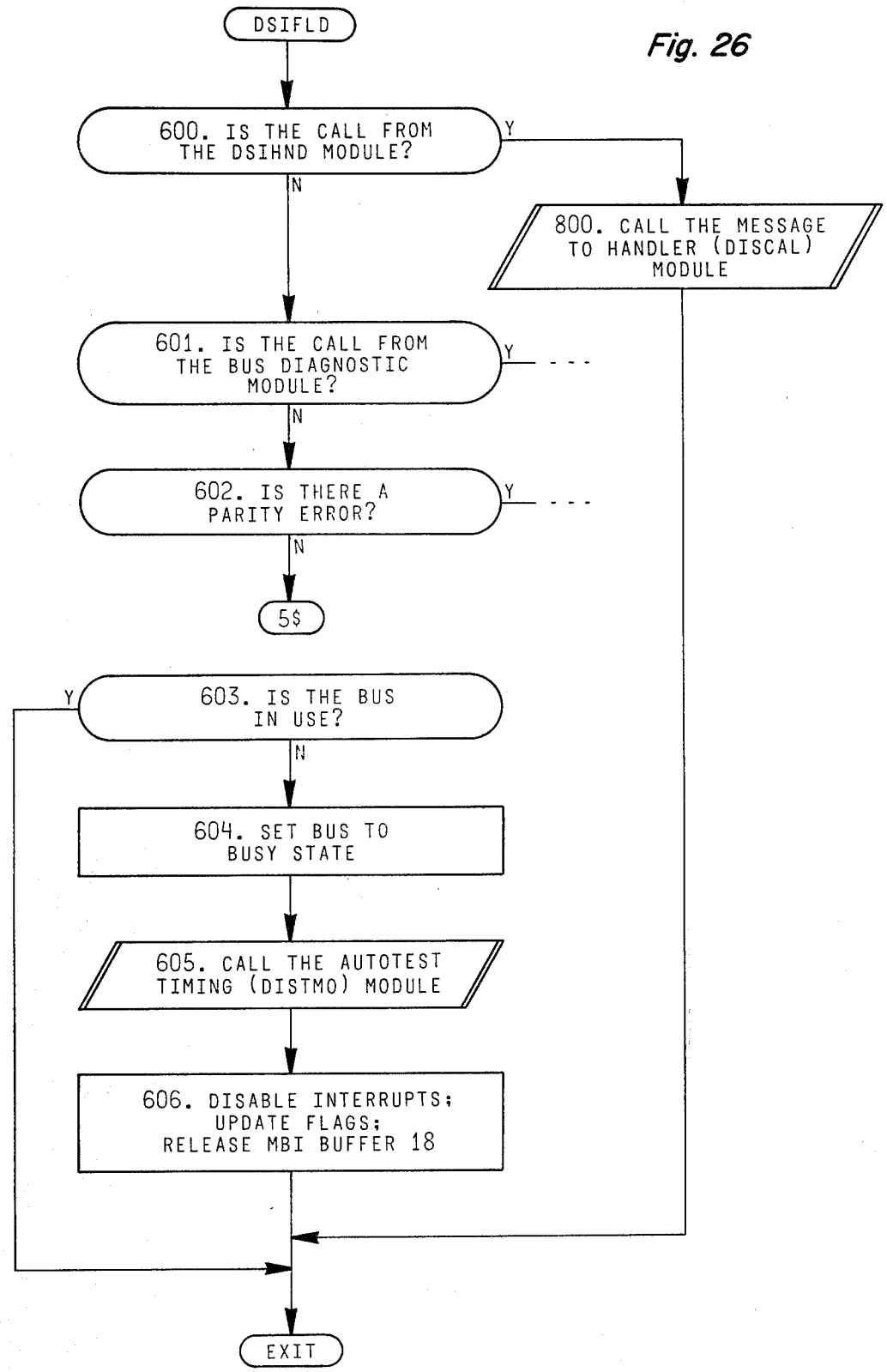
FIG. 26 is a detailed flow diagram of a DSIFLD module that is shown in FIG. 24.

Steps 500 through 505 are more clearly set forth in FIGS. 26 through 29. FIG. 26 is a detailed flow diagram of the DSIFLD module. As previously indicated, this module first determines the calling module. Specifically, step 600 determines if the DSIHND module called it; step 601 determines if a bus diagnostic module called it; and step 602 determines if it is called in response to a parity error. If none of these tests produce a positive result, by default the EXEC module called it to initiate an autotest, so control passes to step 603, where the maintenance processor determines if the maintenance bus is in use. If it is, no further actions occur. However, if it is not, the bus is set to a busy state in step 604 and the DSITMO module is called in step 605 to initiate the autotest. When the DSITMO module has been processed, control returns to the DSIFLD module in FIG. 26 so step 606 is processed to disable further interrupts, release the MBI buffer 18, and perform other, appropriate operations before completing the task.

Figure 27A:
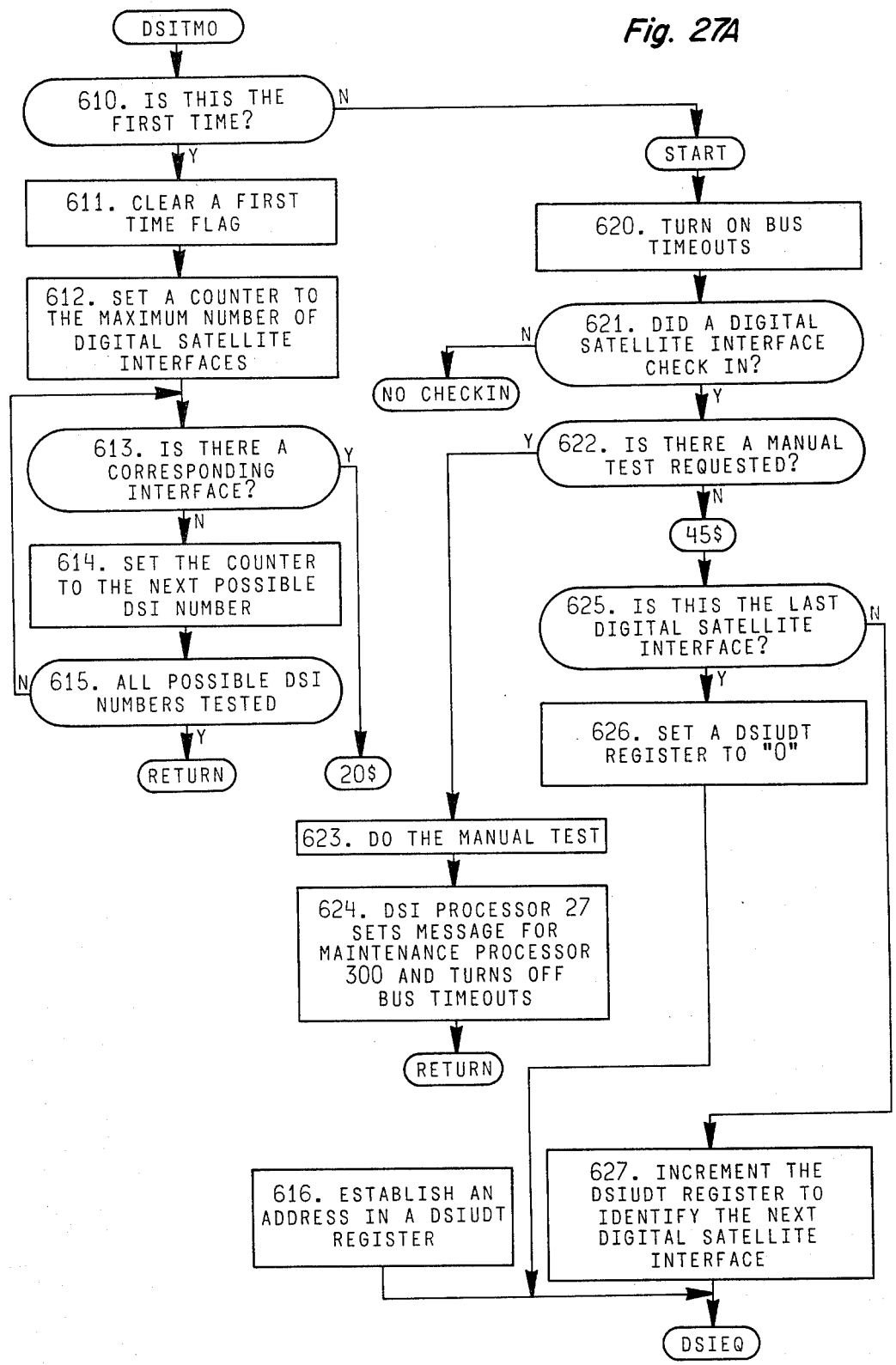
Figure 27B:
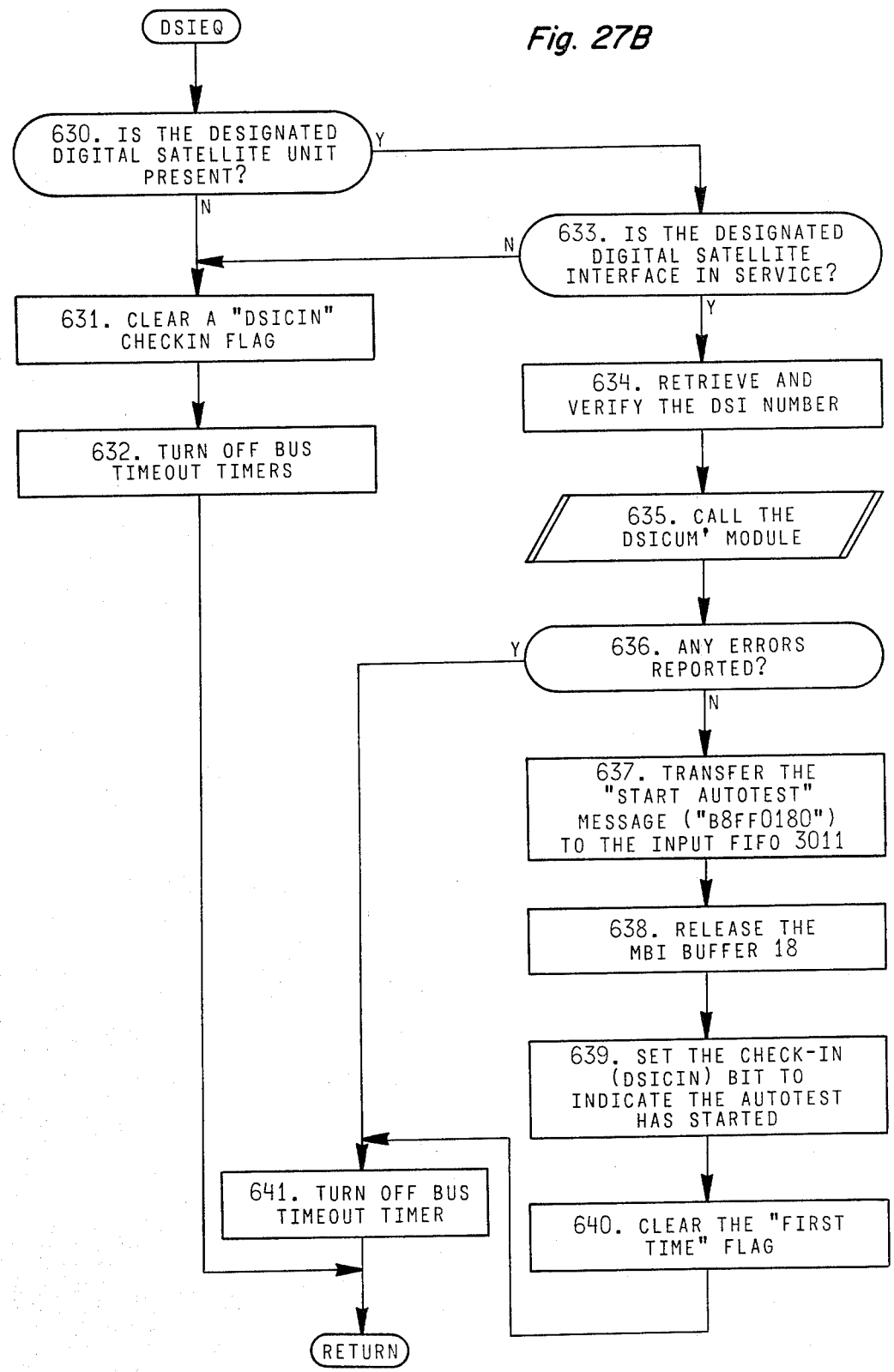

FIGS. 27A and 27B are a detailed flow diagram of the DSITMO module. This module may, in certain circumstances, be used multiple times. The first time (i.e., while performing the functions of step 500 in FIG. 25), step 610 branches to clear a FIRST TIME flag in step 611 and set a counter to a maximum number that corresponds to the number of digital satellite interfaces connected to the MBI buffer 18, shown in FIG. 4, in step 612. Step 613 tests the first number to determine if there is a corresponding digital satellite interface. If there is none, steps 614 and 615 allow each potential interface to be polled in sequence. If no polling operation is successful, the DSITMO module terminates its operation and returns to its calling routine. However, when a digital satellite interface corresponding to the counter number is found, control passes to step 616, where the address for the digital satellite interface is saved in a DSIUDT register. Then control passes to a DSIEQ sequence, shown in FIG. 27B, that initiates the autotest.

If the DSITMO module is being called after the first time, as when step 501 detects that a digital satellite interface is busy or during subsequent diagnostics after a failure, the sequence branches to a start sequence in step 620, which turns on various bus timeouts (e.g., the timeout tested in step 503 in FIG. 25). Assuming that a digital satellite interface has checked in (step 612) the maintenance processor determines whether a manual test is requested, in step 622. If it is, steps 623 and 624 perform the test.

This particular invention is directed to an automatically initiated autotest, so step 622 transfers to step 625, which determines whether the last digital satellite interface is being interrogated. If it is, step 626 clears the DSIUDT register. Otherwise, the DSIUDT register is incremented to point to the next digital satellite interface to be checked in step 627. In either case, control then passes to the DSIEQ sequence in FIG. 27B.

Now referring to FIG. 27B, the maintenance processor again tests to determine if the call processing system is equipped with the designated digital satellite interface in step 630. If it is not, a check in (DSICIN) flag is cleared in step 631 and the bus timeout timer is turned off in step 632. When the system is equipped with the corresponding digital satellite interface, an "in-service" test in step 633 determines whether control branches back to steps 631 and 632 or to step 634 to retrieve the DSI number from the DSIUDT register. Then the maintenance processor 300 uses step 635 to call the DSICOM module that is disclosed in FIGS. 28A and 28B to gain access to the appropriate digital satellite interface. Assuming that the DSICOM module operates properly, no errors will exist, so step 636 branches to step 637. At this point, an autotest command, that is "B8FF0180" in the hexadecimal form for this specific embodiment is transferred to the input FIFO 3017 (FIG. 20) in the diagnostics circuit 30. Then, in step 638, the maintenance processor 300 releases the MBI buffer 18 and sets the DSICIN flag to indicate that an autotest has been started (step 639). A RETRY flag is cleared in step 640 and the bus timeout timer is turned off in step 641. As shown in FIG. 27B, if an error is detected in step 636, control passes directly to step 641 to complete the DSITMO module.

Figure 28A:
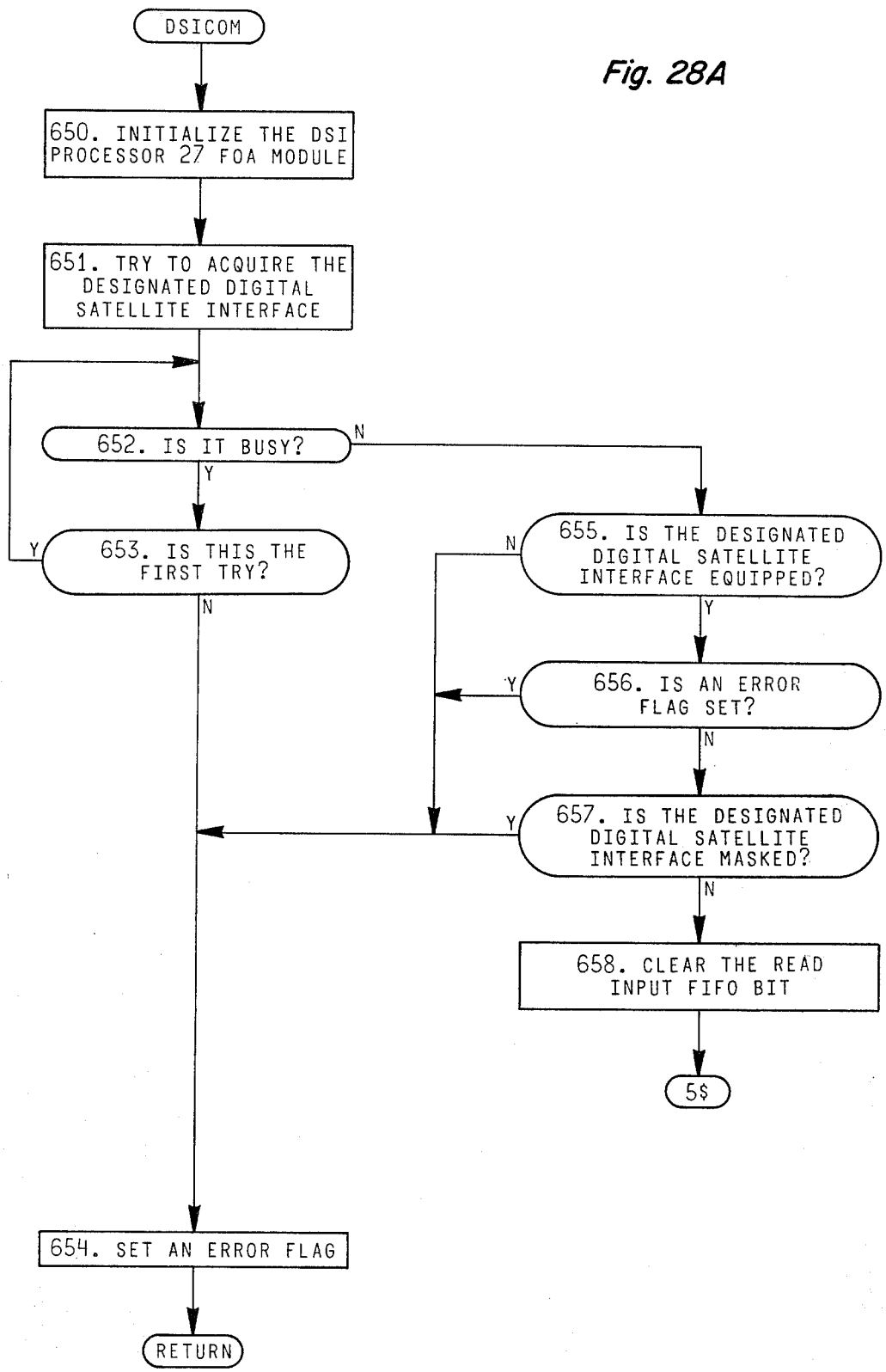
Figure 28B:
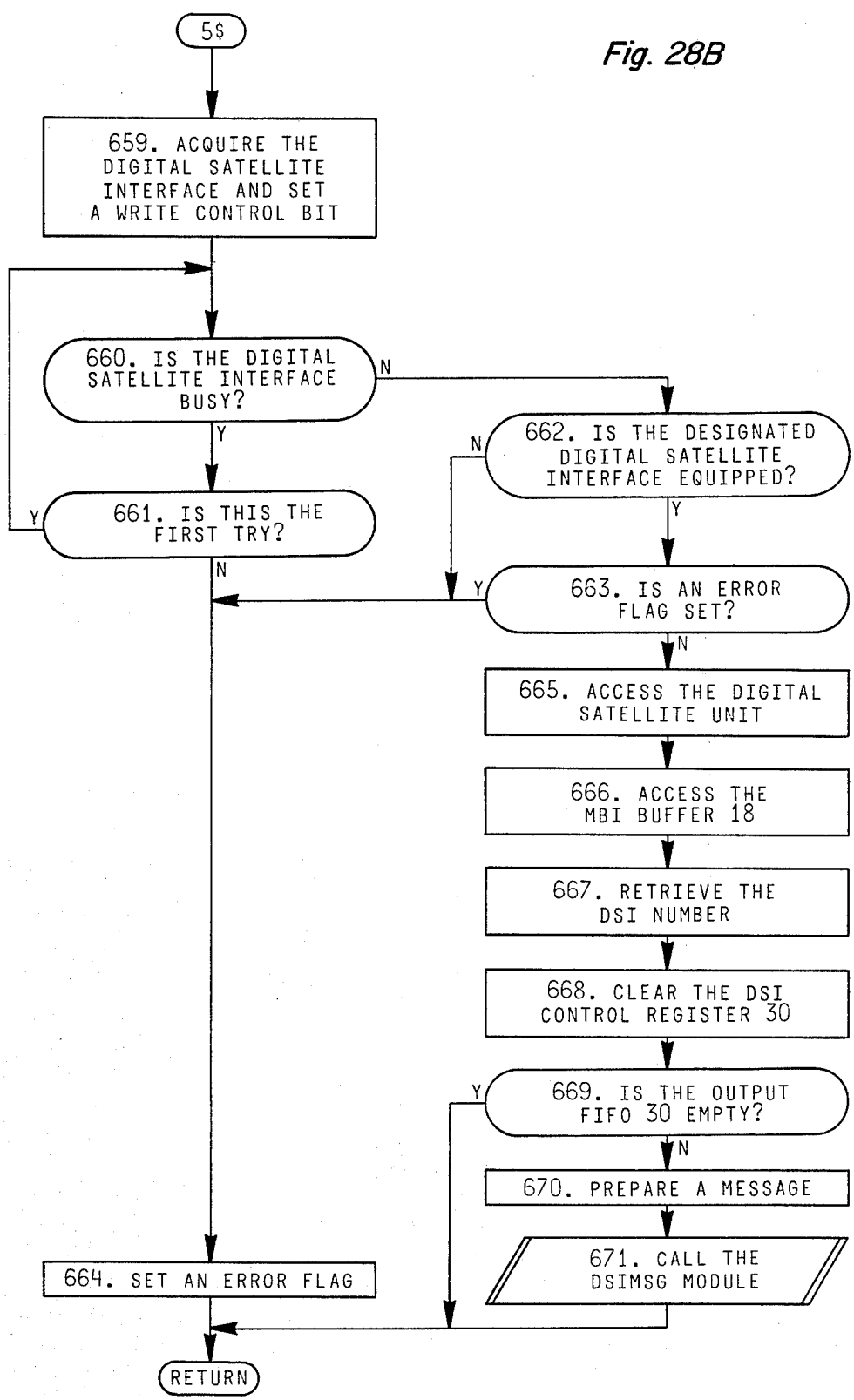

When the DSITMO module calls the DSICOM module in step 635, the DSICOM module in FIG. 28A initializes the processor 300 for a subroutine in step 650. Then, using the DSI number retrieved in step 624 of FIG. 27B, the processor 300 tries to acquire the digital satellite interface in step 651. First, it determines whether the identified digital satellite interface is busy (step 652). If it is, it will try to acquire the digital satellite interface again through step 653. If it is not successful on the second try, an ERROR flag is set in step 654 and a return to the celling routine in FIG. 27B occurs. Then the error test in step 636 diverts control to step 641. If the digital satellite interface is not busy, the processor 300 determines whether the identified digital satellite interface position actually includes the necessary equipment in step 655. If it does not, the ERROR flag is set in step 654. In step 656, the maintenance processor determines if an ERROR flag has been set and, in step 657, it determines if the digital satellite interface has been masked. If either of these tests produces a positive result, the ERROR flag is set in step 654. If the various tests produce the proper answers, control passes to step 658, whereupon the maintenance processor 300 clears the READ INPUT FIFO bit in the control register 3011.

In step 659, the maintenance processor acquires the digital satellite unit by transmitting its number and sets a WRITE CONTROL bit in the status register. Again, the maintenance processor 300 tests the digital satellite interface to determine if it is busy, in step 660, using step 661 as a control for a second try, tests for the presence of equipment in step 662, and tests for other errors in step 663. If the digital satellite interface is busy for both tries, is not equipped, or is subject to errors, control passes to step 664 that sets an ERROR flag before a return occurs. If this set of tests indicates that the digital satellite interface is available, step 663 branches to step 665.

At this point, the communication of the message begins. In steps 665 through 667, the digital satellite interface and MBI buffer 18 are addressed to establish communications with the particular diagnostics circuit 30 in FIG. 8. Next, the maintenance processor 30 clears the control register 3011 in FIG. 20. It then determines whether the input FIFO 3013 is empty. If it is not, a message is prepared for printing in step 670 and the DSIMSG module is called (step 671) to actually print the message at the digital central office. If the input FIFO 3013 is empty, control passes from step 669 to the calling module.

Figure 29:
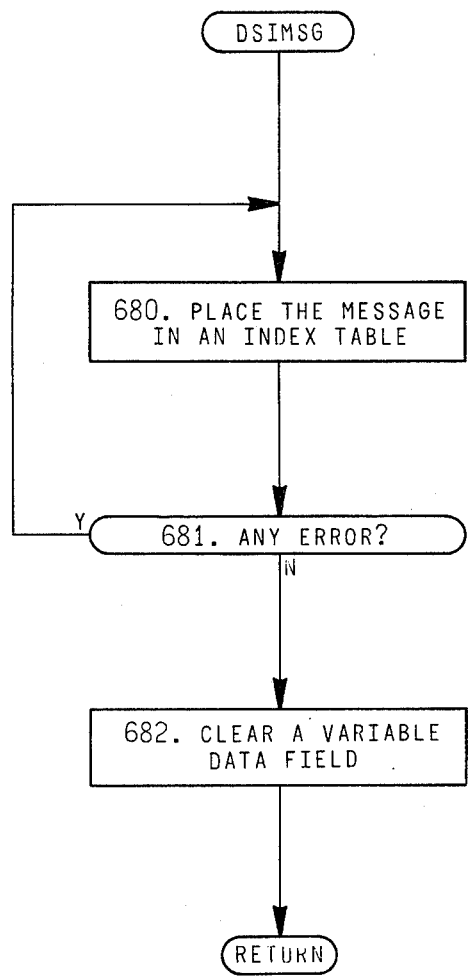
FIG. 29 is a detailed flow diagram of a DSIMSG module that is shown in FIG. 24.

The DSIMSG module is shown in FIG. 29. In this module, an error message is placed in an index table in step 680. It is tested for errors in step 681. If no errors exist, a variable data field is cleared in step 682 and the program returns. Thus, when the DSICOM module has been completed, the digital satellite interface 14 has been acquired and the input FIFO 3013 in FIG. 20 is ready to accept a message. Control then passes back to step 637 in FIG. 27B, whereupon the autotest message is loaded into the input FIFO 3011 and the MBI buffer release occurs, as previously described. The autotesting is initiated at the digital satellite interface and the procedure is at step 505 in FIG. 25A.

ii. Autotest Operation

Figure 25B:
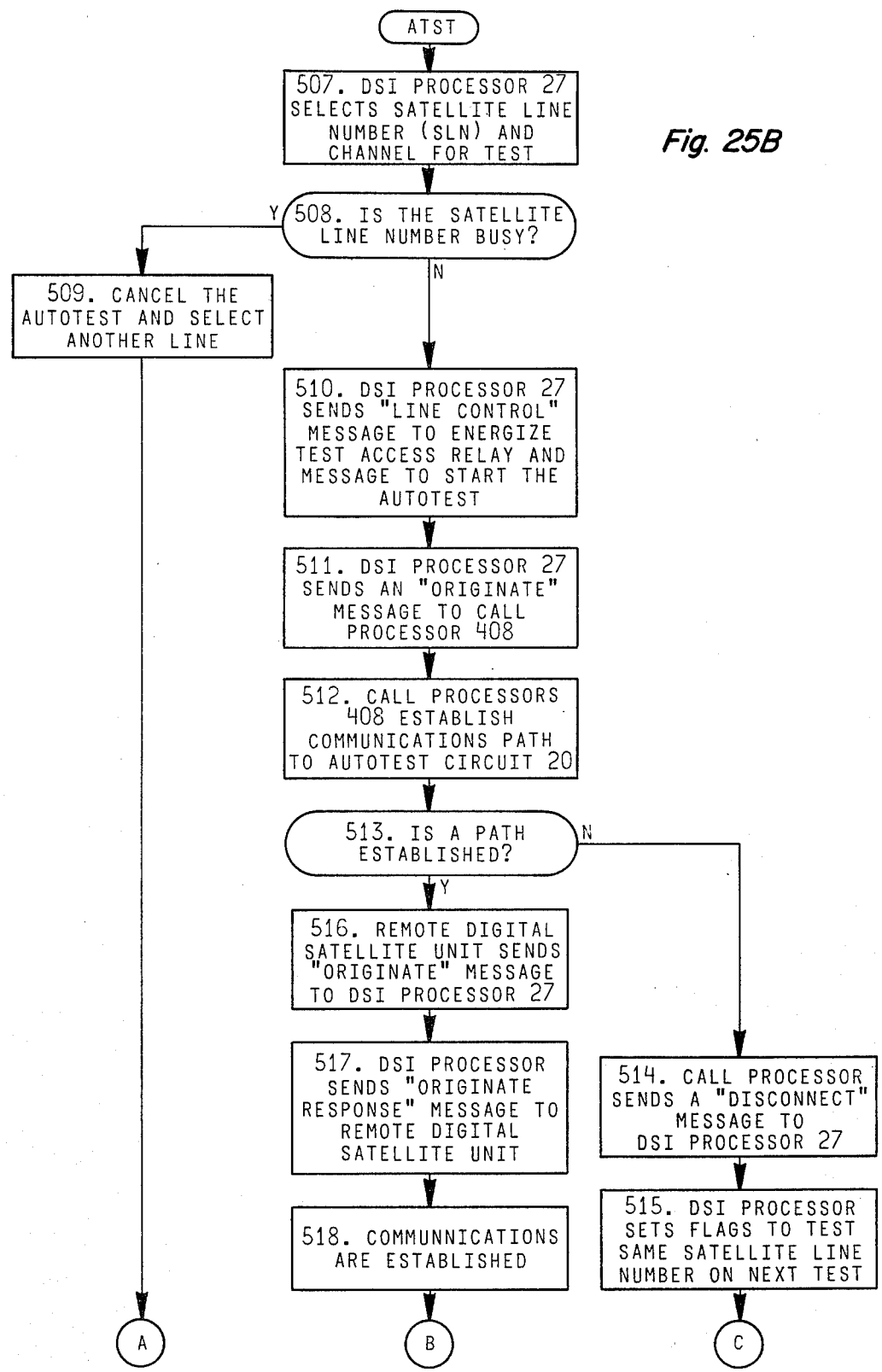
Figure 25C:
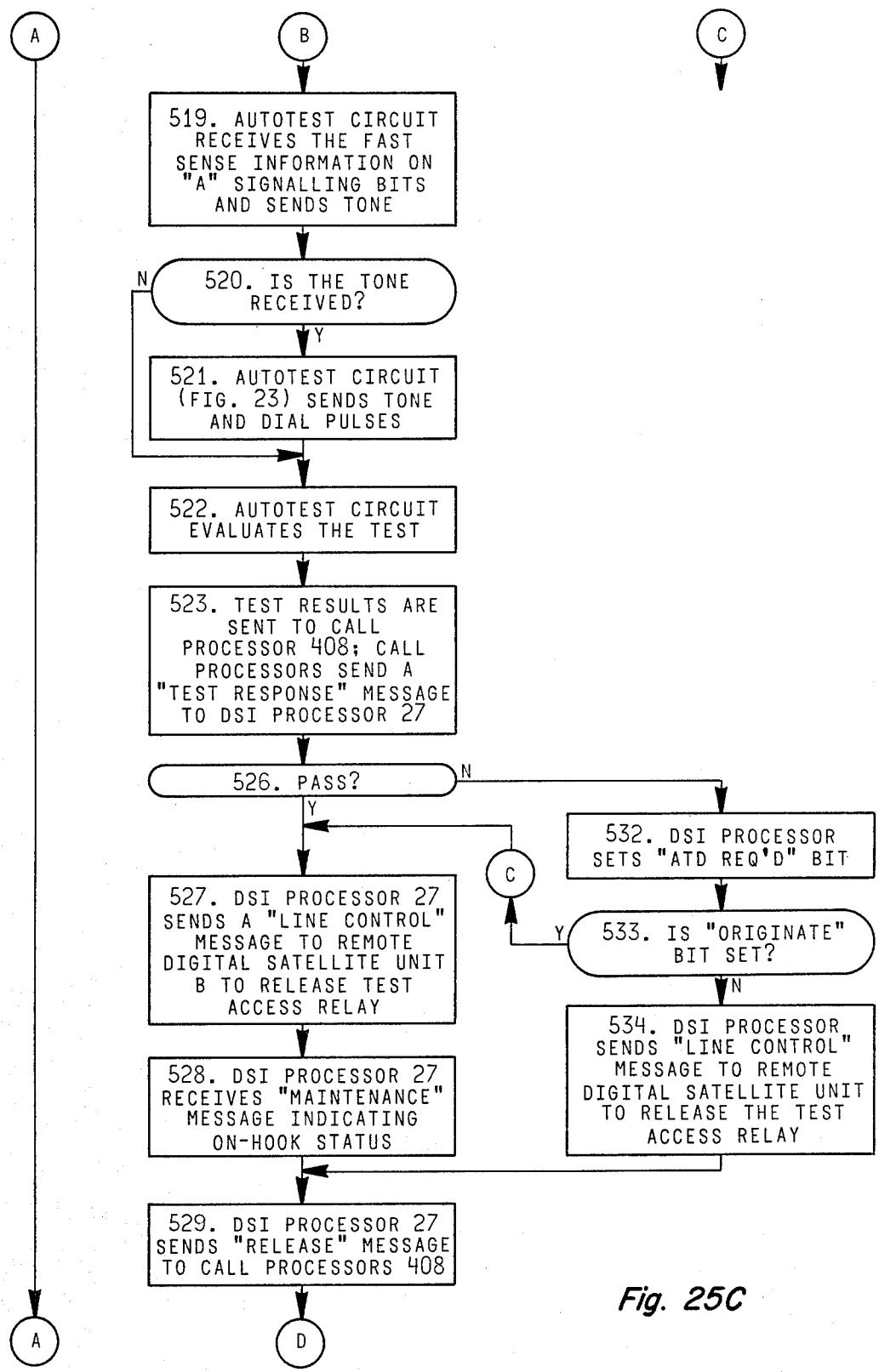
Figure 25D:
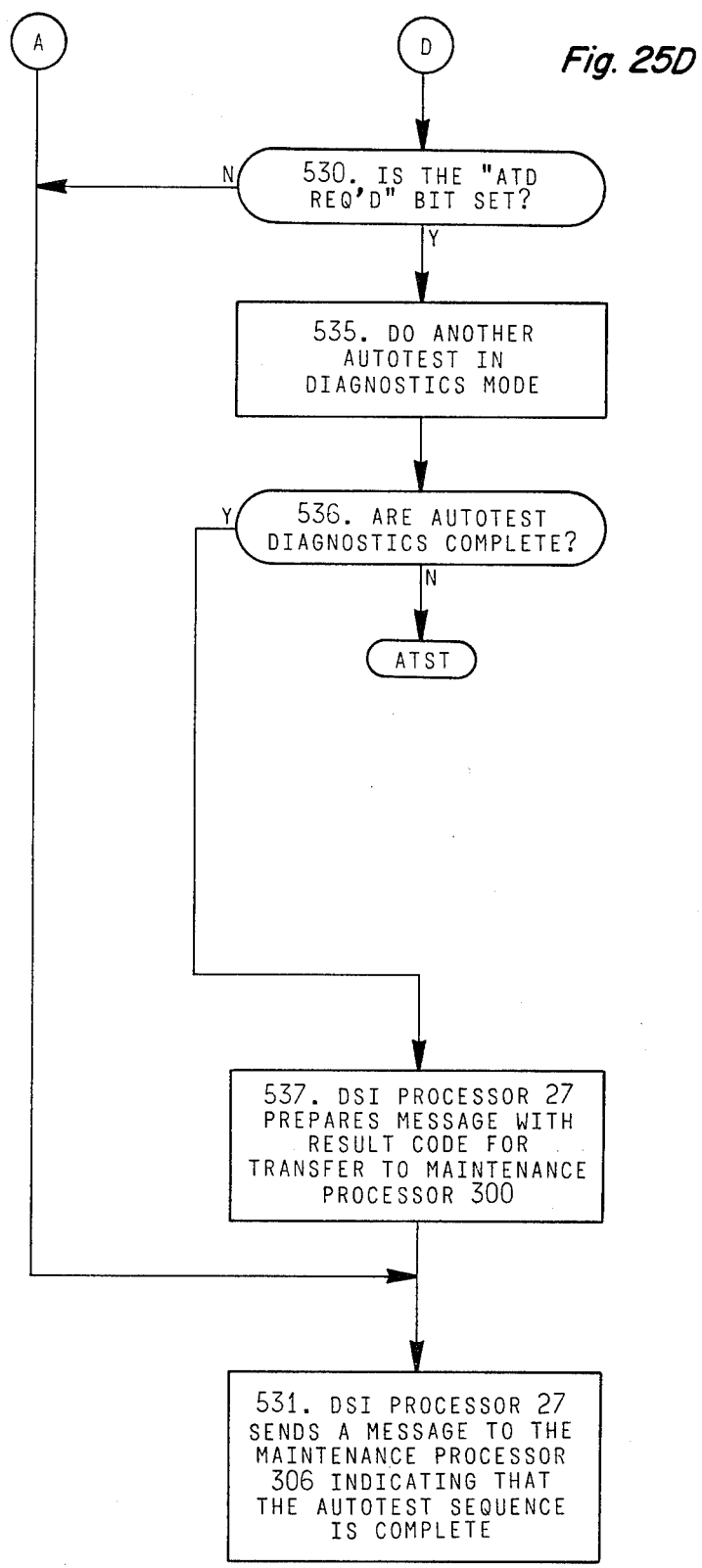

Referring again to FIG. 25, step 506 enables the message to be received and decoded and updates various status flags. The decoding function is basically shown in FIG. 18A. Specifically, during a time interruption, the system will reach step 83, at which point the digital satellite interface 14 will test various conditions and see that there is an input message in the diagnostics circuit 30 shown in FIG. 20. The digital satellite interface 14 now begins the autotesting procedure. FIGS. 25B, 25C and 25D depict the autotesting sequence in a basic functional presentation, to indicate some of the basic steps that occur. However, it is believed that the description is in sufficient detail to enable the construction, from this description, of various modules to be stored in the memory 28 for use by the digital satellite interface processor 27.

In step 507, the processor 27 in the digital satellite interface 14 selects a channel and, from an internal table, a satellite line number that is to be tested. Then, in step 508, it determines whether that satellite line number is busy with a telephone call. If it is, the autotest attempt is cancelled in step 509 and the next satellite line number in sequence is set in the table before the test completes.

If the subscriber line associated with the satellite line number is not busy, the processor 27 in FIG. 10 sends a LINE CONTROL message, shown in FIG. 16, with a test access relay (TA) bit set. The test access relay is energized to disconnect the line circuit 78 in FIG. 15 from the subscriber line and connect it to the TT1 and TR1 leads shown in FIG. 23D. Next, the processor 27 sends a manual maintenance command, in FIG. 16, to the designated satellite line number. The manual maintenance command contains a code that causes the maintenance and administration circuit 79 to start the autotest sequence. This causes the maintenance and administration circuit to force the line circuit under test to an off-hook state, thereby to initiate a calling sequence that corresponds to the sequence that has previously been described.

This call will be sensed in the remote digital satellite interface so that, on a succeeding POLL message from the digital satellite interface 14 to the remote digital satellite unit 13, a POLL RESPONSE message will be transmitted. Then a POLL ASSIGN message will be sent and an ORIGINATE message will be generated by the remote digital satellite unit 13. When this occurs, the digital satellite interface 14 recognizes that this line is under test and sends a TEST CALL CONTROL message, shown in FIG. 10, to the call processors 408. The TEST CALL CONTROL message includes the satellite line number, the channel that has been assigned, and a test pointer. For an autotest, the test pointer has a value "0", other values are used for manual testing. The transmission of this TEST CALL CONTROL message corresponds to step 511 in FIG. 25B.

The call processors 408 respond to the TEST CALL CONTROL message and complete a path to the automatic test control circuit 20 shown in FIG. 2. Moreover, they establish paths for the FAST SENSE supervisory signals from the line under test. These signals convey the status of the hook switch to the automatic test control as FAST CONTROL supervisory information, specifically, the DAA signals in FIG. 22D that initiate the operation of the autotest circuit 20. In addition, the call processors 408, in step 512, establish a six-second timer. During such an interval, an entire autotest ought to be performed. If the call processors 408 cannot establish a path to the automatic test circuit 20, step 513 shifts control so the call processors 408 can send a DISCONNECT message in step 514 and prepare to test the same satellite line number when a next test is scheduled, in step 515.

Step 516 corresponds to the transmission of the ORGINATE message to the digital satellite interface 14. The digital satellite interface 14 responds to this message by sending an ORIGINATE RESPONSE message, shown in FIG. 16, that identifies the span and channel over which the autotest will be conducted.

Step 518, in FIG. 25, indicates the beginning of the transfer of the hook switch status signals over the "A" signalling bits of the span and through the call processors 408 to the automatic test circuit to initiate the operation.

As a result, the automatic test circuit generates the tone, represented in step 519, that is followed by the receipt of a tone and at least two dial pulses, represented in steps 520 and 521, with the automatic test circuit recording those results in step 522. Specifically, at the completion of a one-second (interval, the DP TEST signal, in FIG. 22D, is generated so that the DP OK signal from the flip-flop 2031 and TONE RECEIVED signals will provide DAC signals to the port group control to indicate the success of the autotest.

Figure 18B:
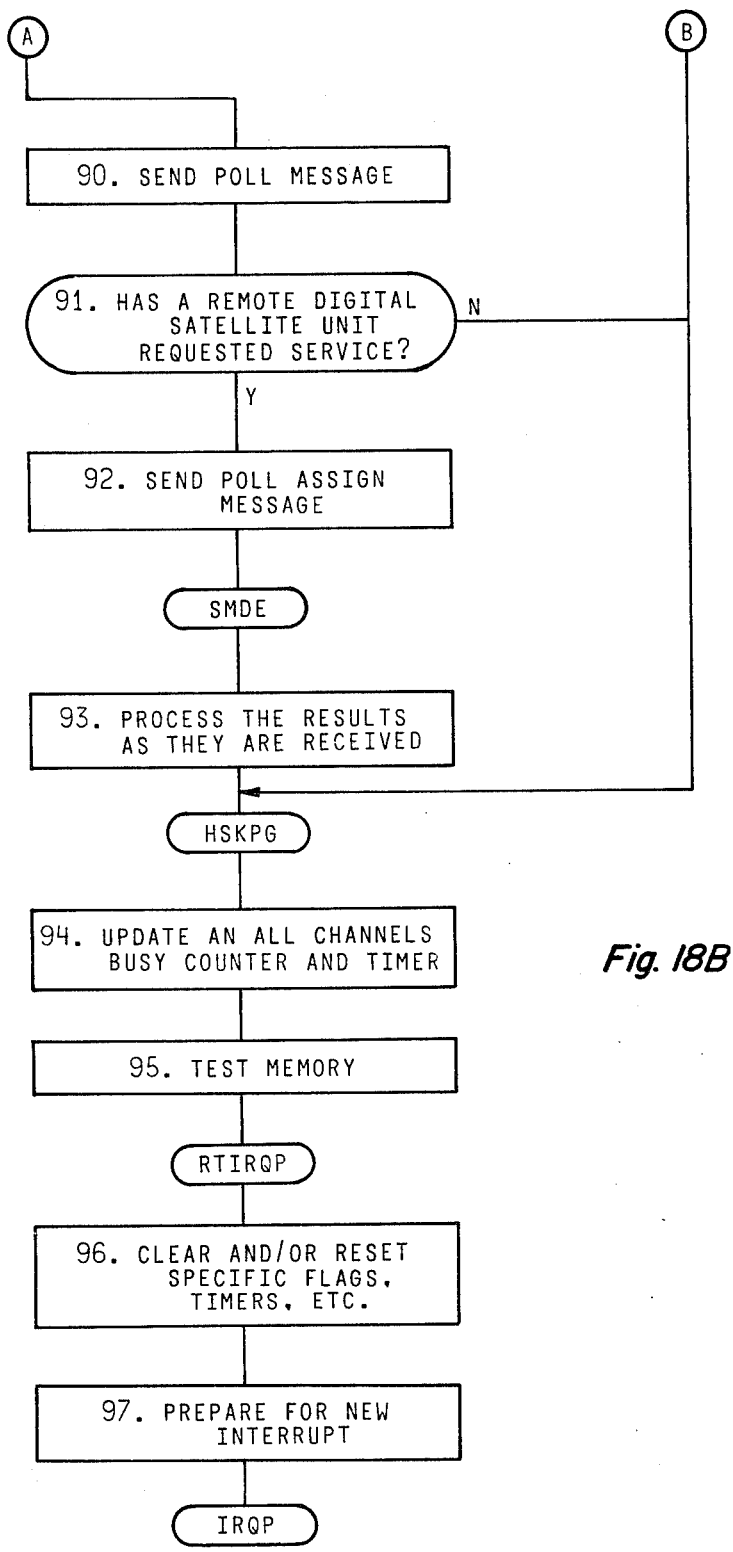
FIG. 18 comprises FIGS. 18A and 18B and is a flow chart that depicts a control program utilized in the digital satellite interface.
Figure 30A:
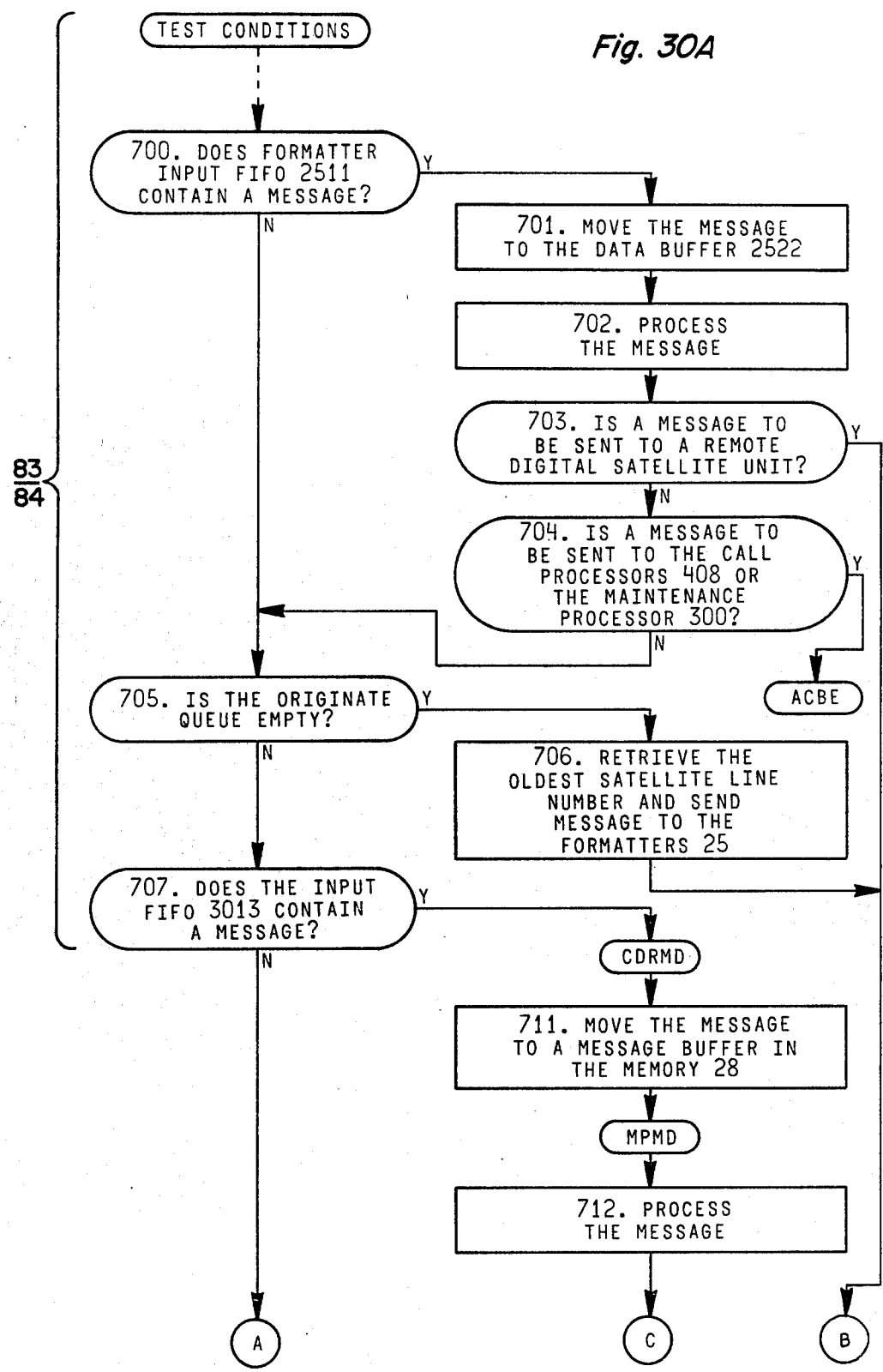
FIGS. 30A and 30B, is a detailed flow diagram of certain steps shown in FIG. 18.
Figure 30B:
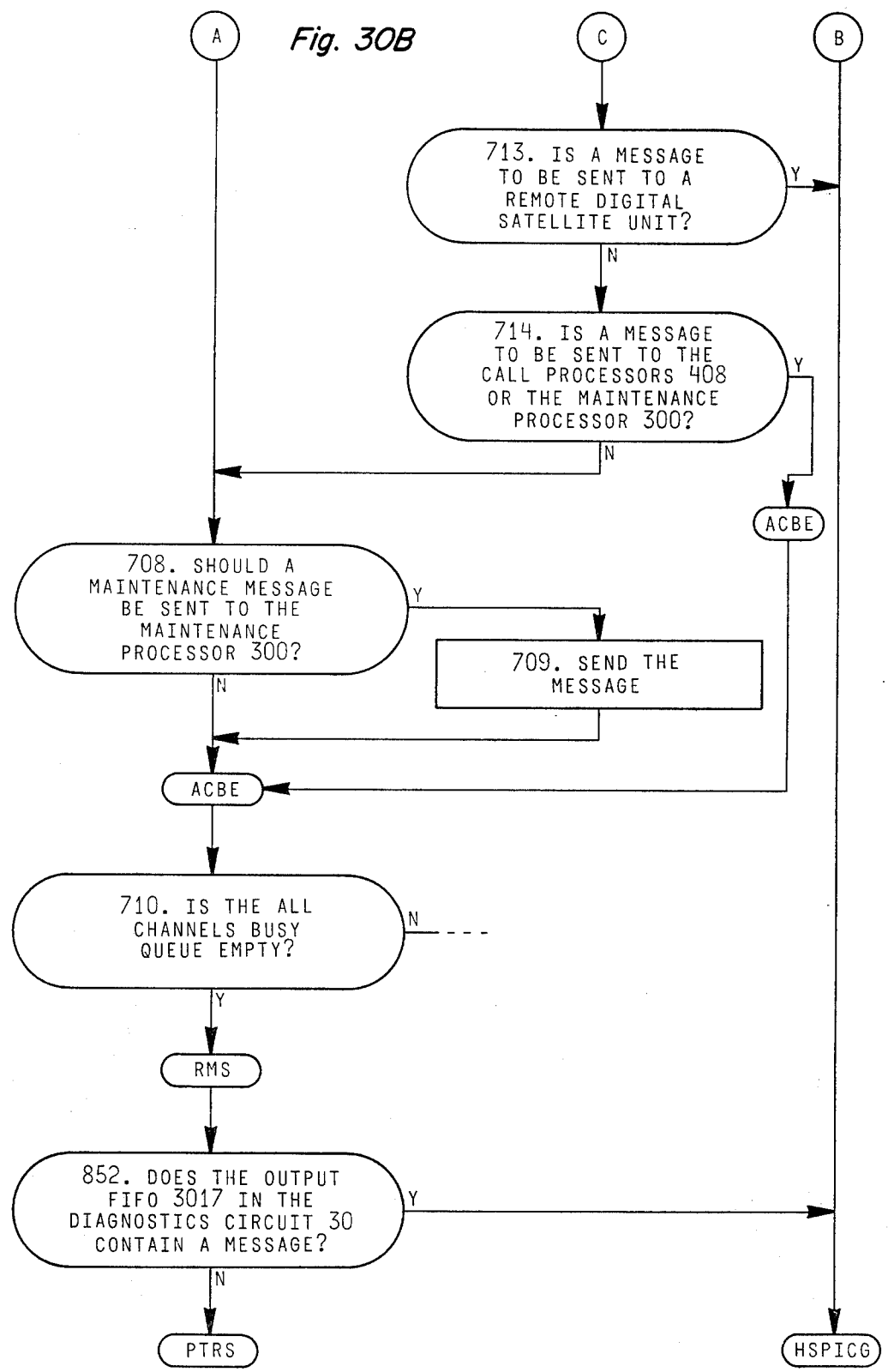

FIGS. 30A through 32 depict the operation of the digital satellite interface 14 during step 83 in FIG. 18A and in steps 507 through 523 in FIG. 25. Referring to FIGS. 30A, there are a number of conditions that can be tested in step 83. For example, in step 700 of FIG. 30A the digital satellite interface 14 determines whether the formatter input FIFO 2511 in FIG. 6 contains a message from the controlling call processor 408. Any such message is read and processed in steps 701 and 702. Step 703 diverts to the housekeeping (HSKPG) routine in FIG. 18B if a message is to be sent to the remote digital satellite unit. Step 704 branches to an ACBE sequence in FIG. 30B if a message is to be sent to either the call processors 408 or the maintenance processor 300. Otherwise, step 704 branches back to step 705 to perform another test. If the formatter input FIFO 2511 does not contain a message, step 700 branches directly to step 705.

An ORIGINATE queue is tested in step 705 to determine whether the queue contains any unserviced ORIGINATE messages received from the various remote digital satellite units for squential processing by the digital satellite interface 14. If it is not empty, step 706 retrieves the oldest satellite line number awaiting response and sends a message to the formatters 25.

Step 707 is the test that ascertains the presence of the message, such as the message to start the autotest, in the input FIFO 3013 of diagnostics circuit 30 (FIG. 20). If the input FIFO 3013 does not contain a message, step 707 branches to step 708 to determine if a maintenance message should be sent, in step 709, to the maintenance processor 300. Then the system transfers to the ACBE sequence in which an ALL CHANNELS BUSY queue is checked in step 710. The ALL CHANNELS BUSY queue indicates whether any channels are available on the span equipment. If it is busy, certain steps are taken that are not important to this invention. If it is empty and channels are available, control passes back to step 85, where the output FIFO 3017 in the diagnostics circuit 30 of FIG. 20 is tested to see if it contains a message.

Referring again to FIG. 30A, when the input FIFO 3013 contains the message, the processor 27 moves the message to a message buffer in the memory 28 during an LDRMR sequence in step 711 and processes that message in an MPMD sequence in step 712. If a message is to be sent to the remote digital satellite unit, step 713 branches to the HSPKG sequence. Otherwise, step 714 determines whether a message is to be sent either to the call processors 408 or the maintainence processor 300. If such a message is to be sent, control passes back to the ACBE sequence represented by step 710. If no such message is to be sent, control passes to step 708. Thus, in FIG. 30A, the processor 27 uses various sequences represented by steps 707, 711, 712, 713, and 714 to retrieve the message from the diagnostics circuit 30 as part of step 506 in FIG. 25A.

Figure 31A:
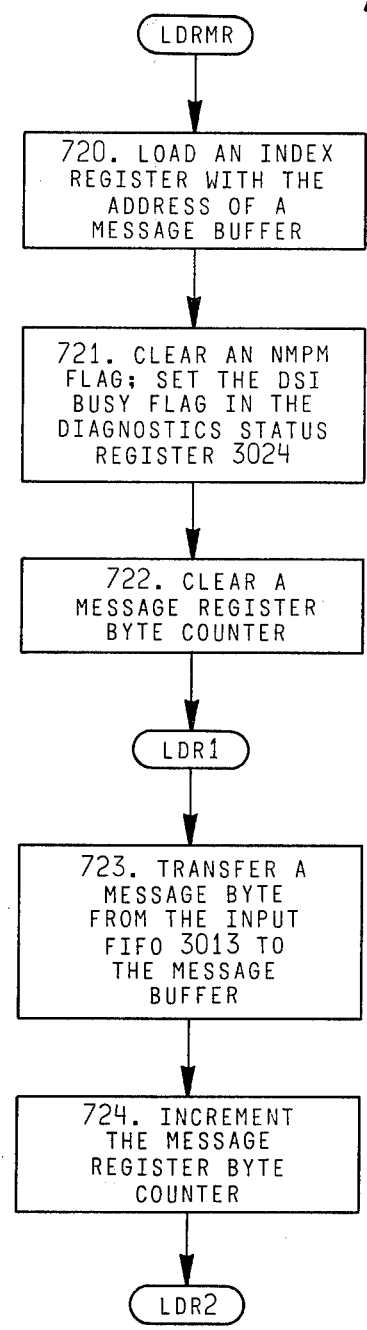
FIGS. 31A and 31B, is a detailed flow diagram of certain steps shown in FIG. 30.
Figure 31B:
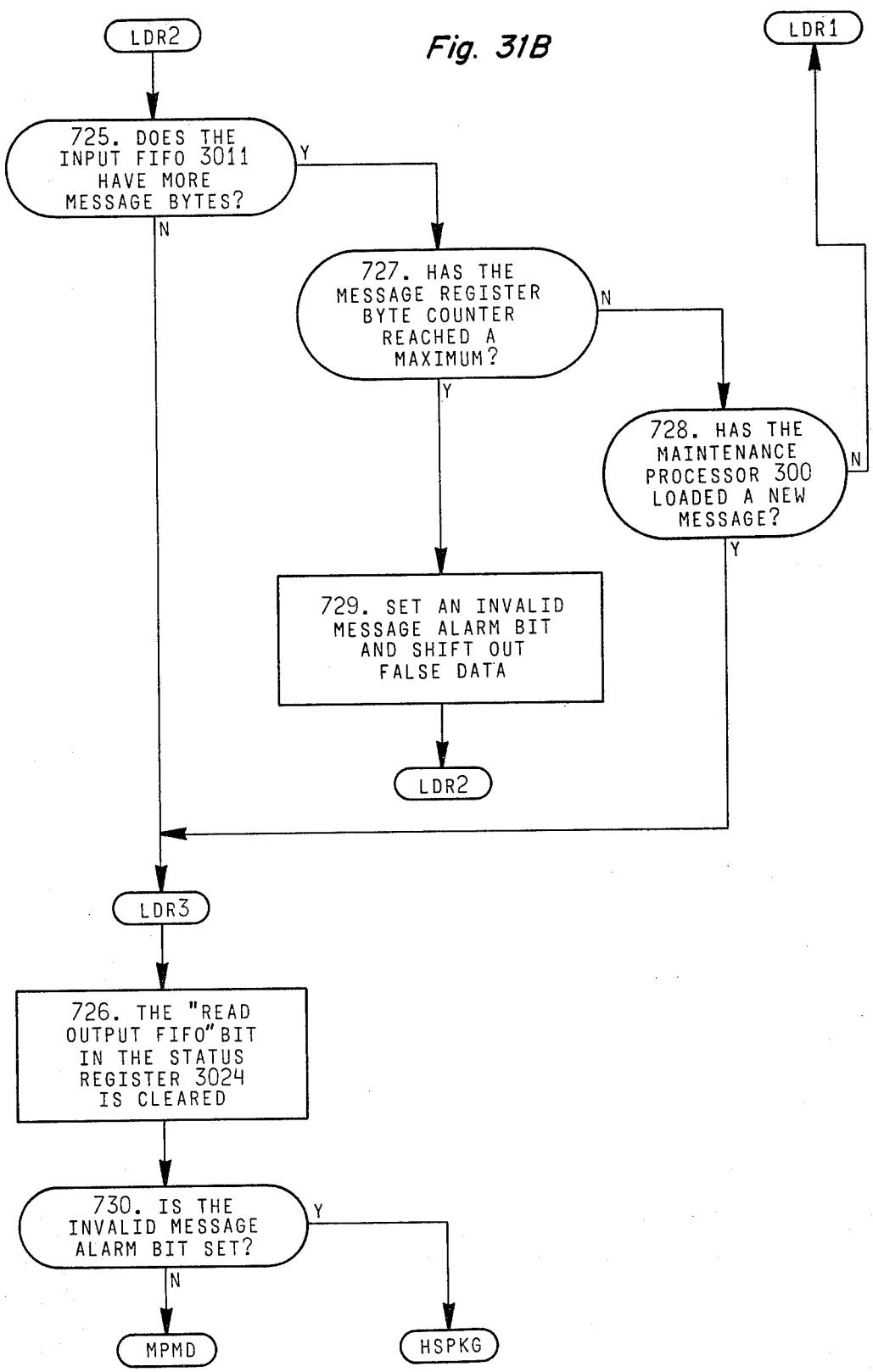
Figure 32:
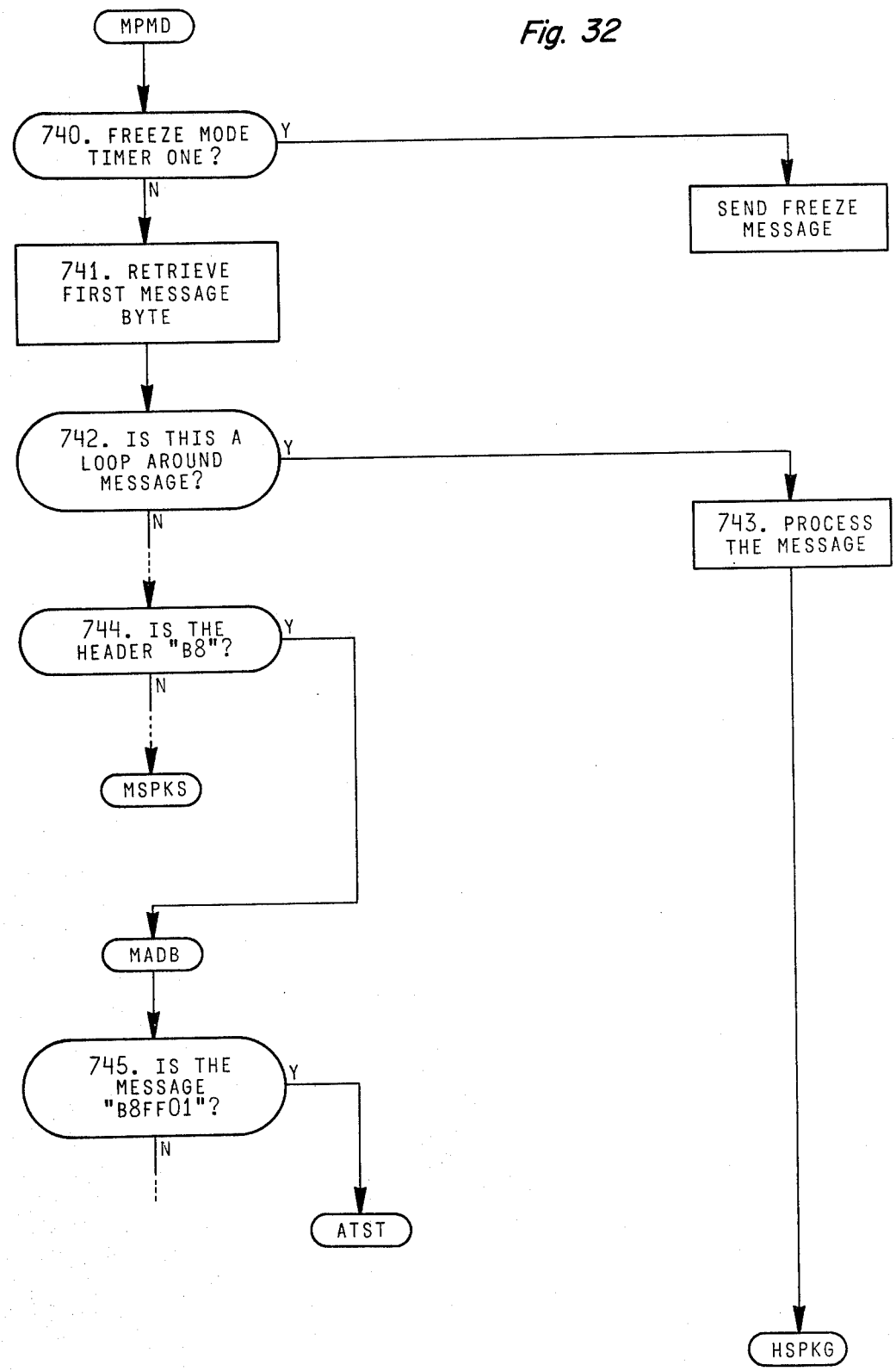
FIG. 32 is a detailed flow diagram of certain steps shown in FIG. 30.

The transfer and processing of the message during the LDRMR and MPMD sequences shown in steps 711 and 712 are more clearly set forth in FIGS. 31A, 31B and 32. An index register for the processor 27 receives a value corresponding to the address of a message buffer in the memory 28 in step 720 of FIG. 31A. In step 721, an NMPM flag is cleared and the DSI BUSY flag in the diagnostics status register 3024 is set. Then a MESSAGE REGISTER BYTE counter in the memory 28 is cleared, in step 722. This initializes the processor 27 to effect the transfer of a message byte from the input FIFO 3013 in the diagnostics circuit 30 to the message buffer identified by the index register. After this transfer occurs, in step 723, the MESSAGE REGISTER BYTE counter is incremented in step 724 and a test is made to determine if more bytes are to be transferred to step 725. When the message has been completed, control passes to step 726, where the READ FIFO bit in the status register 3024 is cleared.

If the input FIFO 3011 has another byte (step 725) and the message complies with certain maximum length requirements (step 727), step 728 determines if the maintenance processor 300 has sent a new message to the input FIFO 3011. Any such message would override the previous message. If it has not, control passes back to step 723 in FIG. 31A so the next message byte can be obtained. If the message length exceeds a maximum, an error exists so step 727 branches to step 729 to set an INVALID MESSAGE ALARM bit and to shift out false data from the buffer in the memory 28, thereby to clear the message. Then control passes back to step 725 and, as the input FIFO 3011 has no additional message bytes, control passes through step 726 to step 730. If the INVALID MESSAGE ALARM bit has been set in step 729, control passes back to the HSPKG sequence. However, if the message has been validly received, control passes to an MPMD sequence that is depicted, in part, in FIG. 32.

The MPMD sequence decodes the header of an incoming message from the maintenance processor. Specifically, in FIG. 32 a freeze mode timer test in step 740 normally passes control to step 741 to retrieve the first message byte from the buffer in the memory 28. Then a set of sequential decoding steps are processed. A first such decoding step 742 tests the message header to determine if a LOOP AROUND message has been sent. If it has, the message is processed in step 743 before control passes back to the HSKPG sequence.

The autotest sequence is, as previously indicated, started with a message "B8FF01". That header eventually is decoded in the testing sequence in step 744. Then an MADB sequence fully decodes the message. With the autotest starting message, step 745 passes control to an ATST sequence. This sequence enables the digital satellite interface to initiate steps 507 through 523 in FIG. 25.

iii. Response to Successful Autotest

As previously indicated, the FAST SENSE bits in the port store area for the autotest circuit 20 indicate the success or failure of the autotest sequence. As described in U.S. application Ser. No. 924,883, the storage of the FAST SENSE bits constitutes an event that interrupts call processor operations. In response, the call processor determines whether the test has passed or failed. When this occurs, the call processor transfers a TEST RESPONSE message, shown in FIG. 10, to the digital satellite interface 14 indicating that success or failure. The TEST RESPONSE message includes the satellite line number (SLN) for the remote line under test and test results. Test results of "1" indicate success; of "2", failure. This message is then recieved in the digital satellite interface 14 and the results are tested in step 526 shown in FIG. 25.

When the autotest is successful, the digital satellite interface 14 transfers a LINE CONTROL message (step 527), shown in FIG. 16, to the remote digital satellite unit 13 under test with a TA bit cleared. This causes the test access relay to be opened so that the line circuit is connected back to the subscriber's line and disconnected from the maintenance and administration circuit 79. At this point a DISCONNECT (DS) flag is set to indicate that the remote subscriber is on-hook. Then the digital satellite interface 14 sends a RELEASE message (step 529) shown in FIG. 9 to the call processors 408 so they can indicate that the remote subscriber's line is now idle and available to be called. When the autotest is successful, an ATD REQUIRED flag is cleared, so step 305 branches to step 531. At this point, the digital satellite interface 14 sends A TEST COMPLETE message to the maintenance processor (step 531) having a message to the maintenance processor (step 531) having a B0 header followed by a code indicating that the autotest has been completed.

iv. Response to Autotest Failure

If the TEST RESPONSE message indicates a failure, step 526 in FIG. 25 branches to step 532 to set the ATD REQUIRED flag and test the status of an ORIGINATE bit in step 533. The ORIGINATE bit is set when an ORIGINATE message is sent and, therefore, indicates whether the first steps for placing the call occurred (i.e., the ORIGINATE message in step 511 was processed). If it was not sent, a LINE CONTROL message is sent to the remote digital satellite unit to release the TA relay (step 534) and then control passes to step 529, so the digital satellite interface 14 sends the RELEASE message to the call processors 408. If the ORIGINATE message was sent, the normal disconnection process of steps 527 through 529 occurs. In either case step 530 branches to step 535, which initiates an autotest diagnostics sequence that uses successive autotests through different sections of the remote digital satellite unit to isolate the reason for the failure. Thus, step 536 transfers control back to step 507 to initiate another test call. When the sequence is complete, step 536 branches to step 537 so the digital satellite interface 14 prepares a message indicating the failure and the results of the diagnostics. This message is sent to the maintenance processor before transferring to step 531.

In another failure mode, the autotest sequence does not complete within a predetermined time. In this mode, an MP timer in the maintenance processor 300 times out, causing the maintenance processor 300 to test the INPUT FIFO NOT EMPTY bit in the status register 3011 of the diagnostics circuit 30 in FIG. 20 (step 541). That bit is set if the digital satellite interface 14 did not accept the previous message (step 542), so the maintenance processor initiates a restart operation in step 543. If this is the first time out, step 544 branches and a new autotest is started in step 545. If a second time out occurs, however, or if a time out occurs in step 503, control passes to step 504. If the INPUT FIFO NOT EMPTY bit is cleared (step 541) after the first time out, control passes from step 546 to step 547 to enable the maintenance processor 300 to send a message to the digital satellite interface 14 to cancel the autotest. After a second time out, step 547 branches directly to step 504 to initiate fault diagnosis as required.

v. Autotest Result Message to Maintenance Processor

Figure 33:
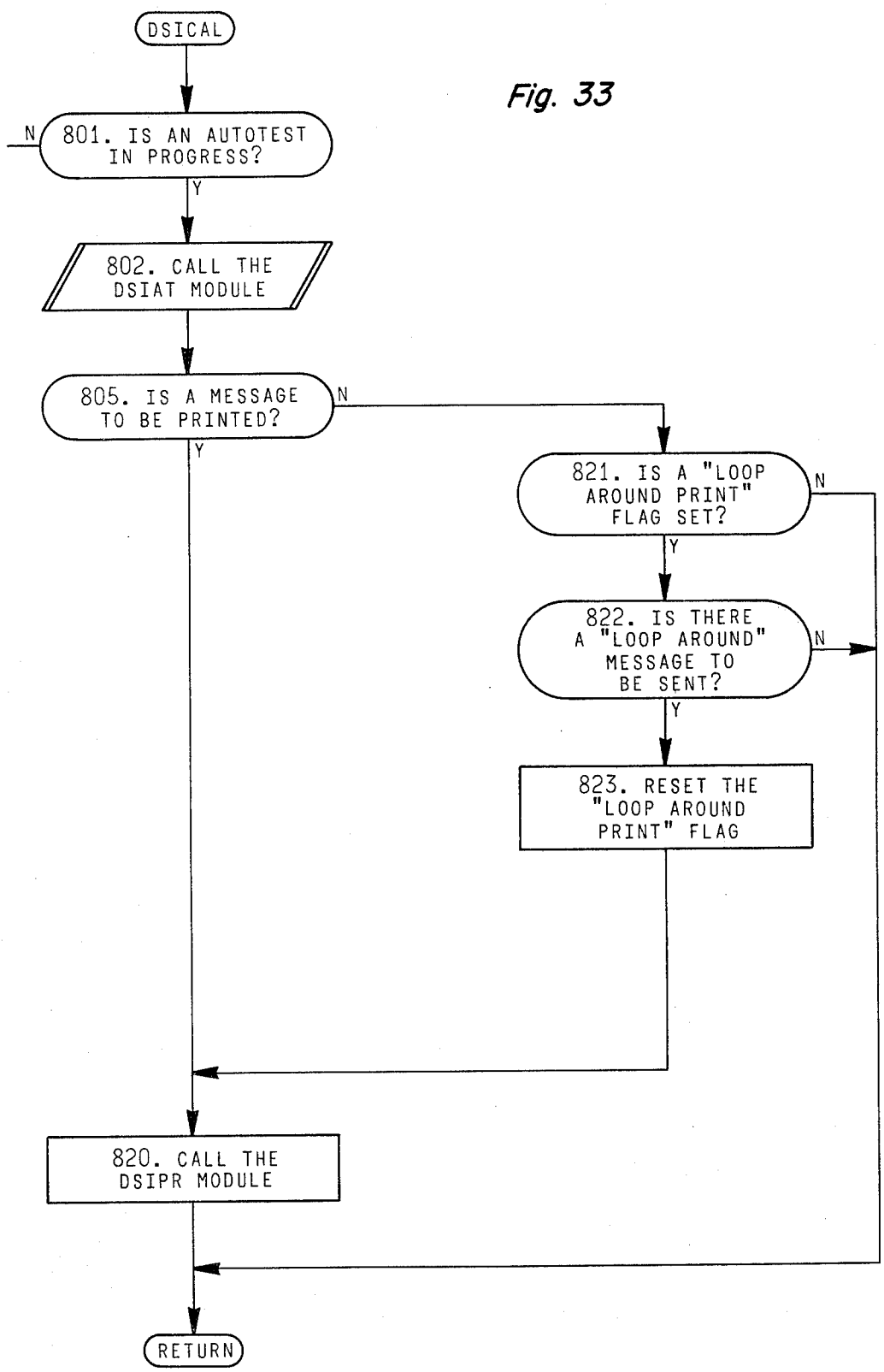
FIG. 33 is a detailed flow diagram of a DSICAL module that is shown in FIG. 24.
Figure 34:
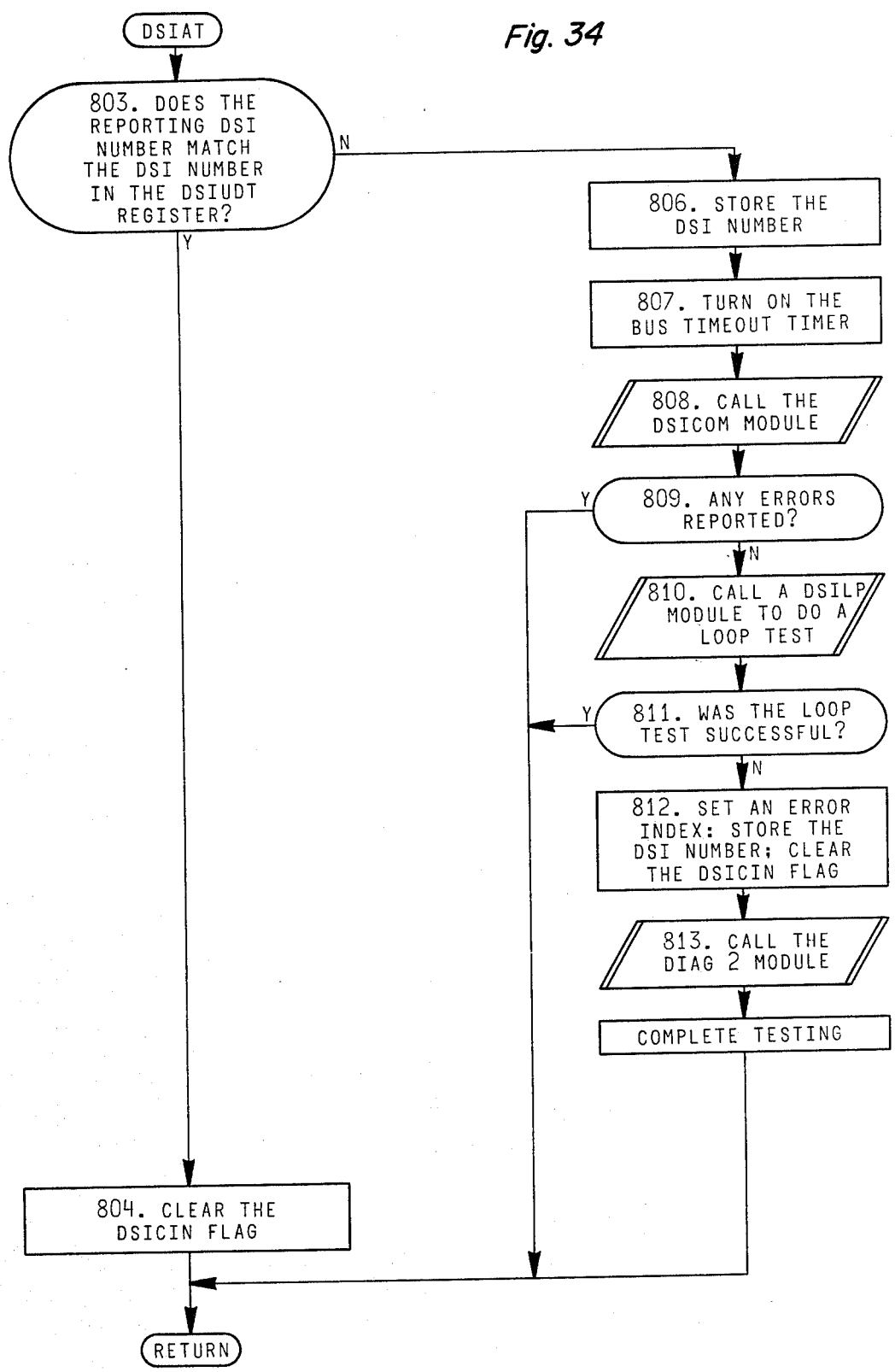
FIG. 34 is a detailed flow diagram of a DSIAT module that is shown in FIG. 24.

When the call processor 408 has the autotest results, it also sends a message to the maintenance processor 300. The DSIHND module in the maintenance processor 300, shown in FIG. 24, sets a flag so the DSIFLD module in FIG. 26A branches from step 600 to call the message handler (DSICAL) module that is depicted in FIG. 33. The DSICAL module first determines (step 801) if the message is a result of an autotest. If it is, a "check-in" (DSIAT) subroutine is called in step 802. Referring to FIG. 34, the maintenance processor 300 first determines if the digital satellite interface that is reported as having completed the autotest function is the one that is supposedly under autotest. If it is, step 803 branches to step 804 to a clear a check-in (DSICIN) flag and transfer control back to step 805 in FIG. 33.

If the reported interface number (i.e., the "DSI number") is not correct, a number of steps that are set forth in FIG. 34 provide various tests to isolate the cause of this error. First the maintenance processor 300 stores the DSI number in step 806 and establishes a time interval for testing in step 807 by turning on a maintenance processor timer. Then the maintenance processor 300 uses the DSICOM module in FIG. 28 to acquire the interface that was suppossed to be under test (step 808). If any errors are detected, step 809 branches to complete processing of the DSIAT module. If a loop test in step 810 is successful, control passes back to the calling routine in step 811. The DSICIN flag is cleared and an error index is established along with the DSI number in step 812 so a DIAG2 diagnostics module can be used (step 813) to ascertain the cause of the incorrect check-in procedure.

With a normal check-in, control returns from the DSIAT module to step 805 in FIG. 33, which is the beginning of a message control sequence. The DSIPR sequence is called in step 820 in order to print any such message on a printer such as the teletypewriter 305 in FIG. 2. If no message is to be printed, control passes to step 821 to ee if a LOOP AROUND PRINT flag is set. If it is not, the DSICAL module is complete. Otherwise control passes to step 822 to see if a LOOP AROUND message ought to be sent. If not, the module is complete. If a loop around message is to be sent, control passes to step 823, where the LOOP AROUND PRINT flag is cleared and to step 820 to call the DSIPR module in order to print the message.

vi. Autotest Diagnostics

The response to an indication of autotest failure is depicted at steps 516 through 537 in FIGS. 25B, 25C and 25D, and is delineated in detail in FIGS. 35A through 35D. In step 900 the digital satellite interface 14 is tested to determine if it is available for autotest. If it is not, then steps 901, 902, and 903 ascertain what operations should be performed. When it is available, a test is made to determine if this is the second attempt to run the autotest operation. If it is, step 904 branches to step 905 to set the ATD REQUIRED bit; otherwise, the autotest is rerun. If the test is successful, a set 906 of steps that are analogous to steps 901 through 903, establishes the message to be sent to the maintenance processor 300 and then disconnects the line. If a failure occurs, steps 907, corresponding to steps 532 through 534 in FIG. 25, set the ATD REQUIRED bit and test the ORIGINATE bit to release the test access relay and disconnect the line.

In accordance with another aspect of this invention, the remaining steps in FIGS. 35A through 35D perform successive autotests. However, these tests are performed over paths through the remote digital satellite unit 13 that is shown in block form in FIG. 15 that differ from the original paths of the first autotest call. To understand the specific nature of these diagnostic tests, it also is necessary to understand that each of the line circuits 78 in a digital satellite interface is identified as being in one of several "odd" or "even" cells or line groups, corresponding to the odd and even divisions of the local telephone lines 11, as those terms are defined in U.S. application Ser. No. 924,883. Thus, in step 910, the digital satellite interface 14 determines if another line in the same half of the cell (i.e., the "odd" or "even" half) that includes the original line circuit is available for testing. A message with a result code "09" is sent to the maintenance processor 300 indicating that no line is available in step 911 or the autotest is performed with that line in step 912. If the autotest is successful, the digital satellite interface 14 disconnects that line and sends a result code "01" indicating that the original line circuit 78 has failed.

If the autotest performed in step 912 fails, the digital satellite interface 14 determines whether the original line has a dedicated channel on the span. If it does, a message indicating the failure and the fact that the original line was a dedicated channel is sent to the maintenance processor in step 915. If the channel is not dedicated, the ORIGINATE bit is tested, in step 916. If the ORIGINATE bit is set, there is an indication that the second line circuit detected the call and the line associated with the second call is disconnected.

If the remote digital satellite unit contains two "halves" (i.e., both an "odd" and "even" half), step 920 branches to step 921 to enable the processor 27 to ascertain whether a line is available in that other half. If no such line is available, a result code "0A", indicating that another line is not available, is sent to the maintenance processor in step 922. Otherwise, a line in the other half is tested in step 923. Success of that test indicates that the original line circuit clock distribution buffer 80 in FIG. 15 is bad. If a failure occurs, the line involved with this second test is disconnected.

If the second test fails or if it can not be performed (step 920) a third test determines whether the line level multiplexer/demultiplexer has failed. Specifically, another line in another cell of the same digital satellite interface is selected in step 926. This requires the call to be placed through another of the circuits 76A, 76B, etc. in FIG. 15. If no such line is available, step 927 produces a message indicating either that no line is available in the other cell (a result code "0C") or that the remote digital satellite unit does not have another cell assigned to it (i.e., a result code "0B"). If a line is available, the autotest is again run (step 930). If this autotest passes, then the circuit in the line level multiplexer/demultiplexer 76 in FIG. 15 that was used in the original call is bad, so a message with a result code "03" is sent to the maintenance processor 300 in step 931. If the autotest in step 930 fails, the line used in this third test is disconnected in step 932.

Figure 35B:
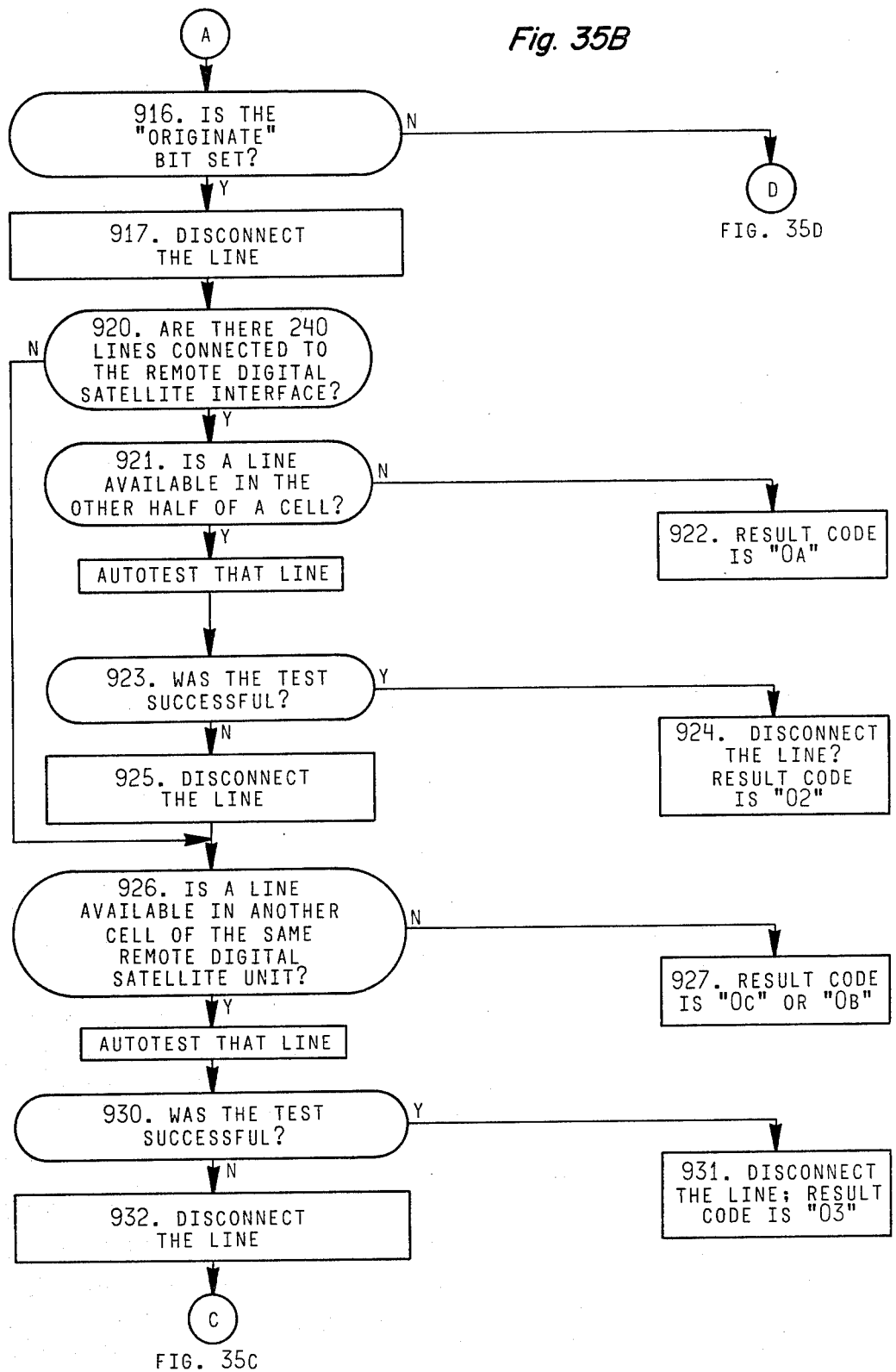
Figure 35C:
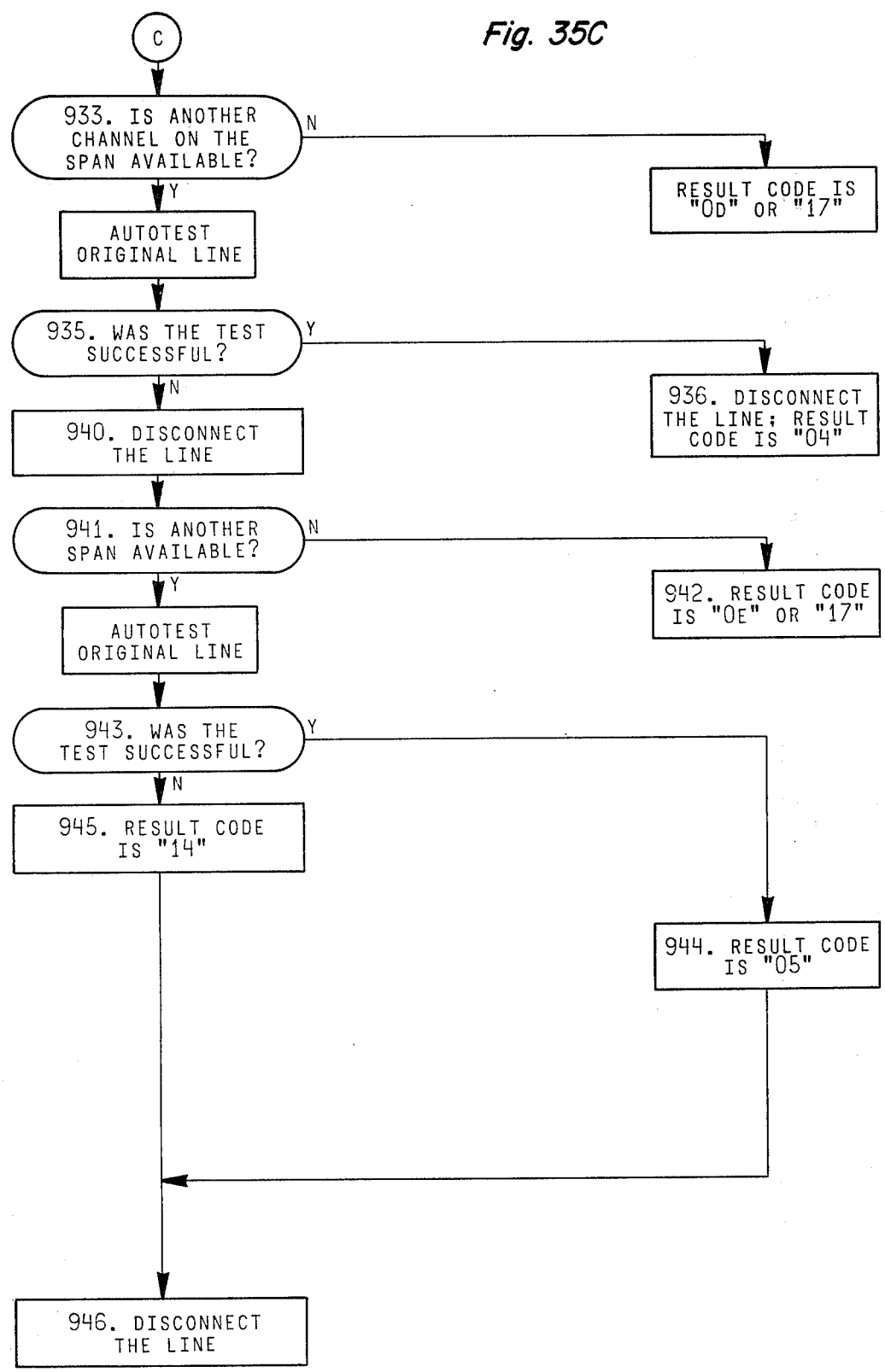

Next the availability of the original line through another channel on the communications link is tested in step 933 (FIG. 35C). By "another channel" is meant that, if the original line was assigned an "odd" numbered channel, this test should be performed on an "even" numbered channel. If no such channel is available, a test result code, indicating either that no such channel is available on the same span (i.e. "0D") or that the original line now is busy (i.e., "17"), is incorporated in a message to the maintenance processor (step 934). If such a channel is available, the autotest is again run on the original line (step 935). If the test is successful, then a message indicating that the line channel interchange is malfunctioning (i.e., a result code "04") is sent to the maintenance processor 300 in step 936. On a failure the original line is disconnected (step 940).

As a fourth test, a test call is placed over another span to the original line. The availability of a channel on another span is tested in step 941. If not, a message is sent in step 942 indicating that no channel is available on another span (i.e., a result code "0E") or that the original line is busy (i.e., a result code "17"). If another span is available, a channel is selected and the autotest is run in step 943. If this test is successful, the original span's transmitter/receivers are malfunctioning and result code "05" is incorporated in the maintenance processor message. If the test fails, then the line channel interchange 76 is again indicated to be bad and the corresponding result code "14" will be sent; this differs from the result code "04" sent in step 936 thereby to discriminate between the two tests that can indicate line channel interchange failure. In either case, the processor 27 disconnects the original line in step 945. This completes this branch of the autotest diagnostics, so the processor 27 uses step 537 in FIG. 25D to prepare and send the message and step 531 to send the TEST COMPLETE message and the maintenance processor.

Figure 35D:
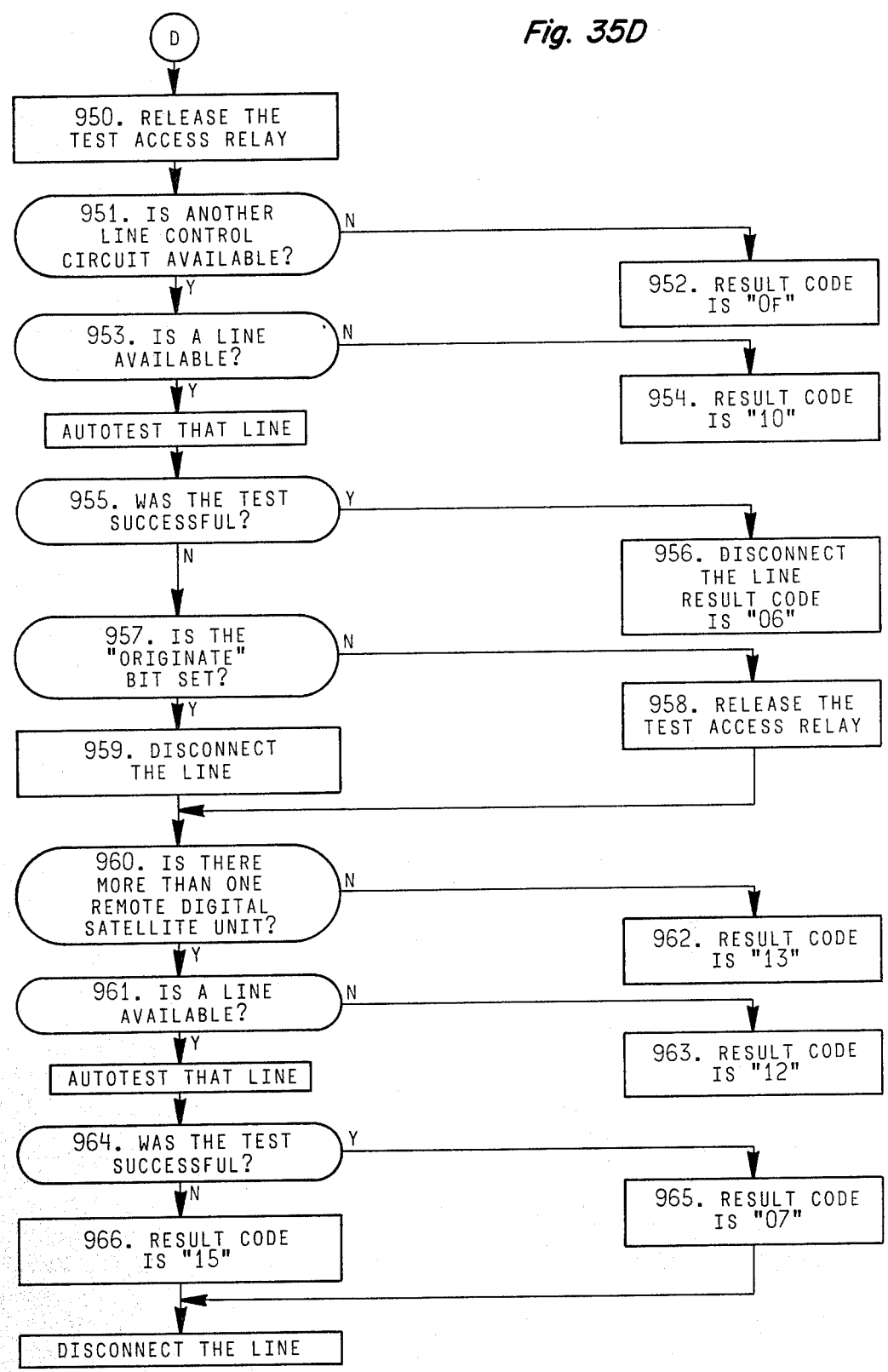

Referring again to step 916 (FIG. 35B), if the ORIGINATE bit is not set, the test access relay is released in step 950 (FIG. 35D). Then the system tests to determine if another remote line circuit controller 74 is available (step 951). If none is available, a message with a result code "0F" will be sent (step 952). If another remote line circuit controller is available and a line is not available (step 953), a message with a result code "10" will be sent to indicate that no line is available in the same remote digital satellite unit. If a line is available, the autotest is run (step 955) in that other line in the other remote line control of the same remote unit. If the test passes, a line circuit control failure is indicated, and a message with a result code "06" will be sent to the maintenance processor in step 956. If a failure occurs with this test, the ORIGINATE bit is again tested in step 957. If the ORIGINATE bit is not set, the test access relay is released in step 958. If the ORIGINATE bit is set, the line is disconnected, in step 959, to prepare for another test.

In either case, if there is more than one remote digital satellite unit, step 960 shifts to step 961 to determine if a line is available in such a unit. If there is only one group, a message with a result code "13" will be sent (step 962). If a line is not available in another remote digital satellite unit, a message with a result code "12" will be sent (step 963). If a line is available, another autotest is run in step 964. If that test passes, then the problem could exist in the line circuit control, the maintenance and administration circuit 79, the transmitter receivers 71, or other areas, so a message a with result code "07", indicating that the original remote digital satellite unit is out of service, will be sent (step 965). If the test in step 964 fails, there is a problem at the digital central office, so a message with a result code "15" will be sent (step 966). After processing either step 965 or 966, the processor 27 disconnects the line that was used during the last test.

In summary, we have disclosed, at various levels of detail, a telephony network utilizing a digital central office which is adapted to support remote digital satellite units that connect to the remote subscriber lines. More specifically, this disclosure has been directed to those portions of that network that facilitate the testing of the remote digital satellite unit by means of a simple "GO-NO GO" test. The test merely requires the establishment of a path between a test circuit at each remote digital satellite unit and an automatic test circuit at the digital central office. When a connection is made through normal call processing or other techniques the automatic test circuit sends a tone and then waits to receive a tone and dial pulses from the remote digital satellite which can then be monitored to determine whether they fall within predetermined specifications. If they do, the test passes. If they do not, the test circuits can be used in a diagnostic procedure that is performed by the digital satellite interface. This procedure utilizes additional test calls with different portions of the circuit in order to isolate the cause of the problem, if possible.

This invention has been disclosed by means of block diagrams, flow diagrams, and logic diagrams. We believe that this disclosure is sufficient to enable logic designers to build the circuitry and programmers to write programs for operation with a specific processor without undue experimentation. Moreover, this disclosure has been in terms of a specific embodiment, and it will be apparent that many different circuits and logical organizations can be utilized with the attainment of all or some of the objects of this invention. For example, the embodiments of this invention that has been described connects the autotest circuit 20 in FIG. 2 to a port group unit in the call processing system so that one such circuit can provide testing for the entire telephony network and communicate with the maintenance processor. However, in other applications, that connection may not exist. For example, one such circuit might be interfaced with interfacing equipment corresponding to each digital satellite interface, thereby requiring multiple circuits, but allowing parallel test calls from the digital central office. In such a system other means could be used for reporting, such as an output device that would connect to each piece of interfacing equipment. Therefore, it is the object of the appended claims to cover all such variations and modifications as come within the true spirit and scope of this invention.

What is claimed as new and desired to be secured by Letters Patent of the United States is:

1. A method for testing circuitry in a telephony network that comprises a digital central office with call processing means that transfer voice data and supervisory data, remote port units connected to remote subscriber lines, a communications link between the remote port units and the digital central office, interface means for interfacing the communications link, an automatic test call means for communicating through the digital central office means and a remote test call means in each remote port unit, said method comprising the steps of:
   A. establishing a communications path between a remote test call means and the automatic test call means,
   B. generating, in the automatic test call means, a first tone for transfer through the interface means as voice data to the remote test call means in response to the establishment of communicatins,
   C. generating, in the remote test call means, a second tone for transfer through the interface means as voice data to the automatic test call means in response to the receipt of the first tone from the automatic test call means,
   D. generating, in the remote test call means, signals corresponding to dial pulses for transfer as supervisory data through the interface means to the automatic test call means in response to the completion of the second tone, and
   E. testing, in the automatic test call means, the second tone and dial pulse signals, and
   F. generating, in the automatic test call means, an indication of success or failure of the test in response to said testing.

2. A telephony network comprising:
   A. digital central office means with call processing means that transfer voice date and supervisory data,
   B. remote port means connected to remote subscriber lines at a location that is remote from said digital central office means,
   C. communications link means between said remote port means and said digital central office means,
   D. interface means connected to said communications link means and said call processing means,
   E. automatic test call means for communication through the interface means to said communications link means, said automatic test call means including:
      (i) means for ascertaining the establishment of communications between said remote port means and the automatic test call means,
      (ii) tone generating means for generating, in response to said establishment of communications, a first tone for transfer through the interface means as voice data,
      (iii) testing means responsive to incoming signals from said interface means for testing second tone signals and dial pulse signals, and
      (iv) means connected to said testing means for indicating the success of the testing, and
   F. remote test call means in each said remote port means, said remote test call means including:
      (i) tone generating means responsive to the receipt of the first tone from said automatic test call means for generating a second tone for transfer through said interface means to said automatic test call means, and
      (ii) dial pulse generating means responsive to the completion of the second tone, for generating signals corresponding to dial pulses for transfer through said interface means to the automatic test call means.

3. Remote test call means as defined in claim 2 wherein said remote port means includes means for transmitting signals constituting voice data and supervisory data to, and for receiving signals constituting voice data and supervisory data from, the digital central office means over the communications link means, said remote test call means further comprising:
   (a) bistable means connected to said remote port means and responsive to said supervisory data signals for generating a signal for initiating operations in said remote test call means; and
   (b) state means for generating signals that sequentially identify a plurality of states, said state means including a counter connected to receive a plurality of signals from said remote test call means for causing said counter to advance in response to the successful completion of operations for each state identified by said counter.

4. Remote test call means as defined in claim 3 including means for generating timing signals and means for connection to at least one subscriber's line circuit at the remote port means, the supervisory data signals including signals that identify the line circuit corresponding to the line under test, and further in which one of said states is a receive tone test state, said remote test call means including a receive tone test circuit including:
  (a) a relay responsive to said bistable means for completing a circuit through the identified line circuit to enable the line circuit to receive the first tone signals;
  (b) frequency test means connected to said state means and said line circuit for receiving the first tone signals and for generating a signal if the frequency of the received tone signal corresponds to an expected frequency; and
  (c) means connected to said state means and said frequency test means for generating a signal a selected period of time after the beginning of the receive tone test state if the frequency test means is then generating a signal, thereby enabling the state means to advance to the next state.

5. Remote test call means as defined in claim 4 further comprising means connected to said state means, said frequency test means and said timing means for generating a test fail signal if said frequency test means is not generating a signal a selected time after the beginning of the receive tone test state.

6. Remote test call means as defined in claim 4 wherein one of said states is a tone generating state, said state means generating a signal identifying the beginning of said tone generating state, said tone generating means including a circuit for generating a tone signal and relay circuit means energized in response to the tone generating state signal for coupling the tone signal to the selected line circuit, said remote test call means further including:
  A. timing means connected to said state means for generating a timing signal a selected time after the beginning of said tone generating state and
  B. generating means connected to said timing means and to said state means and responsive to the timing signal and energization of said relay circuit means for generating a signal that enables said state means to advance to the next state a selected time after the beginning of said tone generating state.

7. Remote test call means as defined in claim 4 wherein one of said states is a dial pulse transmitting state, said state means generating a dial pulse test signal to initiate the dial pulse transmitting state, said remote test call means dial pulse generating means including means responsive to the dial pulse test signal to transmit dial pulses through said line circuit comprising:
  A. dial pulse timing means connected to said timing circuit and said state means for generating a dial pulse relay enabling signal for a selected period of time after the initiation of the dial pulse transmitting state, and
  B. a relay connected to said line circuit and energized in response to the dial pulse relay enabling signal for generating the dial pulse signal in response to the dial pulse timing signal.

8. Remote test call means as defined in claim 7 wherein said dial pulse timing means comprises:
  A. means responsive to the dial pulse test signal for generating a dial pulse enabling signal, and
  B. means responsive to said dial pulse enabling signal generating means and to said timing means for generating a dial pulse timing signal, and
  C. means responsive to the coincidence of said dial pulse enabling signal and said dial pulse timing signal for generating said dial pulse relay enabling signal; said dial pulse timing signal generating means being further connected to said state means to advance said state means at the end of each dial pulse timing signal.

9. Automatic test call means as defined in claim 2 wherein said digital central office means includes local port means that connect to local subscriber lines, said automatic test call means being connected to one of said local port means for transmitting voice data and supervisory data to, and receiving voice data and supervisory data from, the central office means, said local port means also receiving supervisory signals as supervisory data and timing signals from said digital central office means, said automatic test call means communication establishment ascertaining means including bistable means responsive to said supervisory signals and timing signals from said port means for generating a signal for initiating operations in said automatic test call means, said automatic test call means further comprising state means comprising:
  A. counter means for generating signals that sequentially identify a plurality of states;
  B. decoder means connected to said counter means and responsive to the state signals from the counter means for generating signals that initiate operations in the automatic test call means associated with each state; and
  C. means connected to said communications establishment ascertaining means, said tone generating means and said testing means for advancing the counter means in response to the establishment of communications with a remote subscriber line, the generation of said first tone for a selected period of time and to the successful receipt of the second tone signals and dial pulse signals.

10. Automatic test call means as defined in claim 9 wherein said advancing means comprises:
  A. timing means connected to said local port means and said counter means for generating a clocking signal for said counter means;
  B. means connected to said counter means for generating an enabling signal transmitted to said counter means to enable it to advance in response to the successful completion of an operation for each state identified by said counter means.

11. Automatic test call means as defined in claim 10 wherein one of said states is a tone generating state during which said tone generating means generates digital tone signals, said tone generating means comprising:
  A. means for storing a plurality of digital words constituting digital tone signals; and
  B. means connected to said storing means and responsive to timing signals from said local port means for selecting words stored in said storing means for transmission.

12. Automatic test call means as defined in claim 11 wherein:
  A. said storing means comprises a read only memory including a plurality of addressable storage locations each of which stores digital words constituting tone signals; and
  B. said selecting means constitutes counter means connected to receive timing signals from the local port means, for sequentially generating signals that are coupled to said read only memory as address signals.

13. Automatic test call means as defined in claim 10 wherein one of said states is a received tone testing state, said testing means constituting:
  A. means connected to said local port means for receiving tone signals from said local port means;
  B. means for generating tone signals;
  C. means connected to said tone receiving means and said tone generating means for comparing the received tone signals and the generated tone signals and for generating a signal if the signals match.

14. Automatic test call means as defined in claim 13 wherein:
  A. said tone signals received from said local port means are in serial digital form, said receiving means including serial to parallel conversion means for converting said serial signals to parallel form;
  B. said tone signal generating means comprises:
    (i) memory means for storing digital words representative of tone signals in a plurality of addressable storage locations; and
    (ii) address generating means connected to said memory means for generating address signals that are coupled to said memory means for selecting the digital words stored in said memory means, said address generating means being further connected to said comparing means for receiving a signal from said comparing means that inhibits it from advancing when said received tone signals and said tone signals from said memory means are not identical.

15. Automatic test call means as defined in claim 13 wherein each tone signal includes a signal indicating the sign of the tone signal, and said testing means further comprises means for testing the frequency of the received tone signals, comprising:
  A. means connected to said tone signal receiving means for generating a signal when the received tone signals change sign; and
  B. means connected to said sign change detecting means for determining whether the frequency with which the received tone signal changes sign is identical to an expected frequency, comprising:
    (i) sign signal counter means connected to said sign signal generating means incremented in response to the receipt of a signal from said sign signal generating means;
    (ii) frequency comparing means connected to said sign signal counter means for generating an output signal when the output signal from said sign signal counter means equals a predetermined count; and
    (iii) means connected to receive timing signals from the local port means and the output signal from said frequency comparing means for generating a signal indicating the successful completion of the received tone test if the output signal from said frequency comparing means is received a preselected interval after the beginning of the received tone test.

16. Automatic test call means as defined in claim 10 wherein one of said states is a dial pulse test state in which supervisory data signals representative of dial pulse signals are received and counted to determine if a preselected number of dial pulse signals are received in a predetermined period of time, said automatic test call means further comprising dial pulse test means comprising:
  A. dial pulse counter means connected to said state means and said local port means for receiving the dial pulse signals from said local port means, said state means enabling said dial pulse counter means to count the number of dial pulse signals received after the automatic test call means enters the dial pulse test state;
  B. dial pulse comparing means connected to said dial pulse counter means for generating an output signal if the number of dial pulse signals is within a preselected range; and
  C. dial pulse timing means connected to said dial pulse comparing means, said state means and said local port means for generating a signal a selected interval after the beginning of the dial pulse test state if the dial pulse comparing means is then generating an output signal.

17. Remote test call means as defined in claim 2 wherein said remote port means includes means for transmitting signals constituting voice data and supervisory data to, and for receiving signals constituting voice data and supervisory data from, the digital central office means over the communications link means, said remote test call means further comprising:
  (a) bistable means connected to said remote port means and responsive to said supervisory data signals for generating a signal for initiating operations in said remote test call means; and
  (b) state means for generating signals that sequentially identify a plurality of states, said state means including a counter connected to receive a plurality of signals from said remote test call means for causing said counter to advance in response to the successful completion of operations for each state identified by said counter.

18. Remote test call means as defined in claim 17 including means for generating timing signals and means for connection to at least one subscriber's line circuit at the remote port means, the supervisory data signals including signals that identify the line circuit corresponding to the line under test, and further in which one of said states is a receive tone test state, said remote test call means including a receive tone test circuit including:
  (i) a relay responsive to said bistable means for completing a circuit through the identified line circuit to enable the line circuit to receive the first tone signals;
  (ii) frequency test means connected to said state means and said line circuit for receiving the first tone signals and for generating a signal if the frequency of the received tone signal corresponds to an expected frequency;
  (iii) means connected to said state means and said frequency test means for generating a signal a selected period of time after the beginning of the receive tone test state if the frequency test means is then generating a signal, thereby enabling the state means to advance to the next state.

19. Remote test call means as defined in claim 18 further comprising means connected to said state means, said frequency test means and said timing means for generating a test fail signal if said frequency test means is not generating a signal a selected time after the beginning of the receive tone test state.

20. Remote test call means as defined in claim 18 wherein one of said states is a tone generating state, said state means generating a signal identifying the beginning of said tone generating state, said tone generating means including a circuit for generating a tone signal and relay circuit means energized in response to the tone generating state signal for coupling the tone signal to the selected line circuit, said remote test call means further including:
- A. timing means connected to said state means for generating a timing signal a selected time after the beginning of said tone generating state and
- B. generating means connected to said timing means and to said state means and responsive to the timing signal and energization of said relay circuit means for generating a signal that enables said state means to advance to the next state a selected time after the beginning of said tone generating state.

21. Remote test call means as defined in claim 18 wherein one of said states is a dial pulse transmitting state, said state means generating a dial pulse test signal to initiate the dial pulse transmitting state, said remote test call means dial pulse generating means including means responsive to the dial pulse test signal to transmit dial pulses through said line circuit comprising:
- A. dial pulse timing means connected to said timing circuit and said state means for generating a dial pulse relay enabling signal for a selected period of time after the initiation of the dial pulse transmitting state, and
- B. a relay connected to said line circuit and energized in response to the dial pulse relay enabling signal for generating the dial pulse signal in response to the dial pulse timing signal.

22. Remote test call means as defined in claim 21 wherein said dial pulse timing means comprises:
- A. means responsive to the dial pulse test signal for generating a dial pulse enabling signal, and
- B. means responsive to said dial pulse enabling signal generating means and to said timing means for generating a dial pulse timing signal, and
- C. means responsive to the coincidence of said dial pulse enabling signal and said dial pulse timing signal for generating said dial pulse relay enabling signal; said dial pulse timing signal generating means being further connected to said state means to advance said state means at the end of each dial pulse timing signal.

23. Automatic test call means for facilitating the testing of a telephone network that includes digital central office means with call processing means that transfer voice data and supervisory data, remote port means connected to remote subscriber lines at a location that is remote from said digital central office means, communications link means between the remote port means and the digital central office means, and interface means connected to said communications link means, said automatic test call means being connected for communicating through the digital central office means to said communications link means and comprising:
- A. means for ascertaining the establishment of communications between said remote port means and the automatic test call means,
- B. tone generating means for generating, in response to said establishment of communications, a first tone for transfer through the interface means as voice data,
- C. testing means responsive to incoming signals from said interface means for testing second tone signals and dial pulse signals, and
- D. means connected to said testing means for indicating the success of the testing.

24. Automatic test call means as defined in claim 23 wherein said digital central office means includes local port means that connect to local subscriber lines, said automatic test call means being connected to one of said local port means for transmitting voice data and supervisory data to, and receiving voice data and supervisory data from, the central office means, said local port means also receiving supervisory signals as supervisory data and timing signals from said digital central office means, said automatic test call means communication establishment ascertaining means including bistable means responsive to said supervisory signals and timing signals from said local port means for generating a signal for initiating operations in said automatic test call means and state means comprising:
- A. counter means for generating signals that sequentially identify a plurality of states;
- B. decoder means connected to said counter means and responsive to the state signals from the counter means for generating signals that initiate operations in the automatic test call means associated with each state; and
- C. means connected to said communications establishment ascertaining means, said tone generating means and said testing means for advancing the counter means in response to the establishment of communications with a remote subscriber line, the generation of said first tone for a predetermined period of time and to the successful receipt of the second tone signal and dial pulse signals.

25. Automatic test call means as defined in claim 24 wherein said advancing means comprises:
- A. timing means connected to said local port means and said counter means for generating a clocking signal for said counter means;
- B. means connected to said counter means for generating an enabling signal transmitted to said counter means to enable it to advance in response to the successful completion of an operation for each state identified by said counter means.

26. Automatic test call means as defined in claim 25 wherein one of said states is a tone generating state during which said tone generating means generates digital tone signals, said tone generating means comprising:
- A. means for storing a plurality of digital words constituting tone signals; and
- B. means connected to said storing means and responsive to timing signals from said local port means for selecting words stored in said storing means for transmission.

27. Automatic test call means as defined in claim 26 wherein:
- A. said storing means comprises a read only memory including a plurality of addressable storage locations each of which stores digital words constituting tone signals; and
- B. said selecting means constitutes counter means connected to receive timing signals from the local port means, for sequentially generating signals that are coupled to said read only memory as address signals.

28. Automatic test call means as defined in claim 25 wherein one of said states is a received tone testing state, said testing means constituting:

A. means connected to said local port means for receiving tone signals from said local port means;
B. means for generating tone signals;
C. means connected to said tone receiving means and said tone generating means for comparing the received tone signals and the generated tone signals and for generating a signal if the signals match.

29. Automatic test call means as defined in claim 28 wherein:
A. said tone signals received from said local port means are in serial digital form, said receiving means including serial to parallel conversion means for converting said serial signals to parallel form;
B. said tone signal generating means comprises:
  (i) memory means for storing digital words representative of tone signals in a plurality of addressable storage locations; and
  (ii) address generating means connected to said memory means for generating address signals that are coupled to said memory means for selecting the digital words stored in said memory means, said address generating means being further connected to said comparing means for receiving a signal from said comparing means that inhibits it from advancing when said received tone signals and said tone signals from said memory means are not identical.

30. Automatic test call means as defined in claim 28 wherein each tone signal includes a signal indicating the sign of the signal, and said testing means further comprises means for testing the frequency of the received tone signals, comprising:
A. means connected to said tone signal receiving means for generating a signal when the received tone signals change sign; and
B. means connected to said sign change detecting means for determining whether the frequency with which the received tone signal changes sign is identical to an expected frequency, comprising:
  (i) sign signal counter means connected to said sign signal generating means incremented in response to the receipt of a signal from said sign signal generating means;
  (ii) frequency comparing means connected to said sign signal counter means for generating an output signal when the output signal from said sign signal counter means equals a predetermined count; and
  (iii) means connected to receive timing signals from the local port means and the output signal from said frequency comparing means for generating a signal indicating the successful completion of the received tone test if the output signal from said frequency comparing means is received a preselected interval after the beginning of the received tone test.

31. Automatic test call means as defined in claim 25 wherein one of said states is a dial pulse test state in which supervisory data signals representative of dial pulse signals are received and counted to determine if a preselected number of dial pulse signals are received in a predetermined period of time, said automatic test call means further comprising dial pulse test means comprising:
A. dial pulse counter means connected to said state means and said local port means for receiving the dial pulse signals from said local port means, said state means enabling said dial pulse counter means to count the number of dial pulse signals received after the automatic test call means enters the dial pulse test state;
B. dial pulse comparing means connected to said dial pulse counter means for generating an output signal if the number of dial pulse signals is within a preselected range; and
C. dial pulse timing means connected to said dial pulse comparing means, said state means and said local port means for generating a signal a selected interval after the beginning of the dial pulse test state if the dial pulse comparing means is then generating an output signal.

32. Remote test call means for facilitating the testing of a telephone network that includes digital central office means with call processing means that transfer voice data and supervisory data, remote port means connected to remote subscriber lines at a location that is remote from said digital central office means, communications link means between the remote port means and the digital central office means, and interface means connected to said communications link means, and automatic test call means including means for generating a first tone for transfer through the interface means and communications link means to the remote port means, said remote test call means being connected to the remote port means and the communications link means and comprising:
A. tone generating means responsive to the receipt of a first tone from the automatic test call means for generating a second tone for transfer through said interface means to the automatic test call means, and
B. dial pulse generating means responsive to the completion of the second tone, for generating signals corresponding to dial pulses for transfer through said interface means to the automatic test call means.

* * * * *